US007252775B2

(12) United States Patent
Silverbrook

(10) Patent No.: US 7,252,775 B2
(45) **Date of Patent: *Aug. 7, 2007**

(54) METHOD OF FABRICATING INKJET NOZZLE COMPRISING SUSPENDED ACTUATOR

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/080,497

(22) Filed: Mar. 16, 2005

(65) Prior Publication Data

US 2005/0162476 A1 Jul. 28, 2005

Related U.S. Application Data

(63) Continuation of application No. 10/302,668, filed on Nov. 23, 2002, now Pat. No. 7,152,958.

(51) Int. Cl.
*G01D 15/00* (2006.01)
*G11B 5/127* (2006.01)

(52) U.S. Cl. .......... 216/27

(58) Field of Classification Search .......... 216/27; 29/890.1; 438/21

See application file for complete search history.

(56) References Cited

U.S. PATENT DOCUMENTS

| | | | |
|---|---|---|---|
| 4,914,562 | A | 4/1990 | Abe et al. |
| 4,922,269 | A | 5/1990 | Ikeda et al. |
| 4,965,594 | A | 10/1990 | Komuro |
| 5,163,177 | A | 11/1992 | Komura |
| 5,376,231 | A | 12/1994 | Matsumoto et al. |
| 5,534,898 | A | 7/1996 | Kashimo et al. |
| 5,706,041 | A | 1/1998 | Kubby |
| 5,841,452 | A | 11/1998 | Silverbrook |
| 5,969,005 | A | 10/1999 | Yamashita |

(Continued)

FOREIGN PATENT DOCUMENTS

| | | |
|---|---|---|
| EP | 1005990 A2 | 6/2000 |

(Continued)

OTHER PUBLICATIONS

The Fabrication and Reliability Testing of Ti/TiN Heaters; P De Moor, A Witvrouw, V Simons, I De Wolf; IMEC Kapeldreef 75, B3001 Leuven, Belgium*.

*Primary Examiner*—Parviz Hassanzadeh
*Assistant Examiner*—Roberts Culbert

(57) ABSTRACT

A method of fabricating inkjet nozzles on a substrate is provided. Each nozzle comprises a nozzle chamber and an actuator suspended in the nozzle chamber. Each nozzle chamber comprises a roof having a nozzle aperture defined therein and sidewalls extending from the roof to the substrate. The method comprising the steps of: (a) depositing a layer of first sacrificial photoresist onto the substrate; (b) defining actuator scaffolds in the first sacrificial photoresist; (c) depositing actuator material onto the actuator scaffolds; (d) etching the actuator material to define actuators; (e) depositing a layer of second sacrificial photoresist onto the actuators, the first sacrificial photoresist and/or the substrate; (f) defining openings in the second sacrificial photoresist, the openings being complementary to chamber sidewalls; (g) depositing roof material onto the second sacrificial photoresist and into the openings, thereby forming the roof and sidewalls of each chamber; (h) etching nozzle apertures through each roof; and (i) removing the first and second sacrificial photoresist exposed through the nozzle apertures.

13 Claims, 42 Drawing Sheets

U.S. PATENT DOCUMENTS

| | | | | |
|---|---|---|---|---|
| 5,992,769 | A | 11/1999 | Wise et al. | |
| 6,019,457 | A | 2/2000 | Silverbrook | |
| 6,155,675 | A | 12/2000 | Nice et al. | |
| 6,180,427 | B1 * | 1/2001 | Silverbrook | 438/21 |
| 6,190,492 | B1 | 2/2001 | Byrne et al. | |
| 6,296,344 | B1 | 10/2001 | Sharma et al. | |
| 6,482,574 | B1 | 11/2002 | Ramaswami et al. | |
| 6,543,879 | B1 | 4/2003 | Feinn et al. | |
| 6,561,625 | B2 | 5/2003 | Maeng et al. | |
| 2005/0145600 | A1 * | 7/2005 | Silverbrook | 216/27 |

FOREIGN PATENT DOCUMENTS

| | | | |
|---|---|---|---|
| EP | 603782 | B1 | 5/2001 |
| EP | 1138494 | A2 | 10/2001 |
| EP | 1216837 | A1 | 6/2002 |
| EP | 955166 | B1 | 10/2002 |
| JP | 07-060955 | A | 3/1995 |
| JP | 09-048121 | A | 2/1997 |
| JP | 2002-210951 | A | 7/2002 |
| WO | WO 00/23279 | A1 | 4/2000 |
| WO | WO 02/05946 | A1 | 1/2002 |

* cited by examiner

METHOD OF FABRICATING INKJET NOZZLE COMPRISING SUSPENDED ACTUATOR

CROSS REFERENCE TO RELATED APPLICATIONS

The present application is a continuation of U.S. application Ser. No. 10/302,668 filed Nov. 23, 2002, now U.S. Pat. No. 7,152,958 the entire contents of which are herein incorporated by reference.

FIELD OF THE INVENTION

The present invention relates to a thermal ink jet printhead, to a printer system incorporating such a printhead, and to a method of ejecting a liquid drop (such as an ink drop) using such a printhead.

BACKGROUND TO THE INVENTION

The present invention involves the ejection of ink drops by way of forming gas or vapor bubbles in a bubble forming liquid. This principle is generally described in U.S. Pat. No. 3,747,120 (Stemme).

There are various known types of thermal ink jet (bubblejet) printhead devices. Two typical devices of this type, one made by Hewlett Packard and the other by Canon, have ink ejection nozzles and chambers for storing ink adjacent the nozzles. Each chamber is covered by a so-called nozzle plate, which is a separately fabricated item and which is mechanically secured to the walls of the chamber. In certain prior art devices, the top plate is made of Kapton™ which is a Dupont trade name for a polyimide film, which has been laser-drilled to form the nozzles. These devices also include heater elements in thermal contact with ink that is disposed adjacent the nozzles, for heating the ink thereby forming gas bubbles in the ink. The gas bubbles generate pressures in the ink causing ink drops to be ejected through the nozzles.

It is an object of the present invention to provide a useful alternative to the known printheads, printer systems, or methods of ejecting drops of ink and other related liquids, which have advantages as described herein.

SUMMARY OF THE INVENTION

According to a first aspect of the invention there is provided an ink jet printhead comprising:

- an elongate substrate supporting an elongate structure with a plurality of nozzles, the structure formed on the substrate by chemical vapor deposition (CVD) such that any bowing from differential thermal expansion is within tolerances that will permit further lithographic fabrication steps involving the substrate or the structure, and, at least one heater element corresponding to each of the nozzles respectively, the heater elements being configured for thermal contact with a bubble forming liquid, to heat at least part of the bubble forming liquid to a temperature above its boiling point to form a gas bubble to eject a drop of the bubble forming liquid through the nozzle corresponding to that heater element.

A related aspect of the invention provides an ink jet printhead comprising:

- a structure that is formed by chemical vapor deposition (CVD);
- a plurality of nozzles incorporated on the structure; and
- at least one respective heater element corresponding to each nozzle, wherein
  - each heater element is arranged for being in thermal contact with a bubble forming liquid, and
  - each heater element is configured to heat at least part of the bubble forming liquid to a temperature above its boiling point to form a gas bubble therein thereby to cause the ejection of a drop of an ejectable liquid through the nozzle corresponding to that heater element.

In another related aspect of the invention there is provided a printer system incorporating a printhead, the printhead comprising:

- a structure that is formed by chemical vapor deposition (CVD);
- a plurality of nozzles incorporated on the structure; and
- at least one respective heater element corresponding to each nozzle, wherein
  - each heater element is arranged for being in thermal contact with a bubble forming liquid, and
  - each heater element is configured to heat at least part of the bubble forming liquid to a temperature above its boiling point to form a gas bubble therein thereby to cause the ejection of a drop of an ejectable liquid through the nozzle corresponding to that heater element.

In a still further related aspect of the invention there is provided a method of ejecting a drop of an ejectable liquid from a printhead, the printhead comprising a plurality of nozzles and at least one respective heater element corresponding to each nozzle, the method comprising the steps of:

- providing the printhead, including forming a structure by chemical vapor deposition (CVD), which structure defines nozzle apertures each forming part of a respective nozzle;
- heating at least one heater element corresponding to a nozzle so as to heat at least part of a bubble forming liquid which is in thermal contact with the at least one heated heater element to a temperature above the boiling point of the bubble forming liquid;
- generating a gas bubble in the bubble forming liquid by said step of heating; and
- causing the drop of ejectable liquid to be ejected through the nozzle corresponding to the at least one heated heater element by said step of generating a gas bubble.

As will be understood by those skilled in the art, the ejection of a drop of the ejectable liquid as described herein, is caused by the generation of a vapor bubble in a bubble forming liquid, which, in embodiments, is the same body of liquid as the ejectable liquid. The generated bubble causes an increase in pressure in ejectable liquid, which forces the drop through the relevant nozzle. The bubble is generated by Joule heating of a heater element which is in thermal contact with the ink. The electrical pulse applied to the heater is of brief duration, typically less than 2 microseconds. Due to stored heat in the liquid, the bubble expands for a few microseconds after the heater pulse is turned off. As the vapor cools, it recondenses, resulting in bubble collapse. The bubble collapses to a point determined by the dynamic interplay of inertia and surface tension of the ink. In this specification, such a point is referred to as the "point of collapse" of the bubble.

The printhead according to the invention comprises a plurality of nozzles, as well as a chamber and one or more heater elements corresponding to each nozzle. Each portion of the printhead pertaining to a single nozzle, its chamber and its one or more elements, is referred to herein as a "unit cell".

In this specification, where reference is made to parts being in thermal contact with each other, this means that they are positioned relative to each other such that, when one of the parts is heated, it is capable of heating the other part, even though the parts, themselves, might not be in physical contact with each other.

Also, the term "ink" is used to signify any ejectable liquid, and is not limited to conventional inks containing colored dyes. Examples of non-colored inks include fixatives, infrared absorber inks, functionalized chemicals, adhesives, biological fluids, water and other solvents, and so on. The ink or ejectable liquid also need not necessarily be a strictly a liquid, and may contain a suspension of solid particles or be solid at room temperature and liquid at the ejection temperature.

In this specification, the term "periodic element" refers to an element of a type reflected in the periodic table of elements.

DETAILED DESCRIPTION OF THE DRAWINGS

Preferred embodiments of the invention will now be described, by way of example only, with reference to the accompanying representations. The drawings are described as follows.

DETAILED DESCRIPTION

Figure 1:
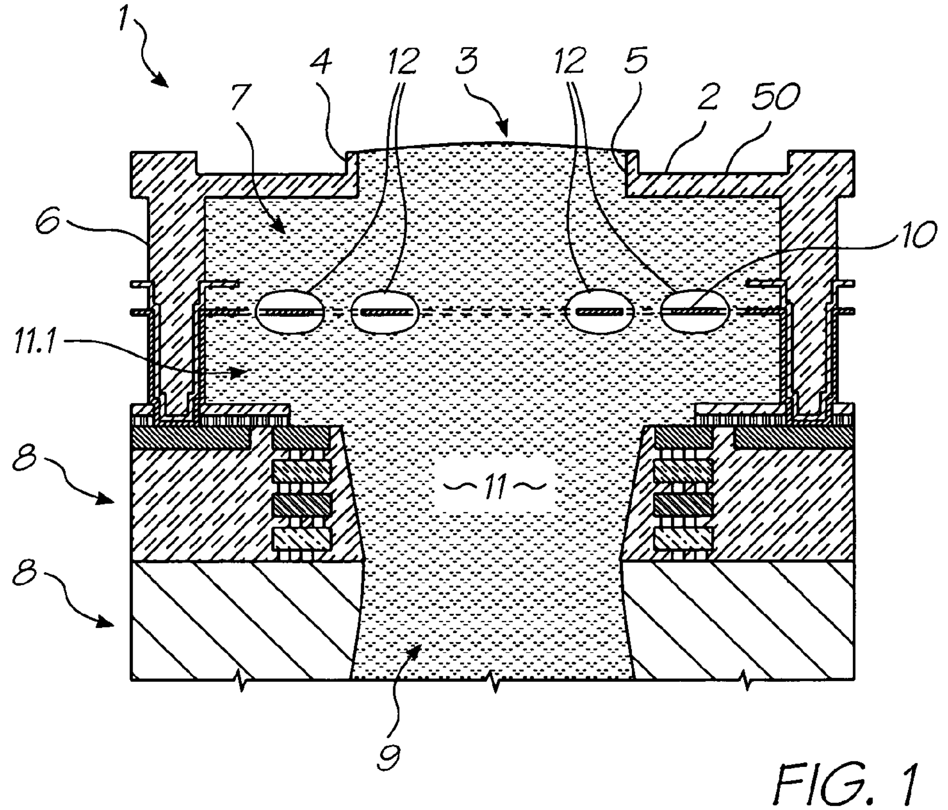
FIG. 1 is a schematic cross-sectional view through an ink chamber of a unit cell of a printhead according to an embodiment of the invention, at a particular stage of operation.

In the description than follows, corresponding reference numerals, or corresponding prefixes of reference numerals (i.e. the parts of the reference numerals appearing before a point mark) which are used in different figures relate to corresponding parts. Where there are corresponding prefixes and differing suffixes to the reference numerals, these indicate different specific embodiments of corresponding parts.

Overview of the Invention and General Discussion of Operation

With reference to FIGS. 1 to 4, the unit cell 1 of a printhead according to an embodiment of the invention comprises a nozzle plate 2 with nozzles 3 therein, the nozzles having nozzle rims 4, and apertures 5 extending through the nozzle plate. The nozzle plate 2 is plasma etched from a silicon nitride structure which is deposited, by way of chemical vapor deposition (CVD), over a sacrificial material which is subsequently etched.

The printhead also includes, with respect to each nozzle 3, side walls 6 on which the nozzle plate is supported, a chamber 7 defined by the walls and the nozzle plate 2, a multi-layer substrate 8 and an inlet passage 9 extending through the multi-layer substrate to the far side (not shown) of the substrate. A looped, elongate heater element 10 is suspended within the chamber 7, so that the element is in the form of a suspended beam. The printhead as shown is a microelectromechanical system (MEMS) structure, which is formed by a lithographic process which is described in more detail below.

When the printhead is in use, ink 11 from a reservoir (not shown) enters the chamber 7 via the inlet passage 9, so that the chamber fills to the level as shown in FIG. 1. Thereafter, the heater element 10 is heated for somewhat less than 1 micro second, so that the heating is in the form of a thermal pulse. It will be appreciated that the heater element 10 is in thermal contact with the ink 11 in the chamber 7 so that when the element is heated, this causes the generation of vapor bubbles 12 in the ink. Accordingly, the ink 11 constitutes a bubble forming liquid. FIG. 1 shows the formation of a bubble 12 approximately 1 microsecond after generation of the thermal pulse, that is, when the bubble has just nucleated on the heater elements 10. It will be appreciated that, as the heat is applied in the form of a pulse, all the energy necessary to generate the bubble 12 is to be supplied within that short time.

Figure 34:
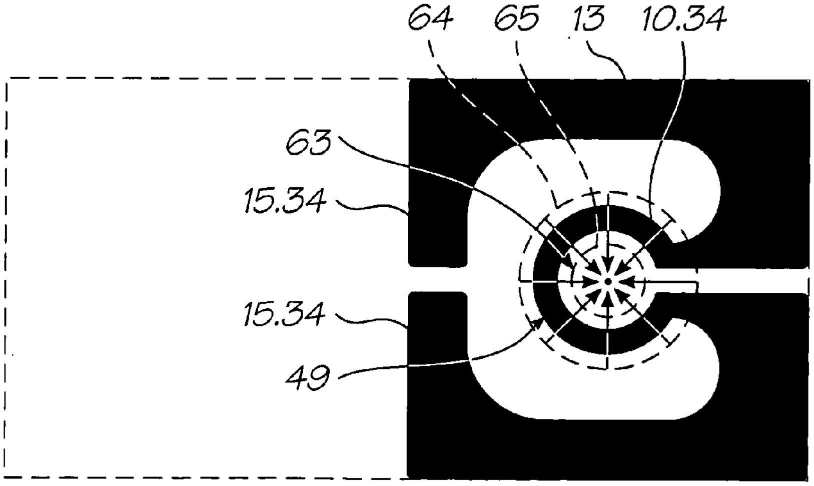
FIG. 34 is a schematic plan view of a mask suitable for use in performing the production stage for the printhead of FIG. 33 for forming the heater element thereof.

Turning briefly to FIG. 34, there is shown a mask 13 for forming a heater 14 of the printhead (which heater includes the element 10 referred to above), during a lithographic process, as described in more detail below. As the mask 13 is used to form the heater 14, the shape of various of its parts correspond to the shape of the element 10. The mask 13 therefore provides a useful reference by which to identify various parts of the heater 14. The heater 14 has electrodes 15 corresponding to the parts designated 15.34 of the mask 13 and a heater element 10 corresponding to the parts designated 10.34 of the mask. In operation, voltage is applied across the electrodes 15 to cause current to flow through the element 10. The electrodes 15 are much thicker than the element 10 so that most of the electrical resistance is provided by the element. Thus, nearly all of the power consumed in operating the heater 14 is dissipated via the element 10, in creating the thermal pulse referred to above.

When the element 10 is heated as described above, the bubble 12 forms along the length of the element, this bubble appearing, in the cross-sectional view of FIG. 1, as four bubble portions, one for each of the element portions shown in cross section.

The bubble 12, once generated, causes an increase in pressure within the chamber 7, which in turn causes the ejection of a drop 16 of the ink 11 through the nozzle 3. The rim 4 assists in directing the drop 16 as it is ejected, so as to minimize the chance of a drop misdirection.

The reason that there is only one nozzle 3 and chamber 7 per inlet passage 9 is so that the pressure wave generated within the chamber, on heating of the element 10 and forming of a bubble 12, does not effect adjacent chambers and their corresponding nozzles.

The advantages of the heater element 10 being suspended rather than being embedded in any solid material, is discussed below.

Figure 2:
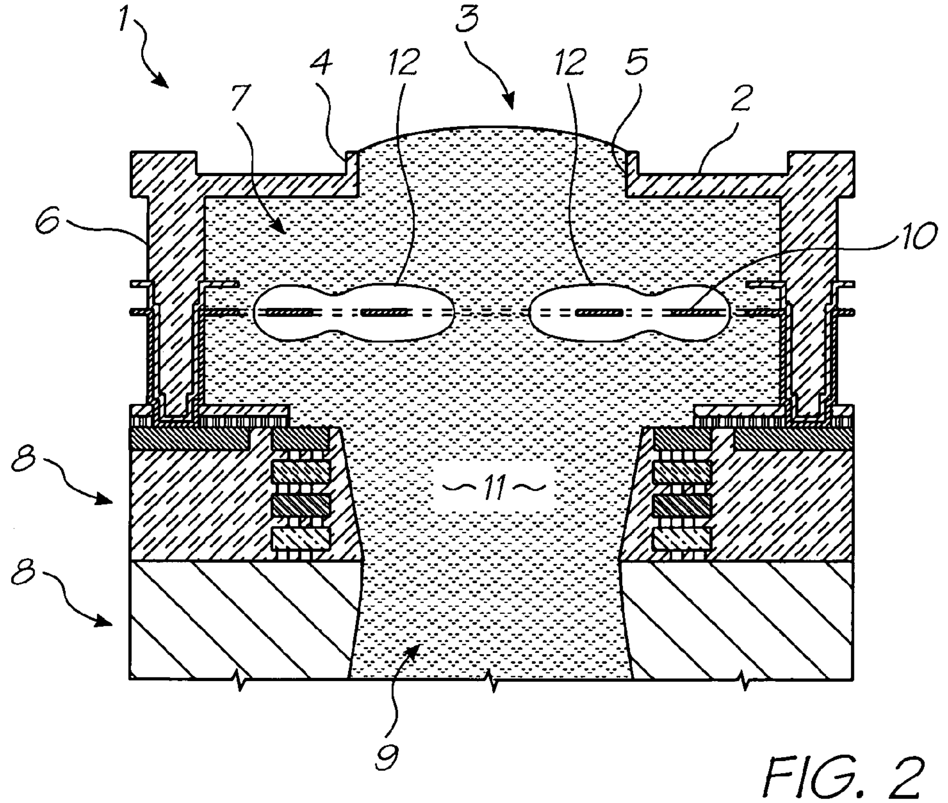
FIG. 2 is a schematic cross-sectional view through the ink chamber FIG. 1, at another stage of operation.
Figure 3:
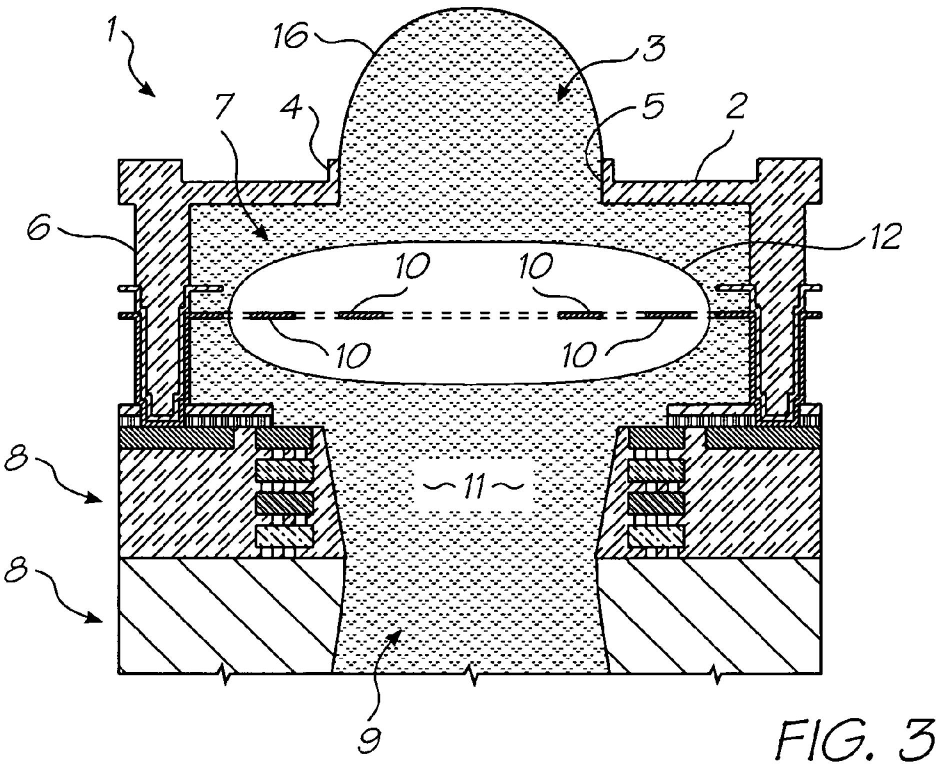
FIG. 3 is a schematic cross-sectional view through the ink chamber FIG. 1, at yet another stage of operation.

FIGS. 2 and 3 show the unit cell 1 at two successive later stages of operation of the printhead. It can be seen that the bubble 12 generates further, and hence grows, with the resultant advancement of ink 11 through the nozzle 3. The shape of the bubble 12 as it grows, as shown in FIG. 3, is determined by a combination of the inertial dynamics and the surface tension of the ink 11. The surface tension tends to minimize the surface area of the bubble 12 so that, by the time a certain amount of liquid has evaporated, the bubble is essentially disk-shaped.

The increase in pressure within the chamber 7 not only pushes ink 11 out through the nozzle 3, but also pushes some ink back through the inlet passage 9. However, the inlet passage 9 is approximately 200 to 300 microns in length, and is only approximately 16 microns in diameter. Hence there is a substantial viscous drag. As a result, the predominant effect of the pressure rise in the chamber 7 is to force ink out through the nozzle 3 as an ejected drop 16, rather than back through the inlet passage 9.

Figure 4:
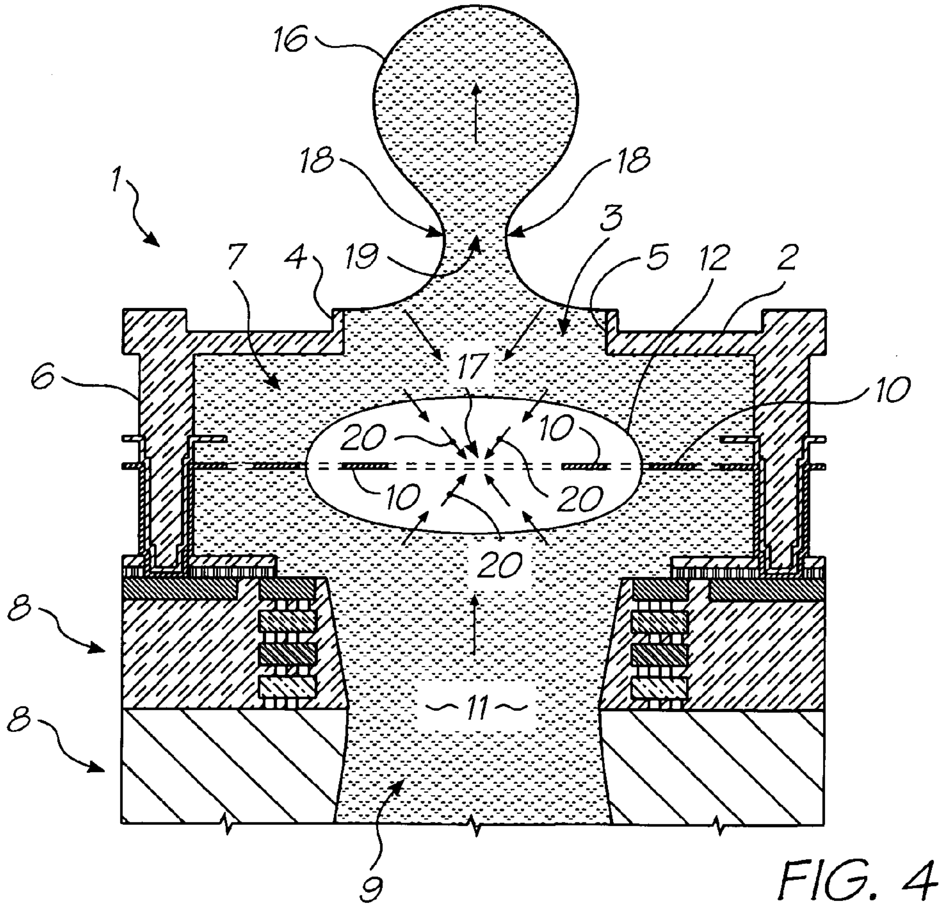
FIG. 4 is a schematic cross-sectional view through the ink chamber FIG. 1, at yet a further stage of operation.
Figure 5:
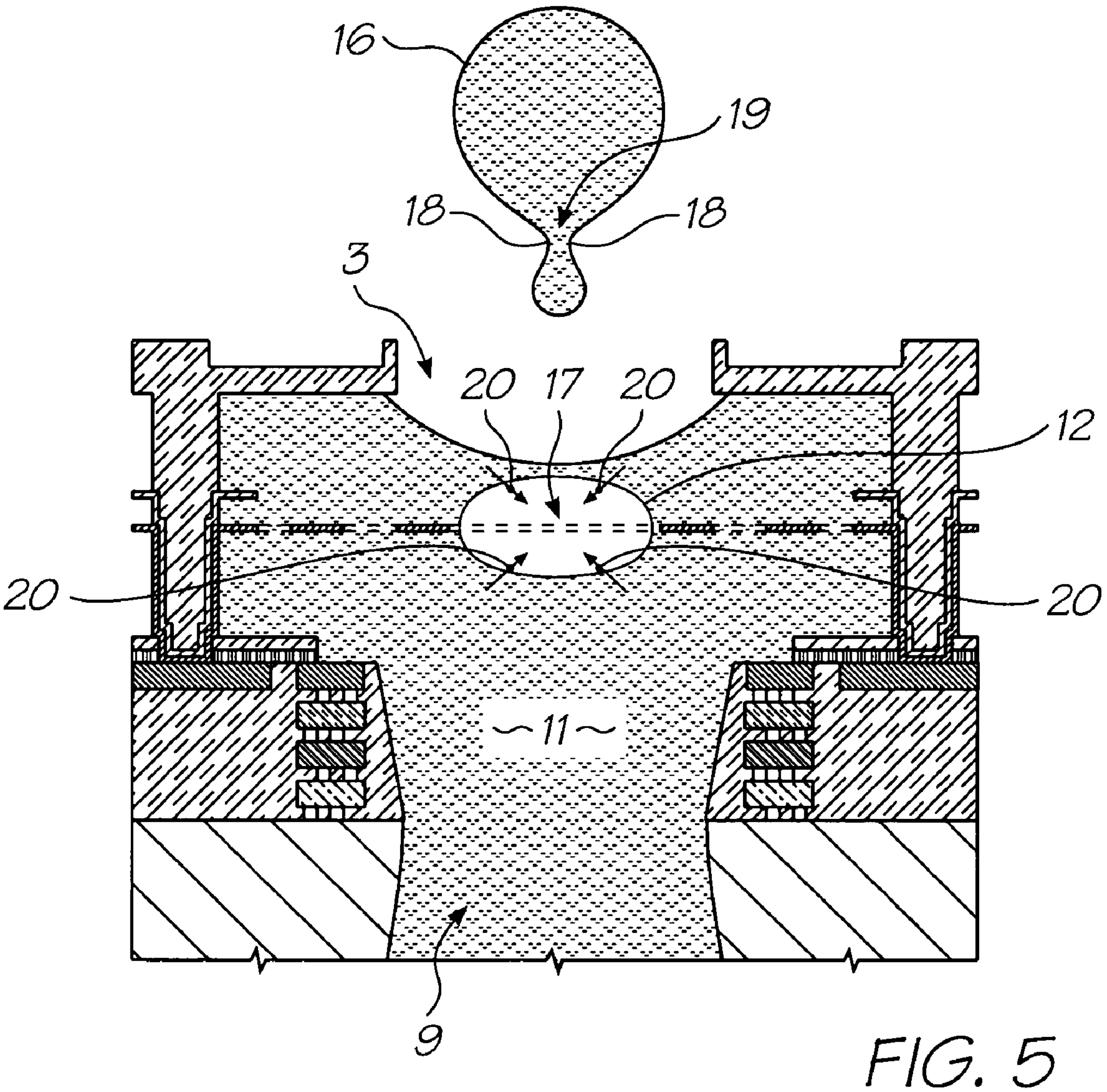
FIG. 5 is a diagrammatic cross-sectional view through a unit cell of a printhead in accordance with the an embodiment of the invention showing the collapse of a vapor bubble.

Turning now to FIG. 4, the printhead is shown at a still further successive stage of operation, in which the ink drop 16 that is being ejected is shown during its "necking phase" before the drop breaks off. At this stage, the bubble 12 has already reached its maximum size and has then begun to collapse towards the point of collapse 17, as reflected in more detail in FIG. 5.

The collapsing of the bubble 12 towards the point of collapse 17 causes some ink 11 to be drawn from within the nozzle 3 (from the sides 18 of the drop), and some to be drawn from the inlet passage 9, towards the point of collapse. Most of the ink 11 drawn in this manner is drawn from the nozzle 3, forming an annular neck 19 at the base of the drop 16 prior to its breaking off.

The drop 16 requires a certain amount of momentum to overcome surface tension forces, in order to break off. As ink 11 is drawn from the nozzle 3 by the collapse of the bubble 12, the diameter of the neck 19 reduces thereby reducing the amount of total surface tension holding the drop, so that the momentum of the drop as it is ejected out of the nozzle is sufficient to allow the drop to break off.

When the drop 16 breaks off, cavitation forces are caused as reflected by the arrows 20, as the bubble 12 collapses to the point of collapse 17. It will be noted that there are no solid surfaces in the vicinity of the point of collapse 17 on which the cavitation can have an effect.

Manufacturing Process

Relevant parts of the manufacturing process of a printhead according to embodiments of the invention are now described with reference to FIGS. 6 to 29.

Figure 6:
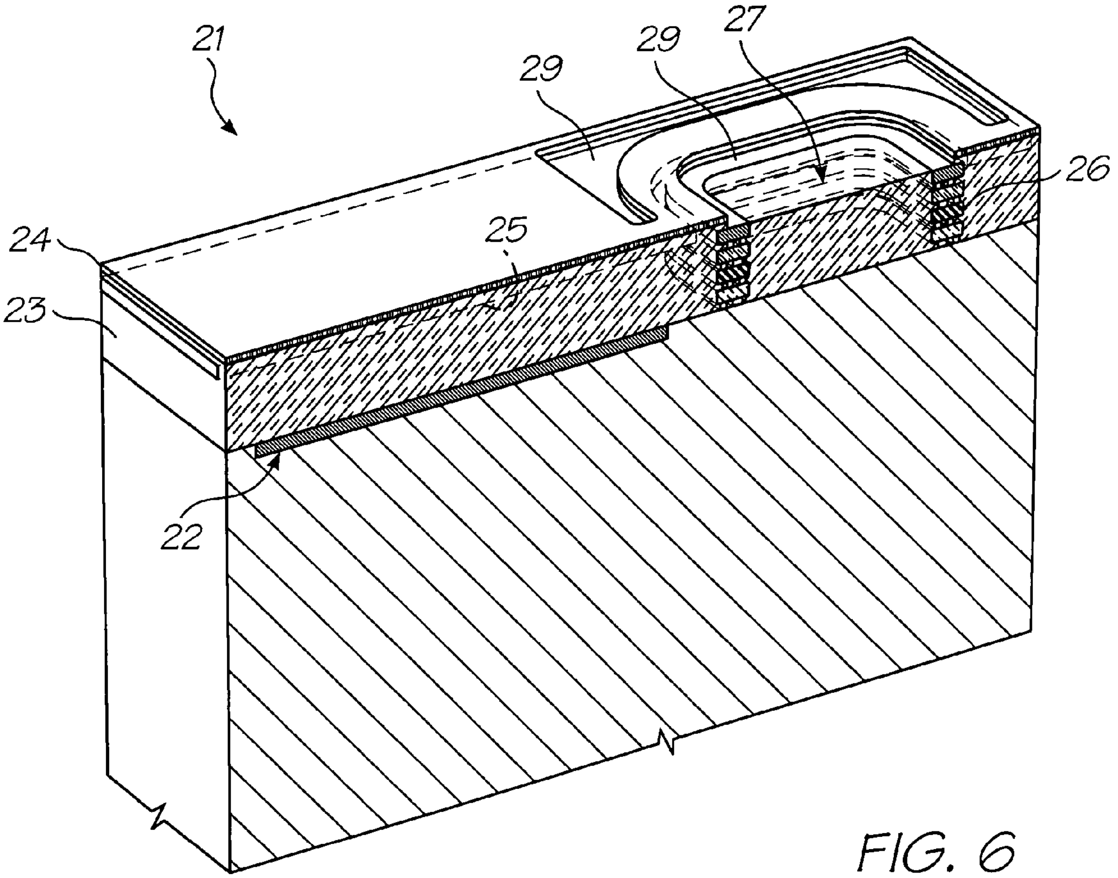
FIGS. 6, 8, 10, 11, 13, 14, 16, 18, 19, 21, 23, 24, 26, 28 and 30 are schematic perspective views (FIG. 30 being partly cut away) of a unit cell of a printhead in accordance with an embodiment of the invention, at various successive stages in the production process of the printhead.
Figure 7:
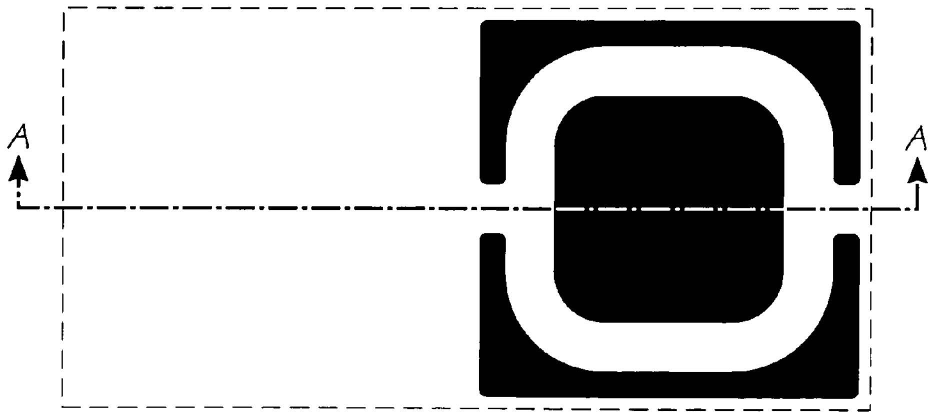
FIGS. 7, 9, 12, 15, 17, 20, 22, 25, 27, 29 and 31 are each schematic plan views of a mask suitable for use in performing the production stage for the printhead, as represented in the respective immediately preceding figures.

Referring to FIG. 6, there is shown a cross-section through a silicon substrate portion 21, being a portion of a Memjet printhead, at an intermediate stage in the production process thereof. This figure relates to that portion of the printhead corresponding to a unit cell 1. The description of the manufacturing process that follows will be in relation to a unit cell 1, although it will be appreciated that the process will be applied to a multitude of adjacent unit cells of which the whole printhead is composed.

FIG. 6 represents the next successive step, during the manufacturing process, after the completion of a standard CMOS fabrication process, including the fabrication of CMOS drive transistors (not shown) in the region 22 in the substrate portion 21, and the completion of standard CMOS interconnect layers 23 and passivation layer 24. Wiring indicated by the dashed lines 25 electrically interconnects the transistors and other drive circuitry (also not shown) and the heater element corresponding to the nozzle.

Guard rings 26 are formed in the metallization of the interconnect layers 23 to prevent ink 11 from diffusing from the region, designated 27, where the nozzle of the unit cell 1 will be formed, through the substrate portion 21 to the region containing the wiring 25, and corroding the CMOS circuitry disposed in the region designated 22.

The first stage after the completion of the CMOS fabrication process consists of etching a portion of the passivation layer 24 to form the passivation recesses 29.

Figure 8:
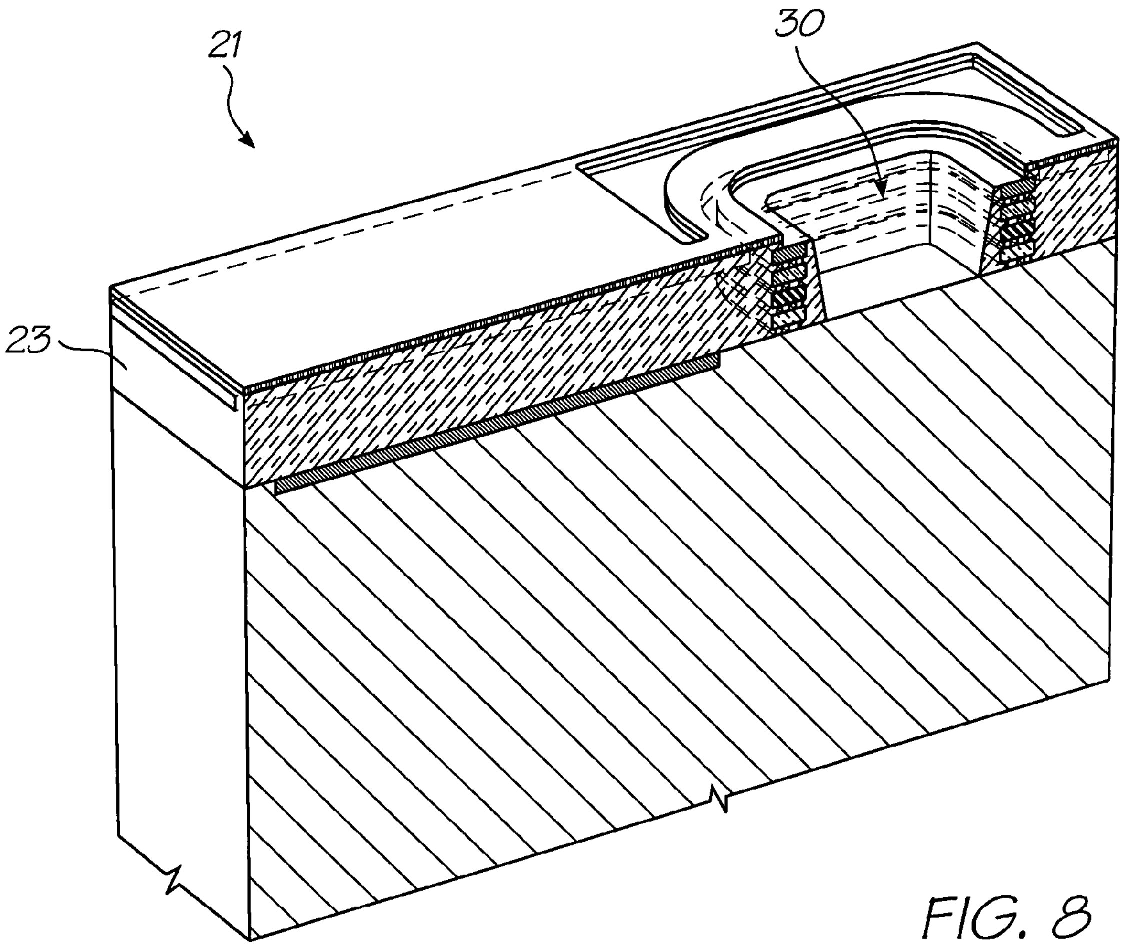
Figure 9:
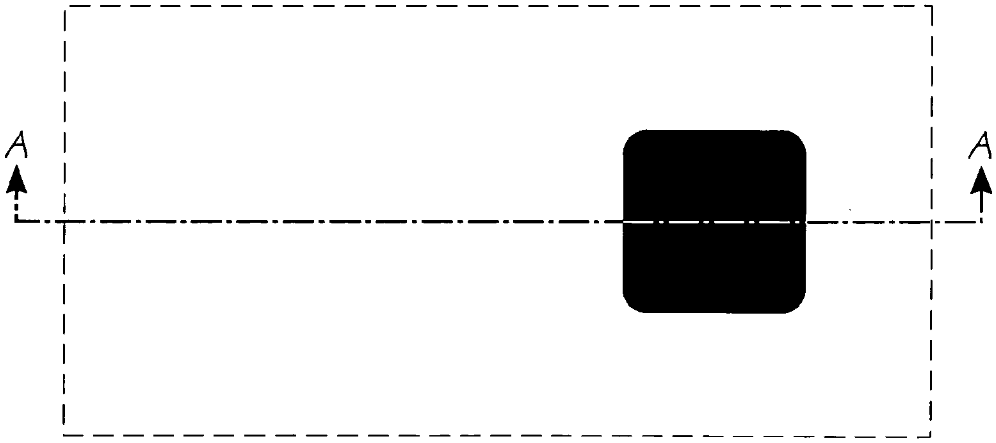

FIG. 8 shows the stage of production after the etching of the interconnect layers 23, to form an opening 30. The opening 30 is to constitute the ink inlet passage to the chamber that will be formed later in the process.

Figure 10:
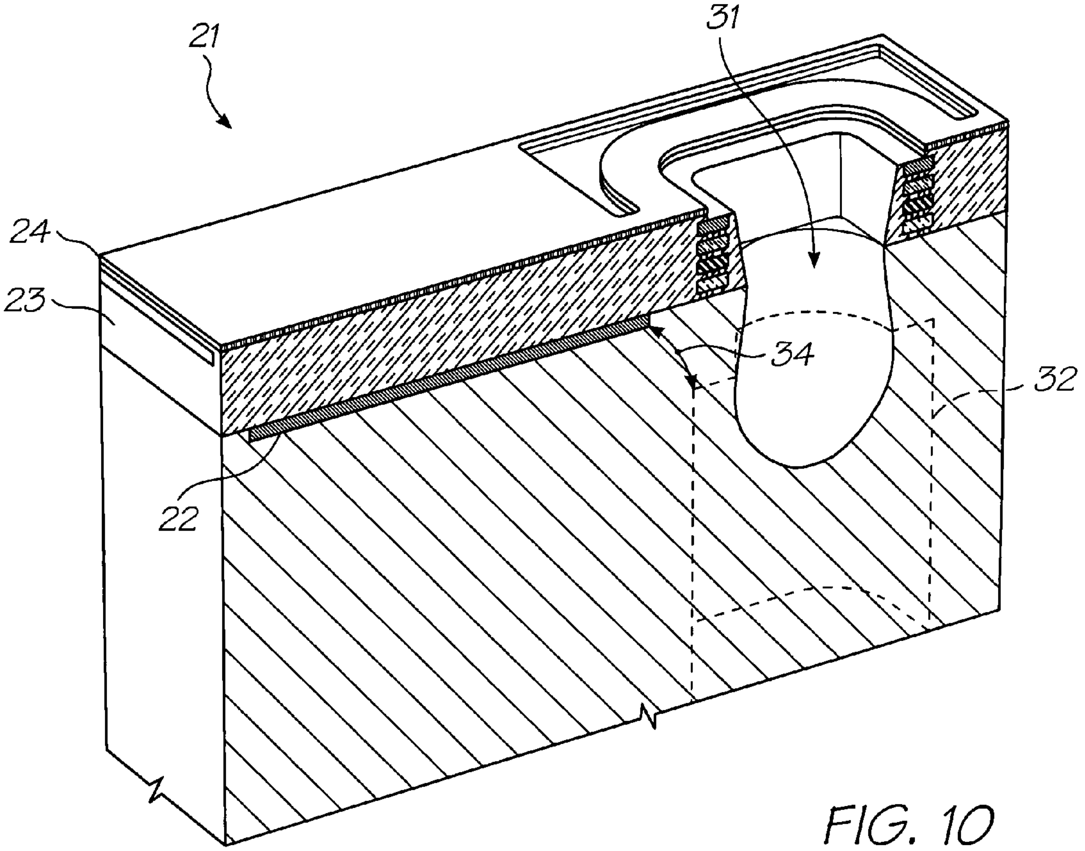

FIG. 10 shows the stage of production after the etching of a hole 31 in the substrate portion 21 at a position where the nozzle 3 is to be formed. Later in the production process, a further hole (indicated by the dashed line 32) will be etched from the other side (not shown) of the substrate portion 21 to join up with the hole 31, to complete the inlet passage to the chamber. Thus, the hole 32 will not have to be etched all the way from the other side of the substrate portion 21 to the level of the interconnect layers 23.

If, instead, the hole 32 were to be etched all the way to the interconnect layers 23, then to avoid the hole 32 being etched so as to destroy the transistors in the region 22, the hole 32 would have to be etched a greater distance away from that region so as to leave a suitable margin (indicated by the arrow 34) for etching inaccuracies. But the etching of the hole 31 from the top of the substrate portion 21, and the resultant shortened depth of the hole 32, means that a lesser margin 34 need be left, and that a substantially higher packing density of nozzles can thus be achieved.

Figure 11:
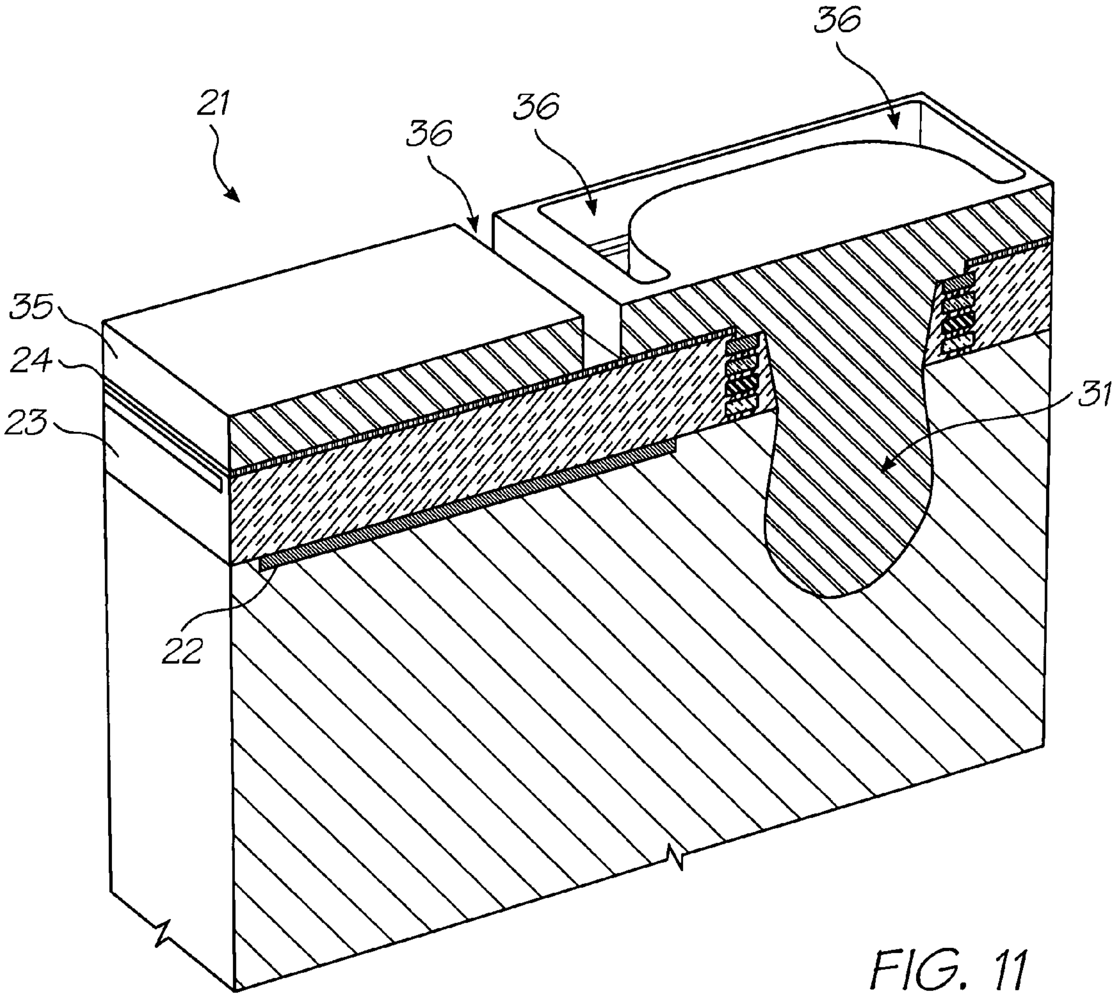
Figure 12:
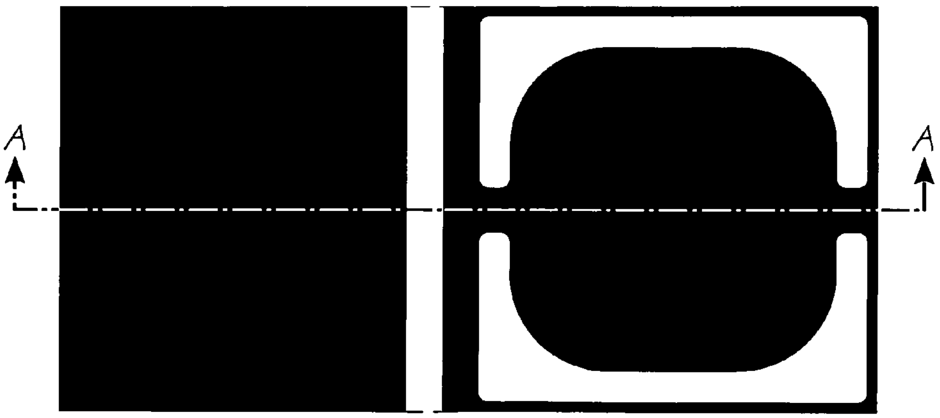

FIG. 11 shows the stage of production after a four micron thick layer 35 of a sacrificial resist has been deposited on the layer 24. This layer 35 fills the hole 31 and now forms part of the structure of the printhead. The resist layer 35 is then exposed with certain patterns (as represented by the mask shown in FIG. 12) to form recesses 36 and a slot 37. This provides for the formation of contacts for the electrodes 15 of the heater element to be formed later in the production process. The slot 37 will provide, later in the process, for the formation of the nozzle walls 6, that will define part of the chamber 7.

Figure 13:
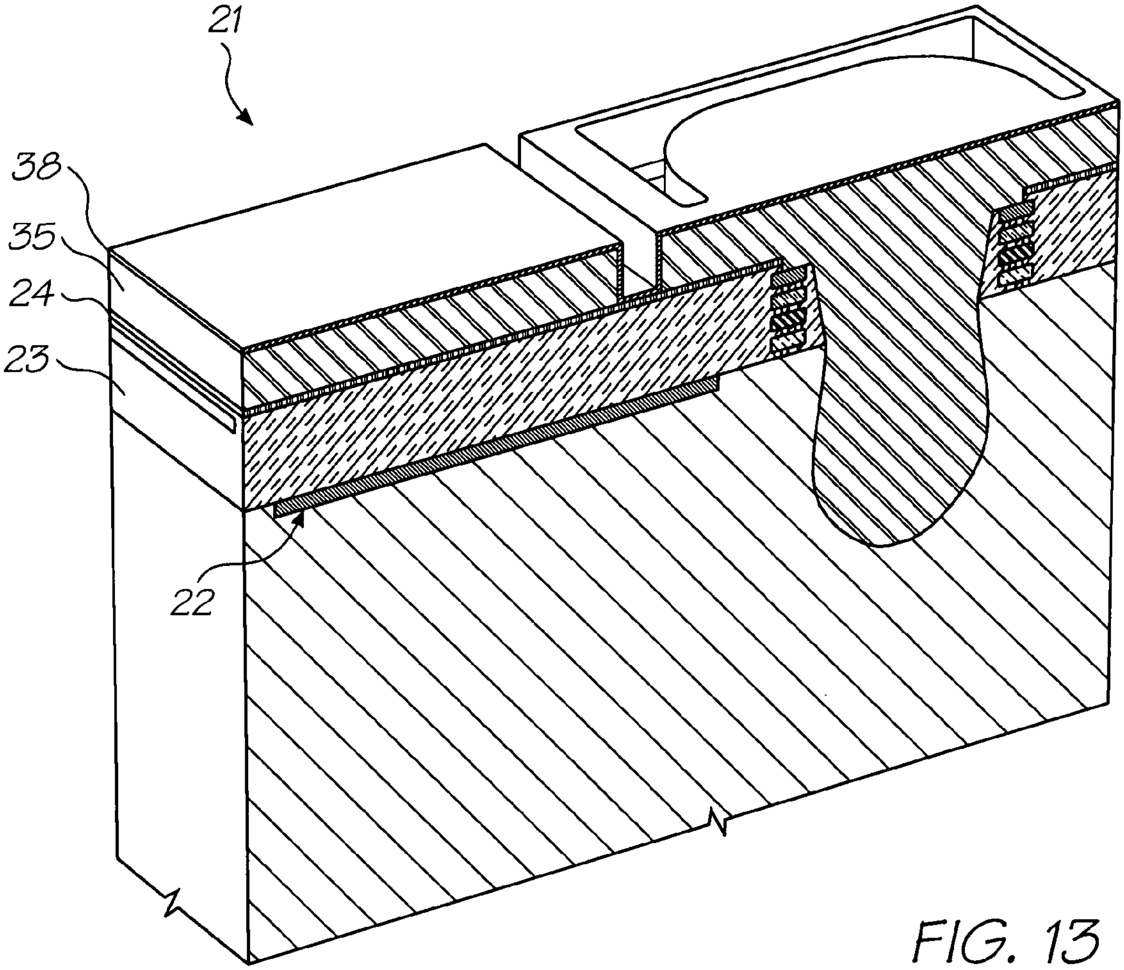

FIG. 13 shows the stage of production after the deposition, on the layer 35, of a 0.25 micron thick layer 38 of heater material, which, in the present embodiment, is of titanium nitride.

Figure 14:
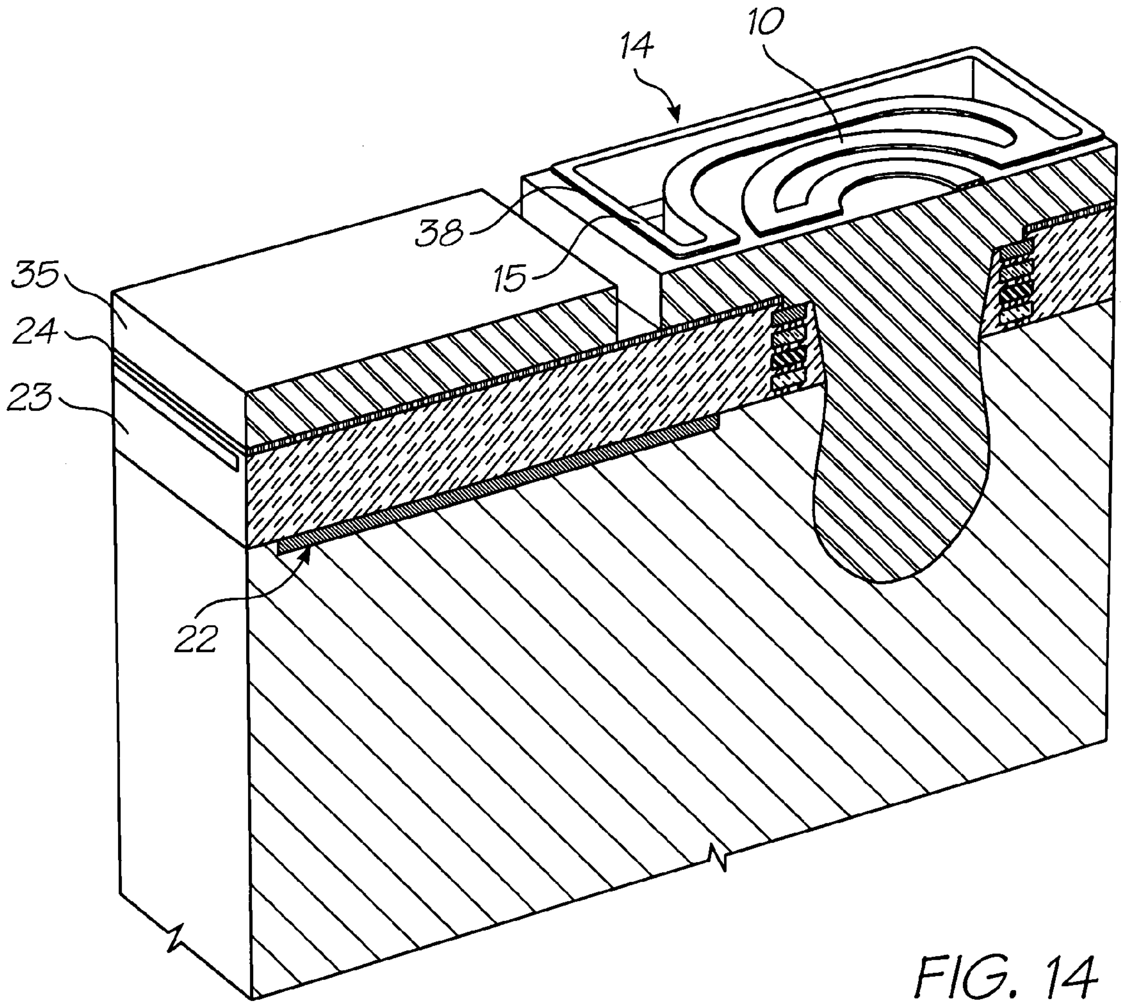
Figure 15:
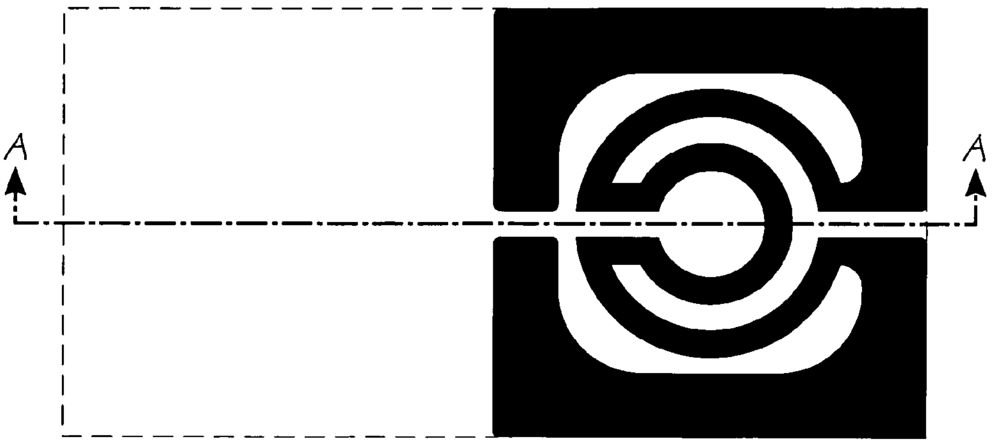

FIG. 14 shows the stage of production after patterning and etching of the heater layer 38 to form the heater 14, including the heater element 10 and electrodes 15.

Figure 16:
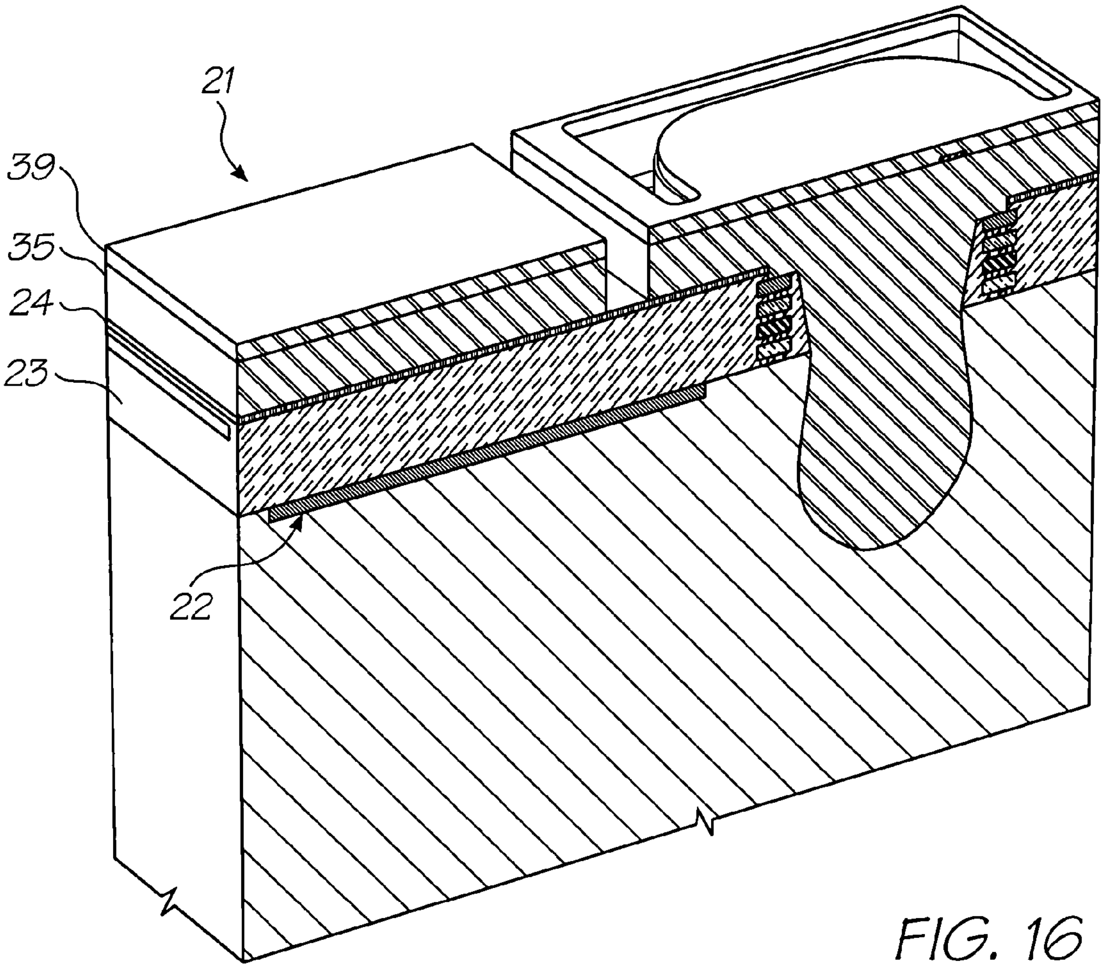
Figure 17:
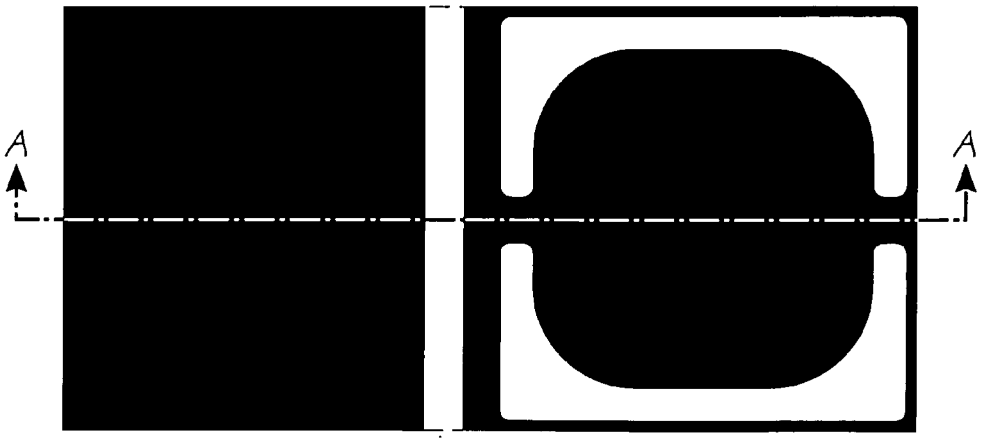

FIG. 16 shows the stage of production after another sacrificial resist layer 39, about 1 micron thick, has been added.

Figure 18:
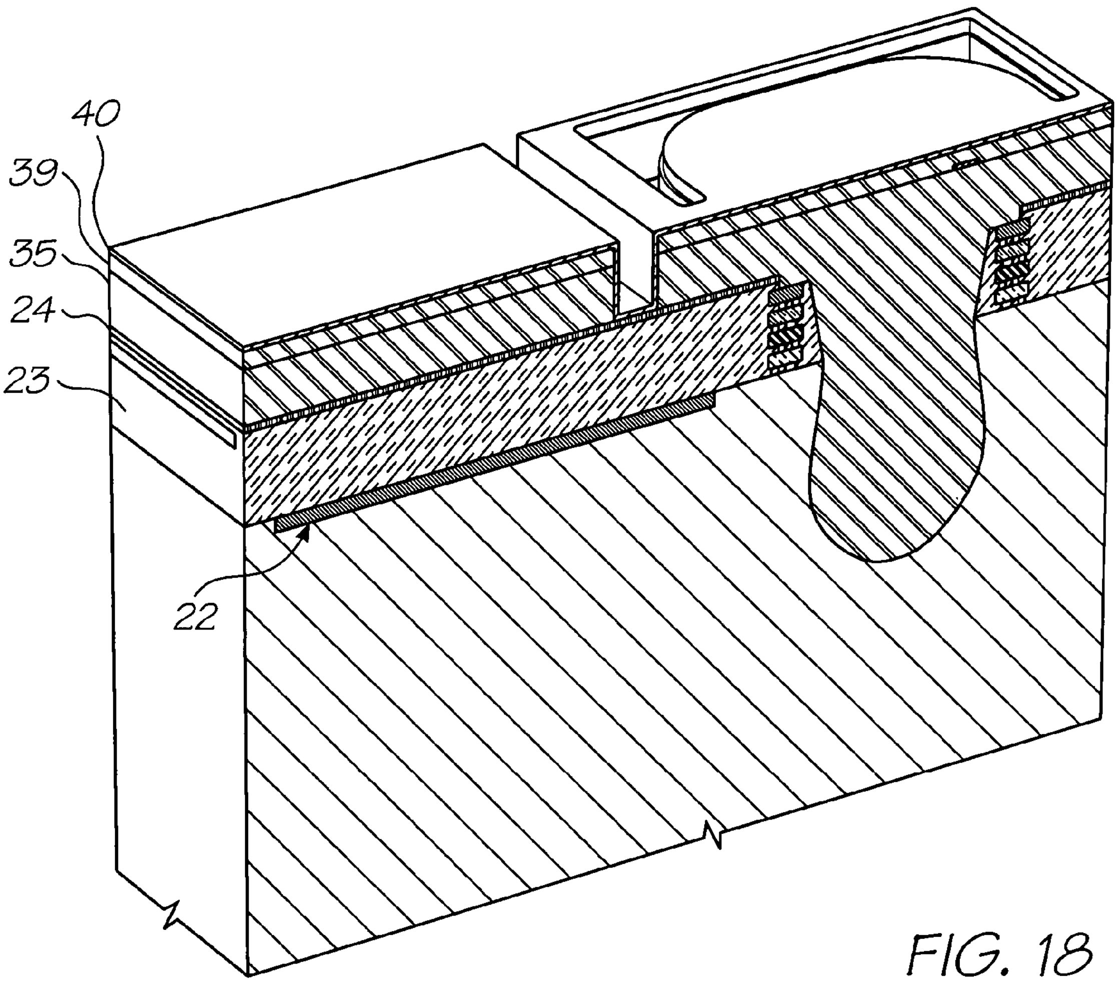

FIG. 18 shows the stage of production after a second layer 40 of heater material has been deposited. In a preferred embodiment, this layer 40, like the first heater layer 38, is of 0.25 micron thick titanium nitride.

Figure 19:
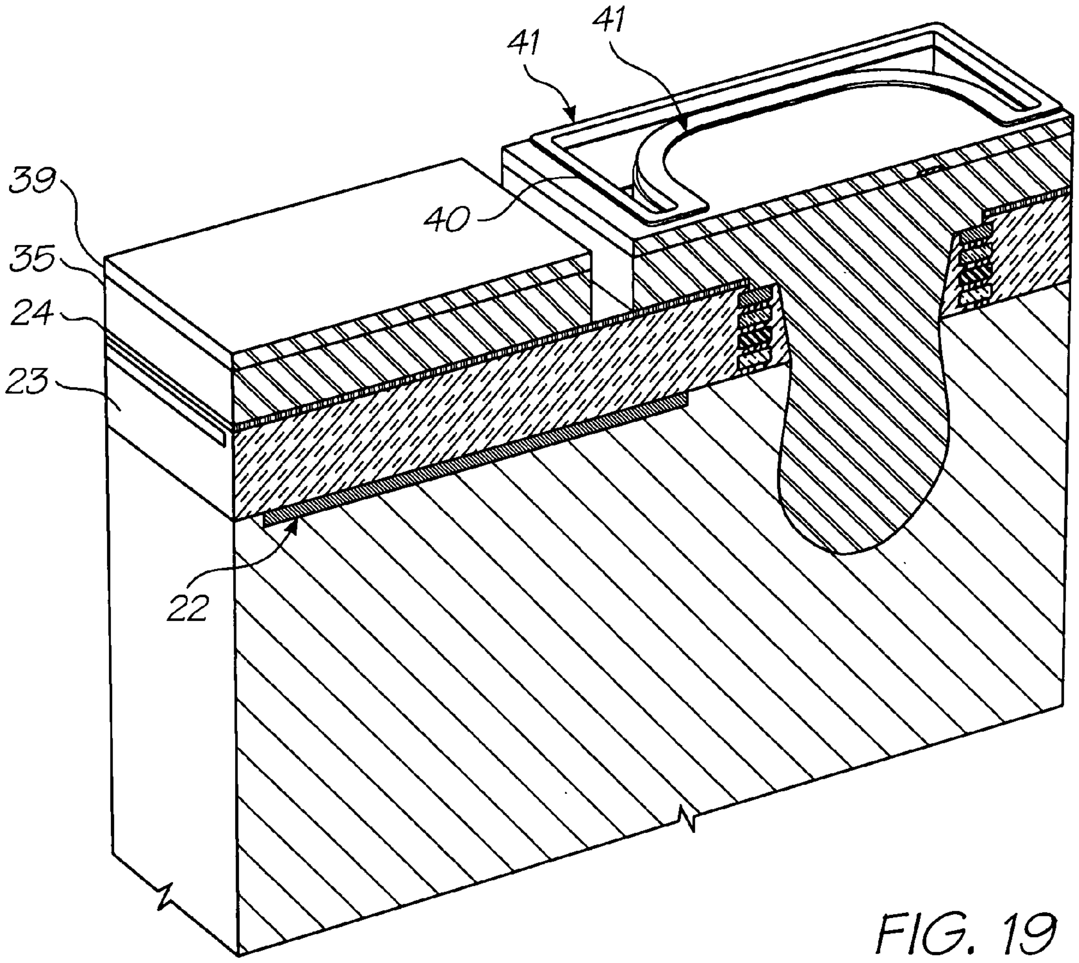
Figure 20:
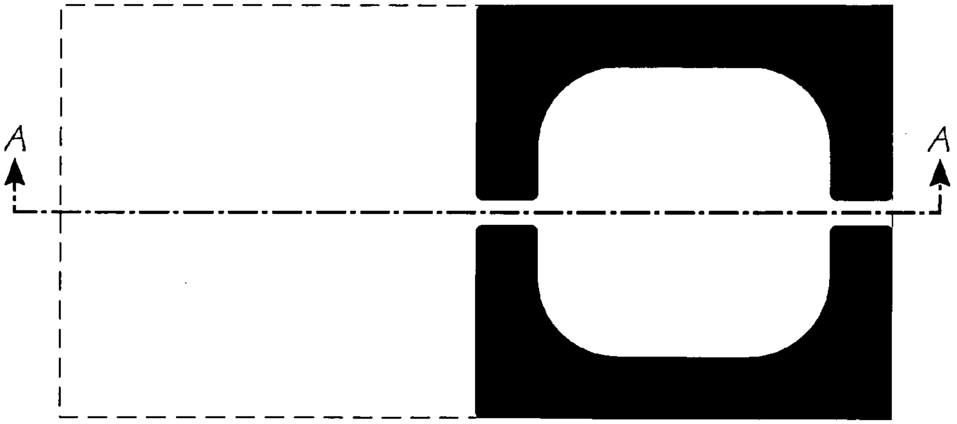

FIG. 19 then shows this second layer 40 of heater material after it has been etched to form the pattern as shown, indicated by reference numeral 41. In this illustration, this patterned layer does not include a heater layer element 10, and in this sense has no heater functionality. However, this layer of heater material does assist in reducing the resistance of the electrodes 15 of the heater 14 so that, in operation, less energy is consumed by the electrodes which allows greater energy consumption by, and therefore greater effectiveness of, the heater elements 10. In the dual heater embodiment illustrated in FIG. 38, the corresponding layer 40 does contain a heater 14.

Figure 21:
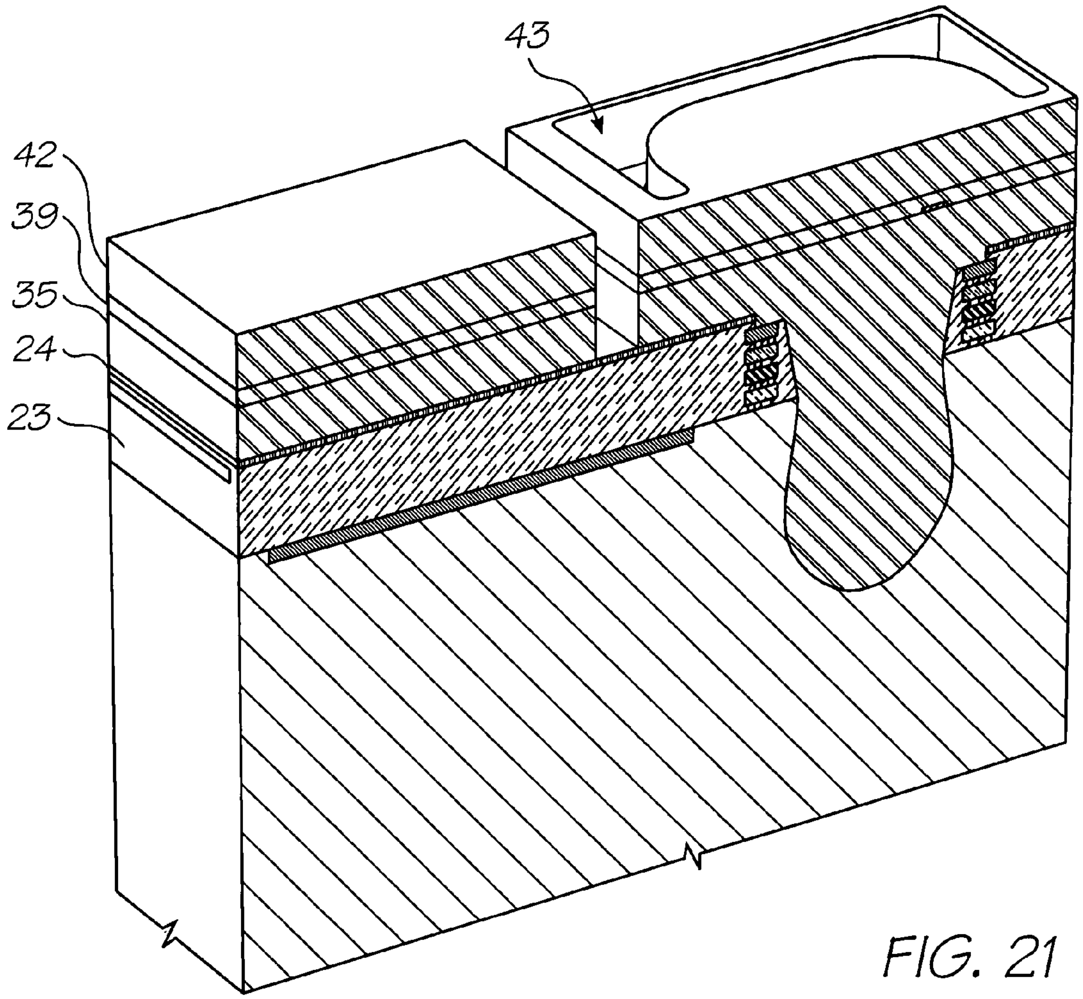
Figure 22:
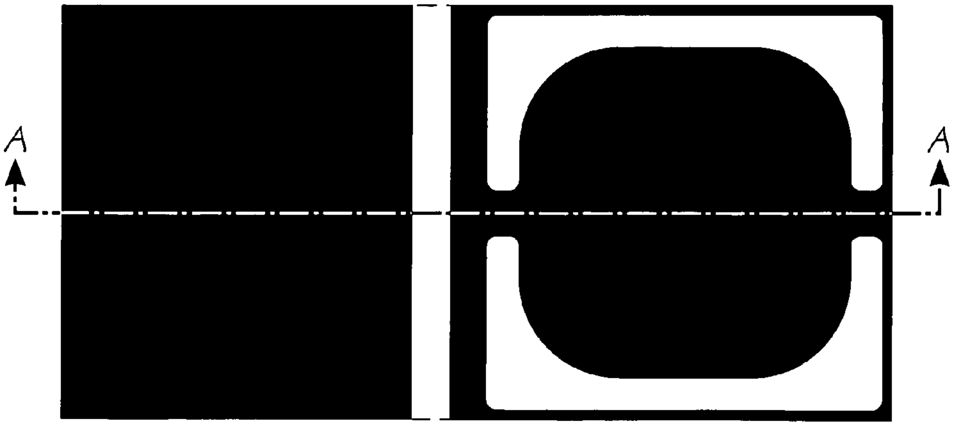

FIG. 21 shows the stage of production after a third layer 42, of sacrificial resist, has been deposited. As the uppermost level of this layer will constitute the inner surface of the nozzle plate 2 to be formed later, and hence the inner extent of the nozzle aperture 5, the height of this layer 42 must be sufficient to allow for the formation of a bubble 12 in the region designated 43 during operation of the printhead.

Figure 23:
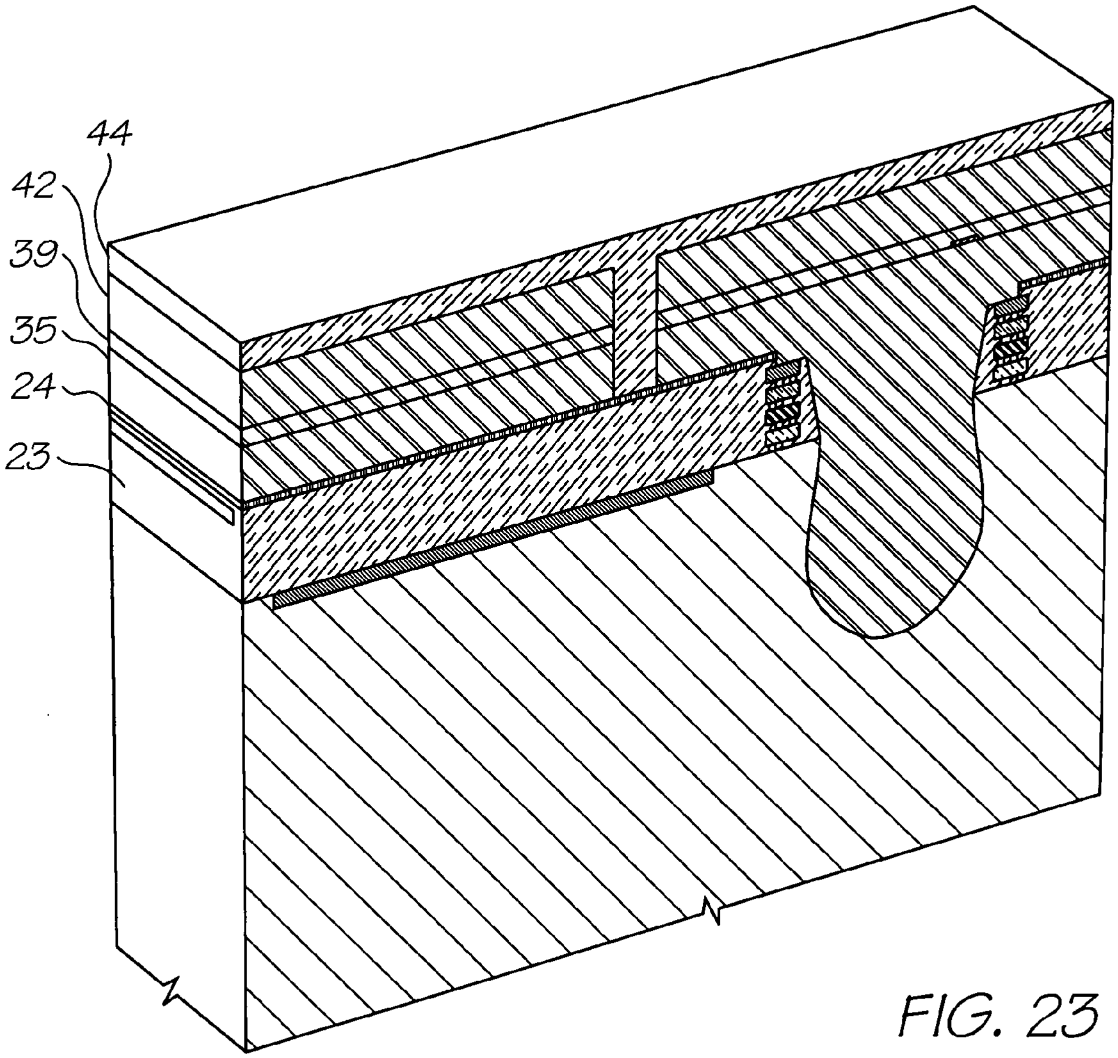

FIG. 23 shows the stage of production after the roof layer 44 has been deposited, that is, the layer which will constitute the nozzle plate 2. Instead of being formed from 100 micron thick polyimide film, the nozzle plate 2 is formed of silicon nitride, just 2 microns thick.

Figure 24:
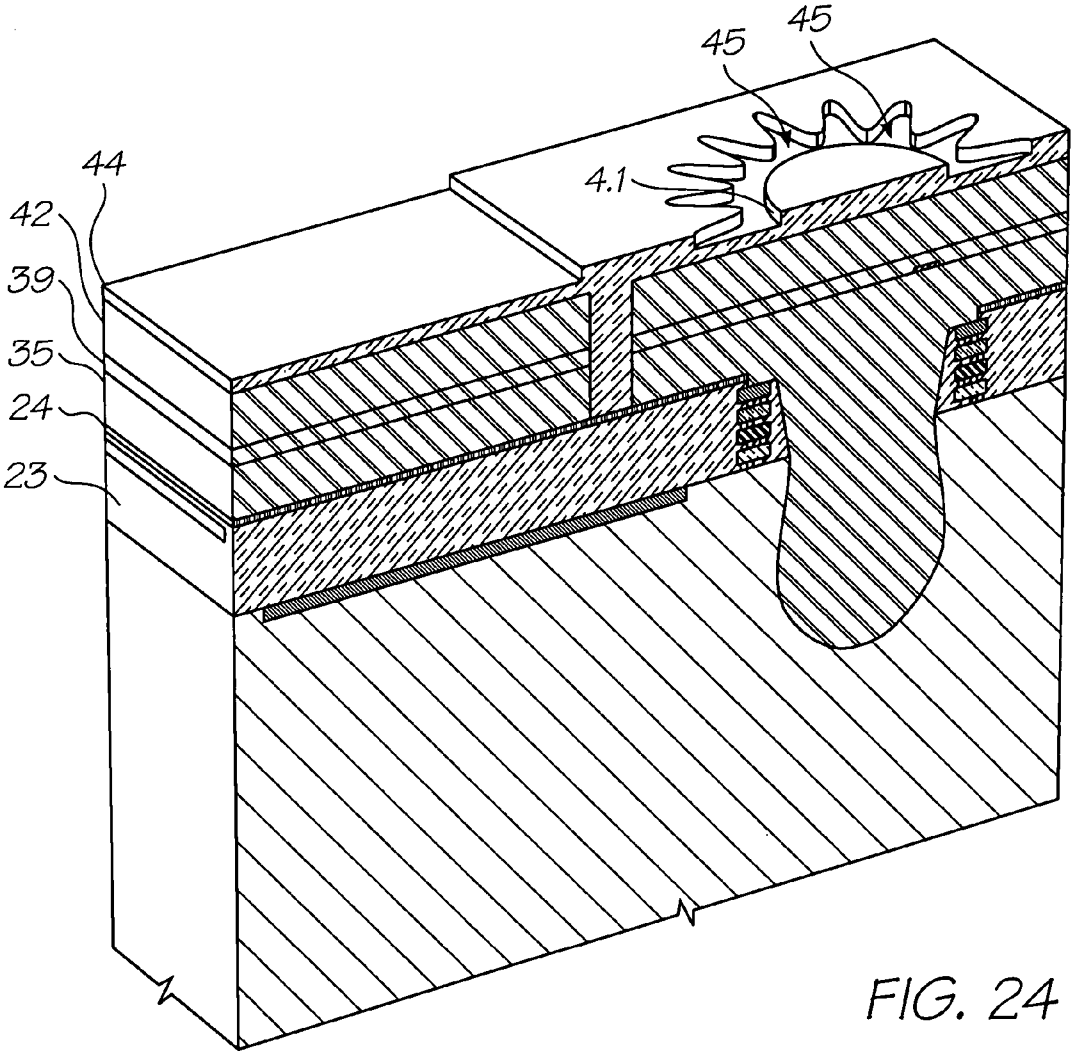
Figure 25:
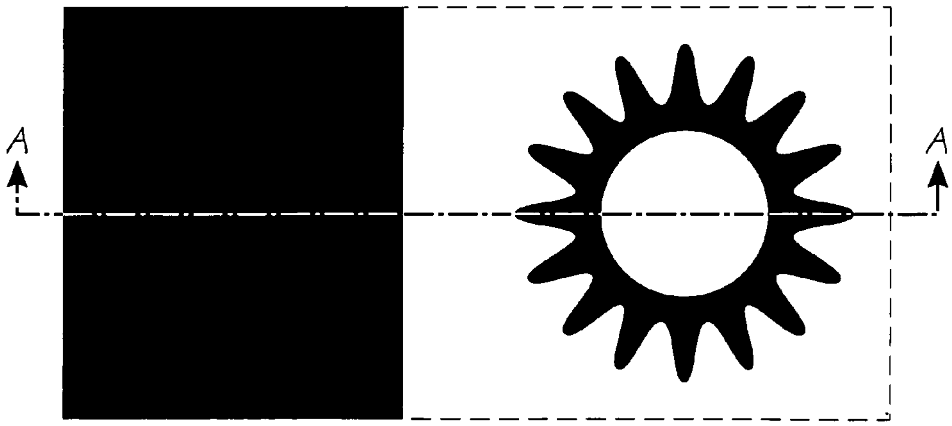

FIG. 24 shows the stage of production after the chemical vapor deposition (CVD) of silicon nitride forming the layer 44, has been partly etched at the position designated 45, so as to form the outside part of the nozzle rim 4, this outside part being designated 4.1.

Figure 26:
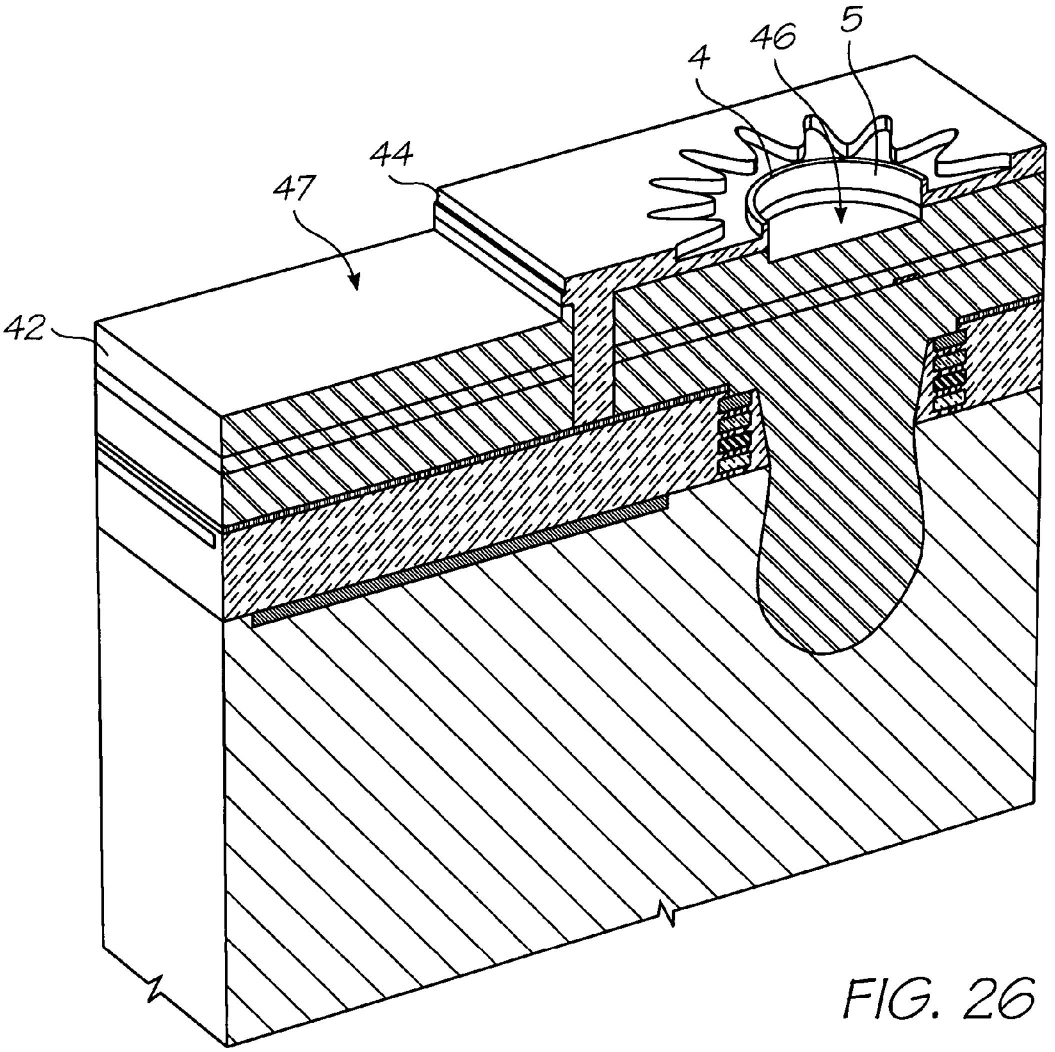
Figure 27:
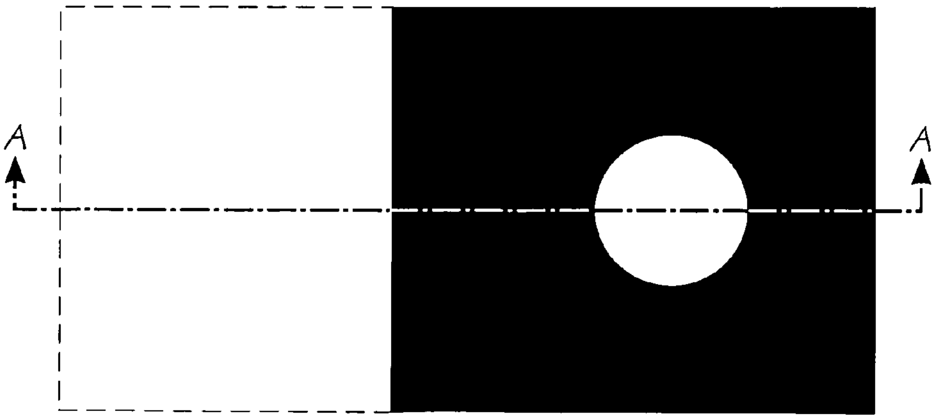

FIG. 26 shows the stage of production after the CVD of silicon nitride has been etched all the way through at 46, to complete the formation of the nozzle rim 4 and to form the nozzle aperture 5, and after the CVD silicon nitride has been removed at the position designated 47 where it is not required.

Figure 28:
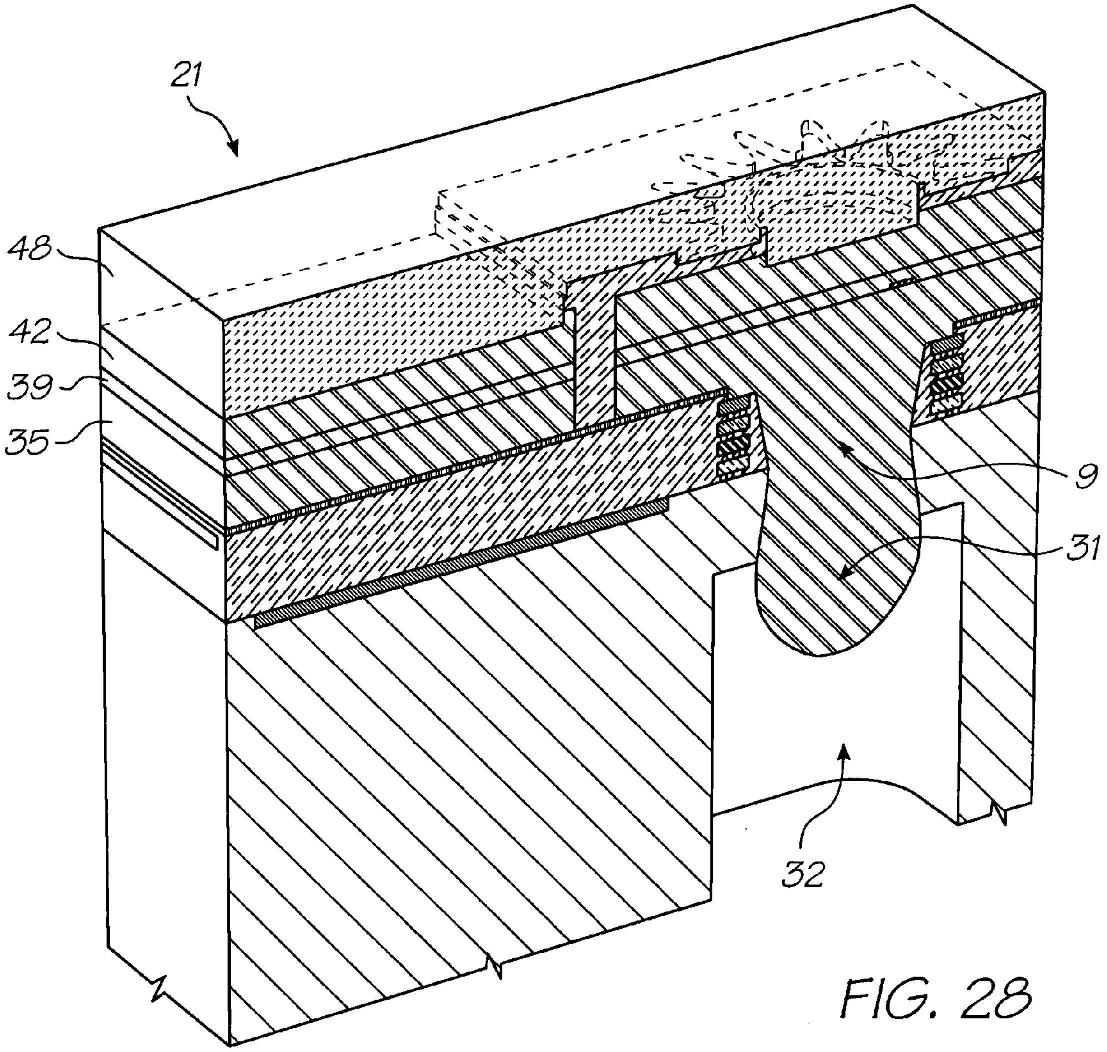
Figure 29:
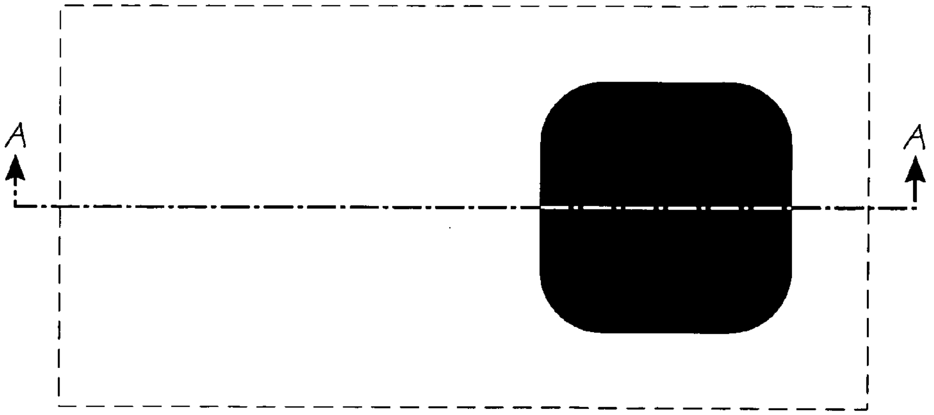

FIG. 28 shows the stage of production after a protective layer 48 of resist has been applied. After this stage, the substrate portion 21 is then ground from its other side (not shown) to reduce the substrate portion from its nominal thickness of about 800 microns to about 200 microns, and then, as foreshadowed above, to etch the hole 32. The hole 32 is etched to a depth such that it meets the hole 31.

Figure 30:
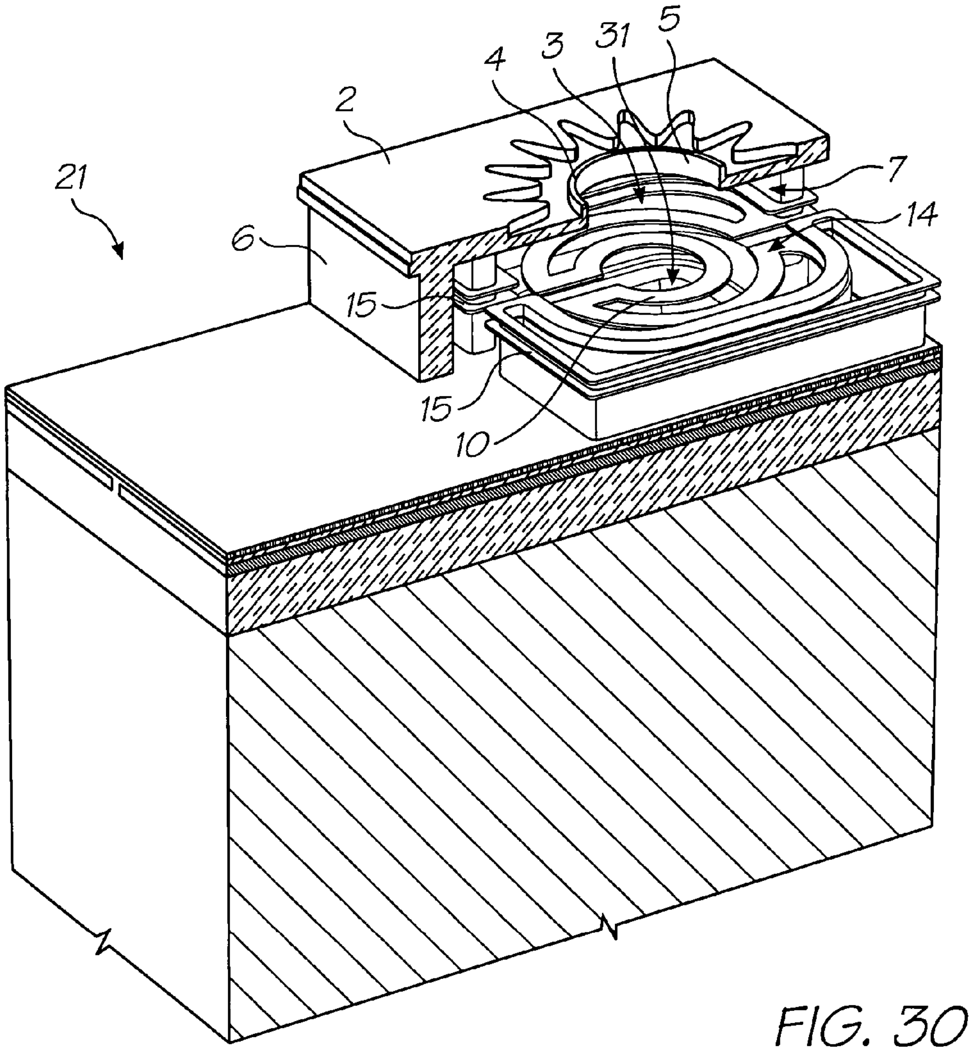

Then, the sacrificial resist of each of the resist layers 35, 39, 42 and 48, is removed using oxygen plasma, to form the structure shown in FIG. 30, with walls 6 and nozzle plate 2 which together define the chamber 7 (part of the walls and nozzle plate being shown cut-away). It will be noted that this also serves to remove the resist filling the hole 31 so that this hole, together with the hole 32 (not shown in FIG. 30), define a passage extending from the lower side of the substrate portion 21 to the nozzle 3, this passage serving as the ink inlet passage, generally designated 9, to the chamber 7.

While the above production process is used to produce the embodiment of the printhead shown in FIG. 30, further printhead embodiments, having different heater structures, are shown in FIG. 33, FIGS. 35 and 37, and FIGS. 38 and 40.

Control of Ink Drop Ejection

Referring once again to FIG. 30, the unit cell 1 shown, as mentioned above, is shown with part of the walls 6 and nozzle plate 2 cut-away, which reveals the interior of the chamber 7. The heater 14 is not shown cut away, so that both halves of the heater element 10 can be seen.

In operation, ink 11 passes through the ink inlet passage 9 (see FIG. 28) to fill the chamber 7. Then a voltage is applied across the electrodes 15 to establish a flow of electric current through the heater element 10. This heats the element 10, as described above in relation to FIG. 1, to form a vapor bubble in the ink within the chamber 7.

The various possible structures for the heater 14, some of which are shown in FIGS. 33, 35 and 37, and 38, can result in there being many variations in the ratio of length to width of the heater elements 10. Such variations (even though the surface area of the elements 10 may be the same) may have significant effects on the electrical resistance of the elements, and therefore on the balance between the voltage and current to achieve a certain power of the element.

Modern drive electronic components tend to require lower drive voltages than earlier versions, with lower resistances of drive transistors in their "on" state. Thus, in such drive transistors, for a given transistor area, there is a tendency to higher current capability and lower voltage tolerance in each process generation.

Figure 35:
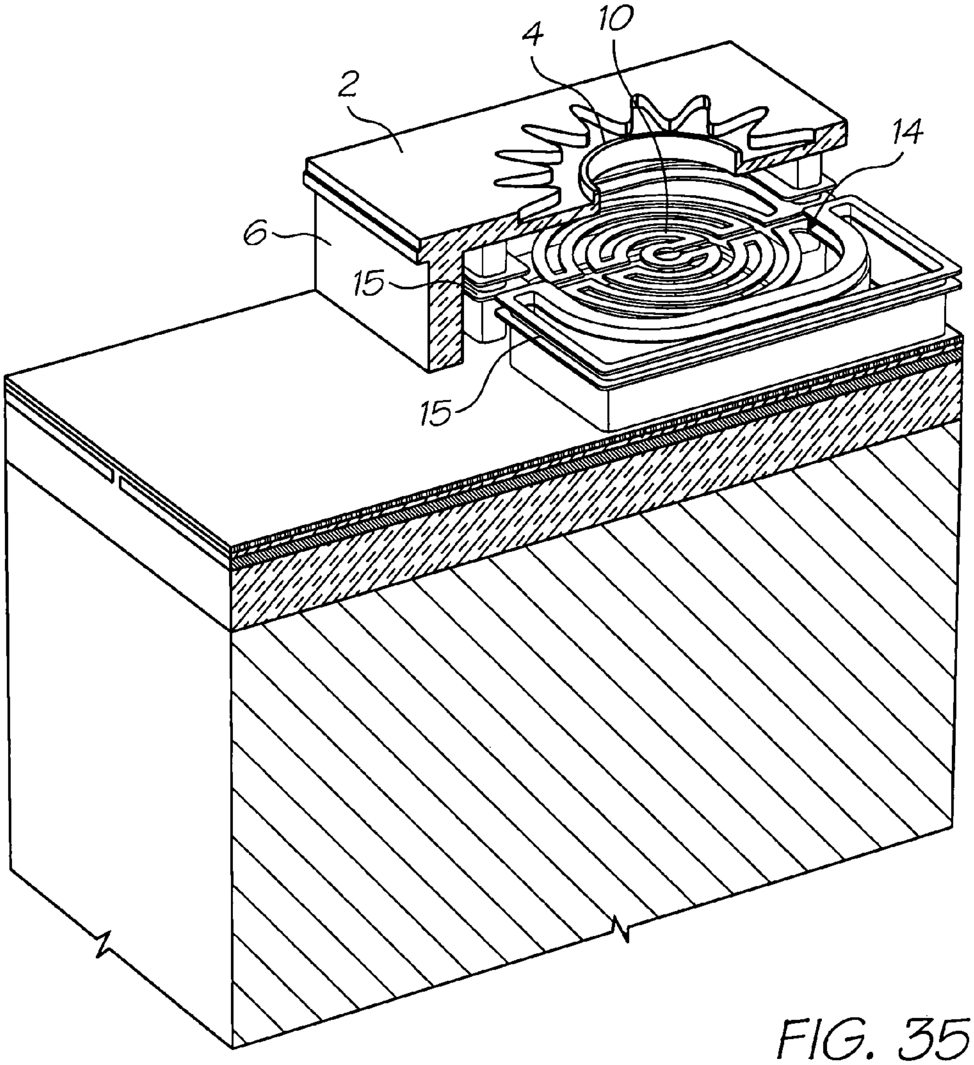
FIG. 35 is a schematic perspective view, partly cut away, of a unit cell of a printhead according to the invention having a further particular embodiment of heater element.
Figure 36:
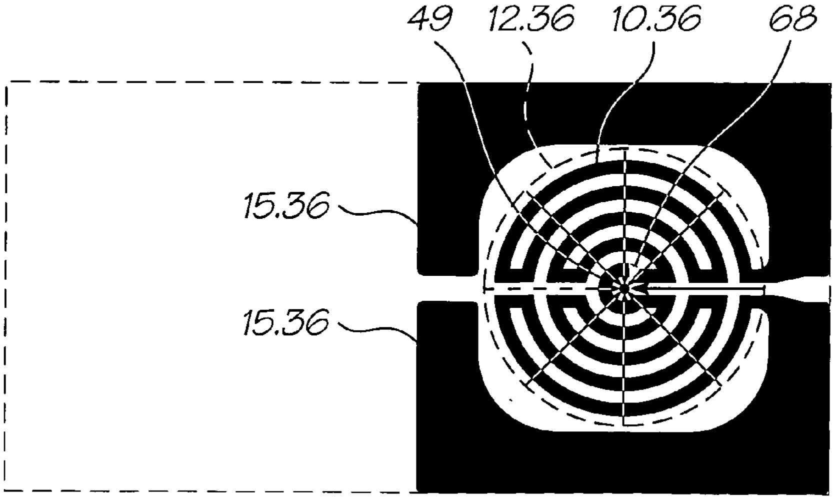
FIG. 36 is a schematic plan view of a mask suitable for use in performing the production stage for the printhead of FIG. 35 for forming the heater element thereof.
Figure 37:
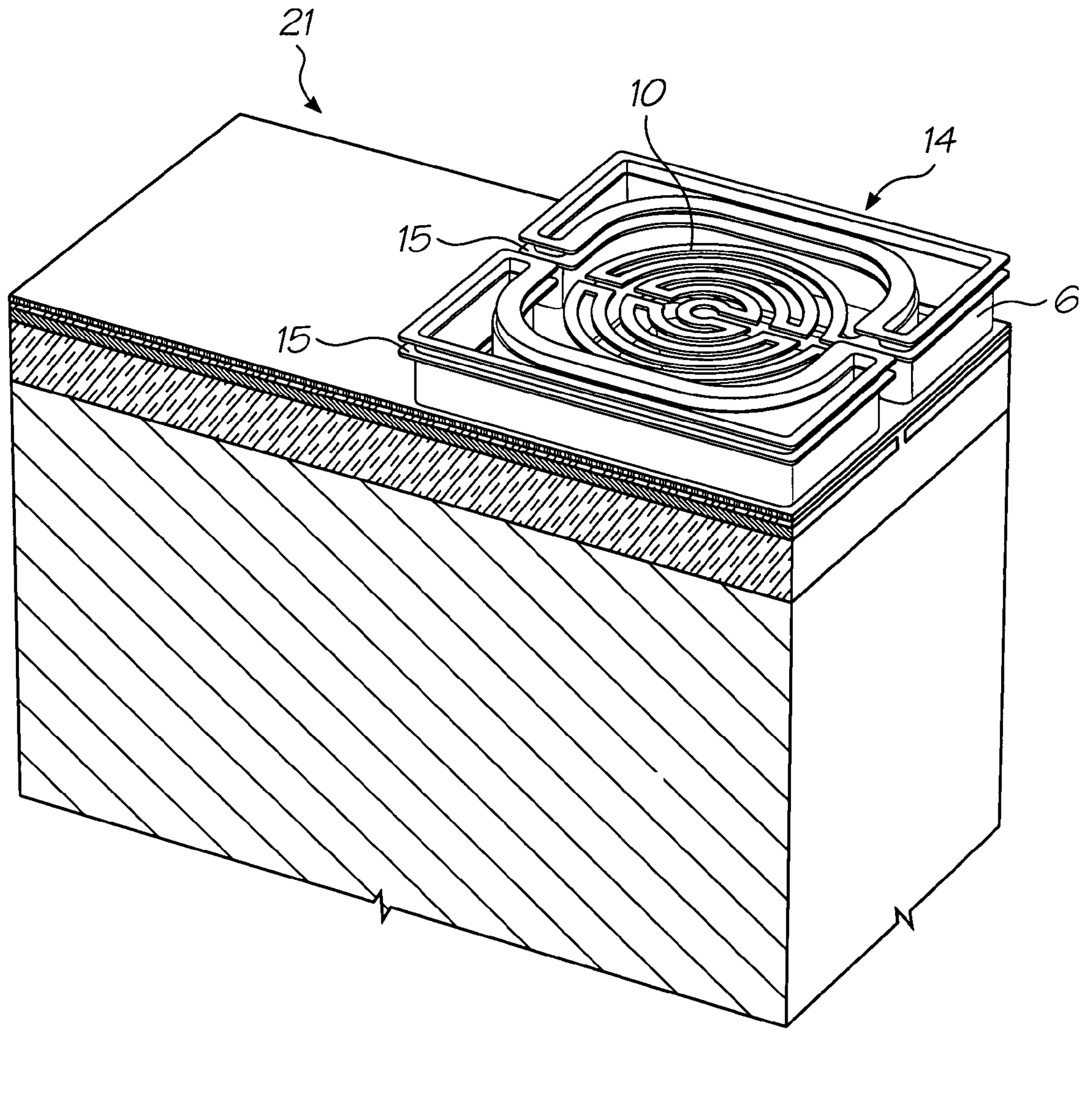
FIG. 37 is a further schematic perspective view of the unit cell of FIG. 35 shown with the nozzle plate omitted.

FIG. 36, referred to above, shows the shape, in plan view, of a mask for forming the heater structure of the embodiment of the printhead shown in FIG. 35. Accordingly, as FIG. 36 represents the shape of the heater element 10 of that embodiment, it is now referred to in discussing that heater element. During operation, current flows vertically into the electrodes 15 (represented by the parts designated 15.36), so that the current flow area of the electrodes is relatively large, which, in turn, results in there being a low electrical resistance. By contrast, the element 10, represented in FIG. 36 by the part designated 10.36, is long and thin, with the width of the element in this embodiment being 1 micron and the thickness being 0.25 microns.

Figure 33:
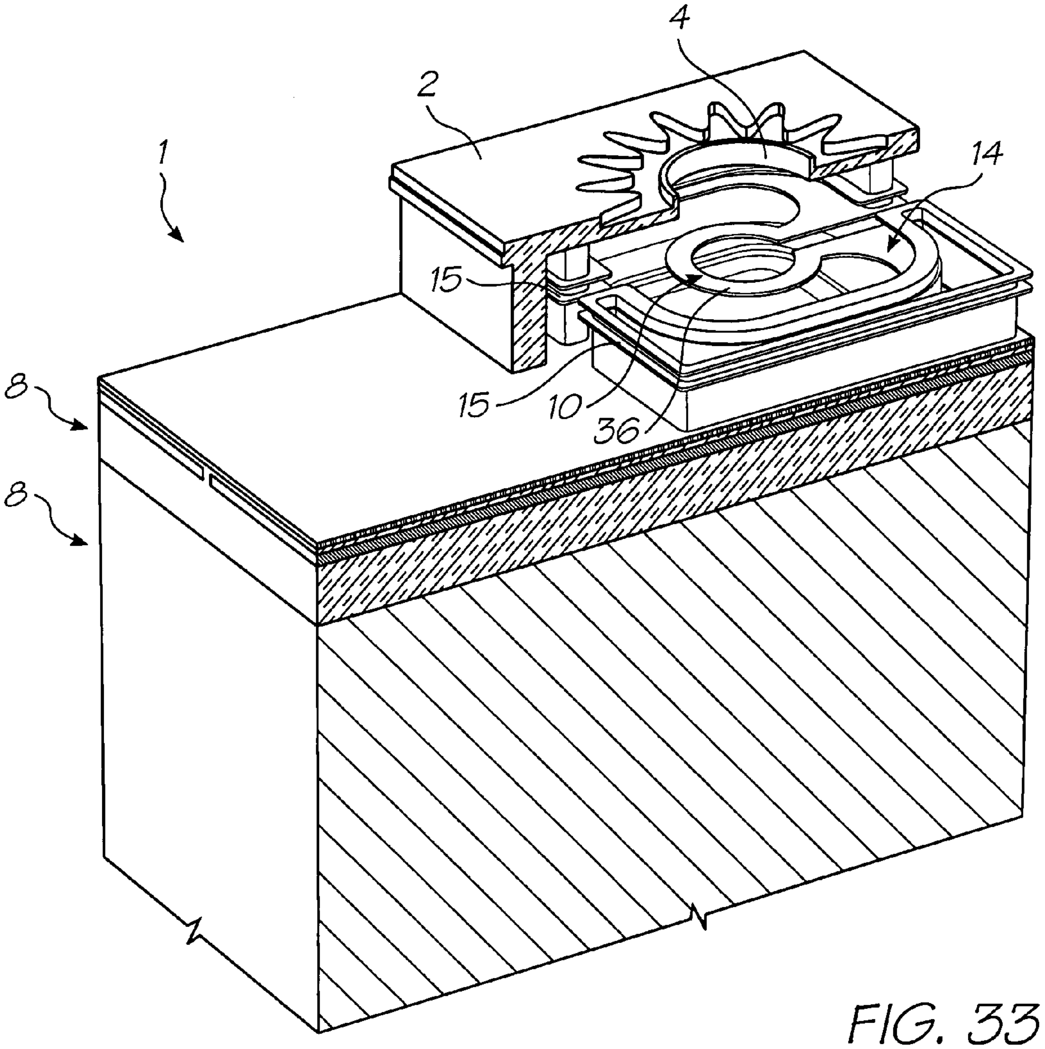
FIG. 33 is a schematic perspective view, partly cut away, of a unit cell of a printhead according to the invention having another particular embodiment of heater element.

It will be noted that the heater 14 shown in FIG. 33 has a significantly smaller element 10 than the element 10 shown in FIG. 35, and has just a single loop 36. Accordingly, the element 10 of FIG. 33 will have a much lower electrical resistance, and will permit a higher current flow, than the element 10 of FIG. 35. It therefore requires a lower drive voltage to deliver a given energy to the heater 14 in a given time.

Figure 38:
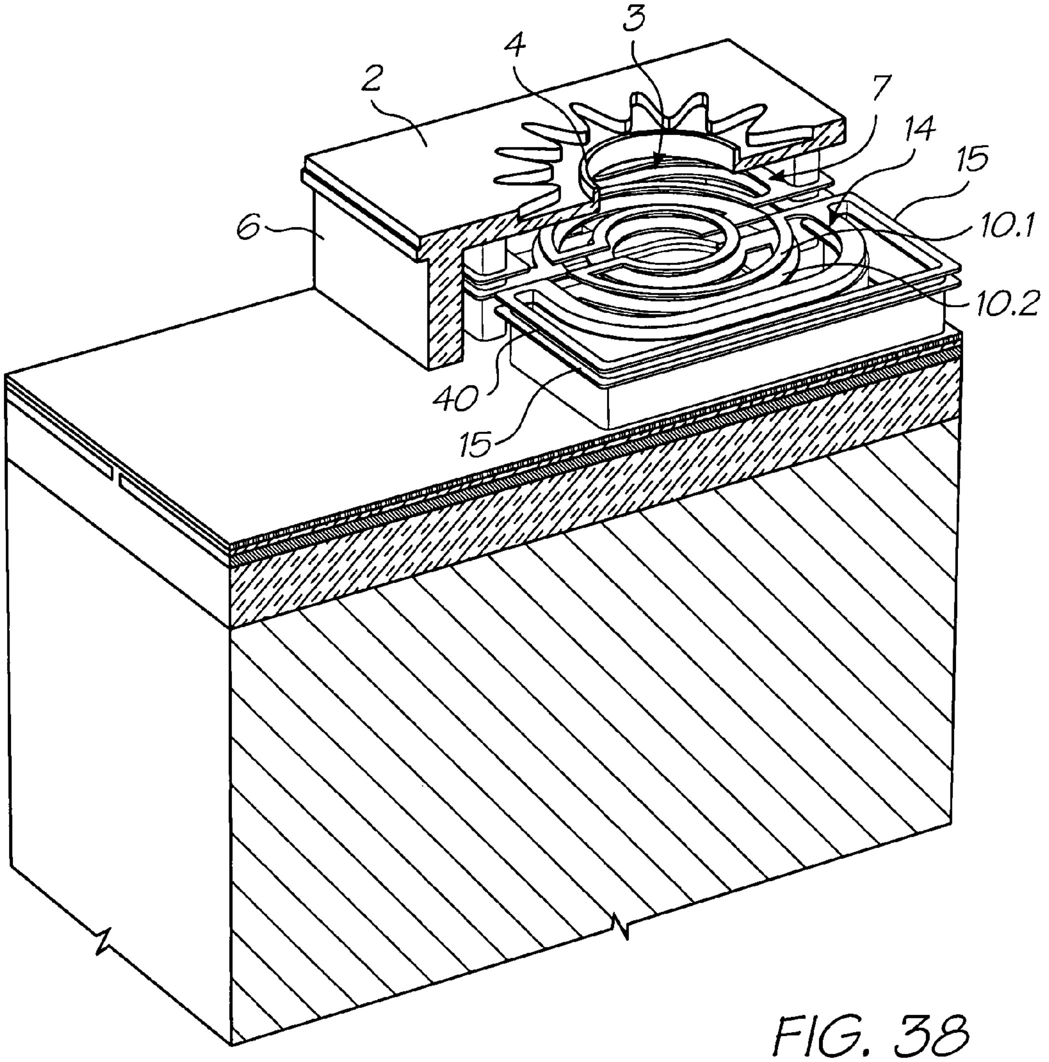
FIG. 38 is a schematic perspective view, partly cut away, of a unit cell of a printhead according to the invention having a further particular embodiment of heater element.

In FIG. 38, on the other hand, the embodiment shown includes a heater 14 having two heater elements 10.1 and 10.2 corresponding to the same unit cell 1. One of these elements 10.2 is twice the width as the other element 10.1, with a correspondingly larger surface area. The various paths of the lower element 10.2 are 2 microns in width, while those of the upper element 10.1 are 1 micron in width. Thus the energy applied to ink in the chamber 7 by the lower element 10.2 is twice that applied by the upper element 10.1 at a given drive voltage and pulse duration. This permits a regulating of the size of vapor bubbles and hence of the size of ink drop ejected due to the bubbles.

Assuming that the energy applied to the ink by the upper element 10.1 is X, it will be appreciated that the energy applied by the lower element 10.2 is about 2X, and the energy applied by the two elements together is about 3X. Of course, the energy applied when neither element is operational, is zero. Thus, in effect, two bits of information can be printed with the one nozzle 3.

As the above factors of energy output may not be achieved exactly in practice, some "fine tuning" of the exact sizing of the elements 10.1 and 10.2, or of the drive voltages that are applied to them, may be required.

It will also be noted that the upper element 10.1 is rotated through 180° about a vertical axis relative to the lower element 10.2. This is so that their electrodes 15 are not coincident, allowing independent connection to separate drive circuits.

Features and Advantages of Particular Embodiments

Discussed below, under appropriate headings, are certain specific features of embodiments of the invention, and the advantages of these features. The features are to be considered in relation to all of the drawings pertaining to the present invention unless the context specifically excludes certain drawings, and relates to those drawings specifically referred to.

Suspended Beam Heater

With reference to FIG. 1, and as mentioned above, the heater element 10 is in the form of a suspended beam, and this is suspended over at least a portion (designated 11.1) of the ink 11 (bubble forming liquid). The element 10 is configured in this way rather than forming part of, or being embedded in, a substrate as is the case in existing printhead systems made by various manufacturers such as Hewlett Packard, Canon and Lexmark. This constitutes a significant difference between embodiments of the present invention and the prior ink jet technologies.

The main advantage of this feature is that a higher efficiency can be achieved by avoiding the unnecessary heating of the solid material that surrounds the heater elements 10 (for example the solid material forming the chamber walls 6, and surrounding the inlet passage 9) which takes place in the prior art devices. The heating of such solid material does not contribute to the formation of vapor bubbles 12, so that the heating of such material involves the wastage of energy. The only energy which contributes in any significant sense to the generation of the bubbles 12 is that which is applied directly into the liquid which is to be heated, which liquid is typically the ink 11.

Figure 41:
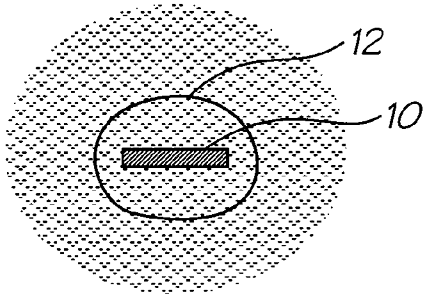
FIG. 41 is a schematic section through a nozzle chamber of a printhead according to an embodiment of the invention showing a suspended beam heater element immersed in a bubble forming liquid.
Figure 42:
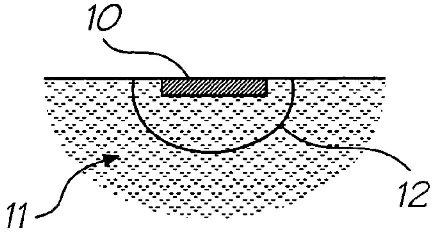
FIG. 42 is schematic section through a nozzle chamber of a printhead according to an embodiment of the invention showing a suspended beam heater element suspended at the top of a body of a bubble forming liquid.

In one preferred embodiment, as illustrated in FIG. 1, the heater element 10 is suspended within the ink 11 (bubble forming liquid), so that this liquid surrounds the element. This is further illustrated in FIG. 41. In another possible embodiment, as illustrated in FIG. 42, the heater element 10 beam is suspended at the surface of the ink (bubble forming liquid) 11, so that this liquid is only below the element rather than surrounding it, and there is air on the upper side of the element. The embodiment described in relation to FIG. 41 is preferred as the bubble 12 will form all around the element 10 unlike in the embodiment described in relation to FIG. 42 where the bubble will only form below the element. Thus the embodiment of FIG. 41 is likely to provide a more efficient operation.

Figure 31:
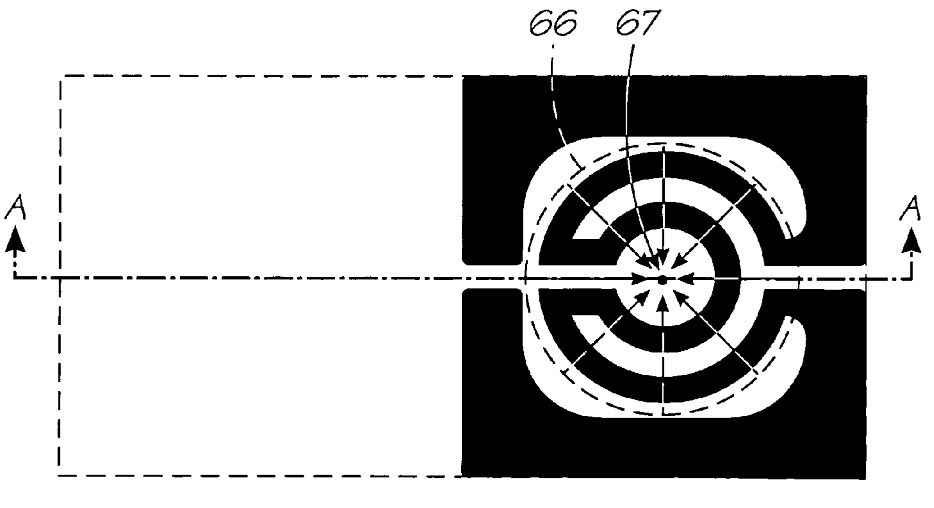
Figure 32:
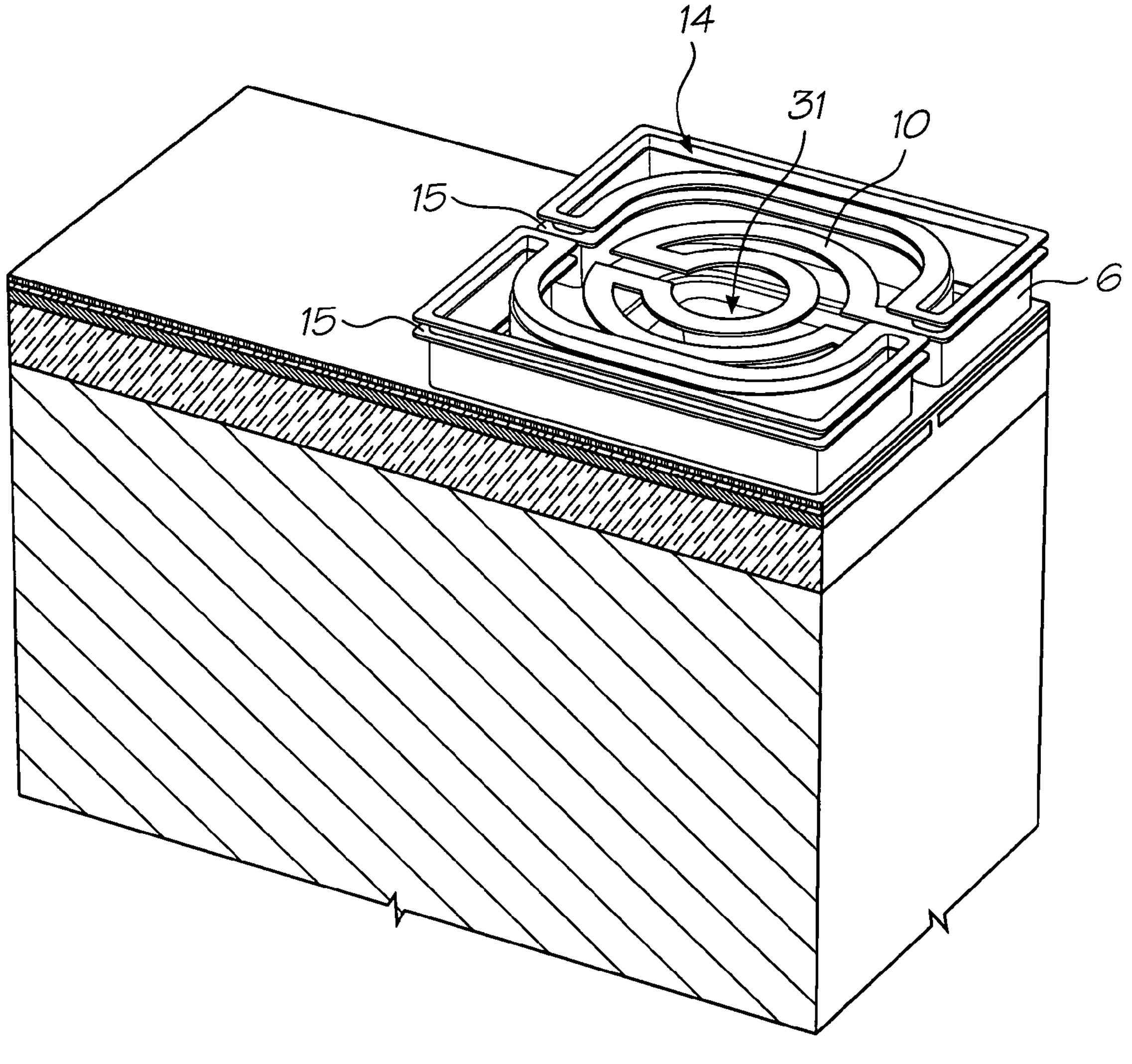
FIG. 32 is a further schematic perspective view of the unit cell of FIG. 30 shown with the nozzle plate omitted.

As can be seen in, for example, with reference to FIGS. 30 and 31, the heater element 10 beam is supported only on one side and is free at its opposite side, so that it constitutes a cantilever.

Efficiency of the Printhead

The feature presently under consideration is that the heater element 10 is configured such that an energy of less than 500 nanojoules (nJ) is required to be applied to the element to heat it sufficiently to form a bubble 12 in the ink 11, so as to eject a drop 16 of ink through a nozzle 3. In one preferred embodiment, the required energy is less that 300 nJ, while in a further embodiment, the energy is less than 120 nJ.

It will be appreciated by those skilled in the art that prior art devices generally require over 5 microjoules to heat the element sufficiently to generate a vapor bubble 12 to eject an ink drop 16. Thus, the energy requirements of the present invention are an order of magnitude lower than that of known thermal ink jet systems. This lower energy consumption allows lower operating costs, smaller power supplies, and so on, but also dramatically simplifies printhead cooling, allows higher densities of nozzles 3, and permits printing at higher resolutions.

These advantages of the present invention are especially significant in embodiments where the individual ejected ink drops 16, themselves, constitute the major cooling mechanism of the printhead, as described further below.

Self-Cooling of the Printhead

This feature of the invention provides that the energy applied to a heater element 10 to form a vapor bubble 12 so as to eject a drop 16 of ink 11 is removed from the printhead by a combination of the heat removed by the ejected drop itself, and the ink that is taken into the printhead from the ink reservoir (not shown). The result of this is that the net "movement" of heat will be outwards from the printhead, to provide for automatic cooling. Under these circumstances, the printhead does not require any other cooling systems.

As the ink drop 16 ejected and the amount of ink 11 drawn into the printhead to replace the ejected drop are constituted by the same type of liquid, and will essentially be of the same mass, it is convenient to express the net movement of energy as, on the one hand, the energy added by the heating of the element 10, and on the other hand, the net removal of heat energy that results from ejecting the ink drop 16 and the intake of the replacement quantity of ink 11. Assuming that the replacement quantity of ink 11 is at ambient temperature, the change in energy due to net movement of the ejected and replacement quantities of ink can conveniently be expressed as the heat that would be required to raise the temperature of the ejected drop 16, if it were at ambient temperature, to the actual temperature of the drop as it is ejected.

It will be appreciated that a determination of whether the above criteria are met depends on what constitutes the ambient temperature. In the present case, the temperature that is taken to be the ambient temperature is the temperature at which ink 11 enters the printhead from the ink storage reservoir (not shown) which is connected, in fluid flow communication, to the inlet passages 9 of the printhead. Typically the ambient temperature will be the room ambient temperature, which is usually roughly 20 degrees C. (Celsius).

However, the ambient temperature may be less, if for example, the room temperature is lower, or if the ink 11 entering the printhead is refrigerated.

In one preferred embodiment, the printhead is designed to achieve complete self-cooling (i.e. where the outgoing heat energy due to the net effect of the ejected and replacement quantities of ink 11 is equal to the heat energy added by the heater element 10).

By way of example, assuming that the ink 11 is the bubble forming liquid and is water based, thus having a boiling point of approximately 100 degrees C., and if the ambient temperature is 40 degrees C., then there is a maximum of 60 degrees C. from the ambient temperature to the ink boiling temperature and that is the maximum temperature rise that the printhead could undergo.

It is desirable to avoid having ink temperatures within the printhead (other than at time of ink drop 16 ejection) which are very close to the boiling point of the ink 11. If the ink 11 were at such a temperature, then temperature variations between parts of the printhead could result in some regions being above boiling point, with the unintended, and therefore undesirable, formation of vapor bubbles 12. Accordingly, a preferred embodiment of the invention is configured such that complete self-cooling, as described above, can be achieved when the maximum temperature of the ink 11 (bubble forming liquid) in a particular nozzle chamber 7 is 10 degrees C. below its boiling point when the heating element 10 is not active.

The main advantage of the feature presently under discussion, and its various embodiments, is that it allows for a high nozzle density and for a high speed of printhead operation without requiring elaborate cooling methods for preventing undesired boiling in nozzles 3 adjacent to nozzles from which ink drops 16 are being ejected. This can allow as much as a hundred-fold increase in nozzle packing density than would be the case if such a feature, and the temperature criteria mentioned, were not present.

Areal Density of Nozzles

This feature of the invention relates to the density, by area, of the nozzles 3 on the printhead. With reference to FIG. 1, the nozzle plate 2 has an upper surface 50, and the present aspect of the invention relates to the packing density of nozzles 3 on that surface. More specifically, the areal density of the nozzles 3 on that surface 50 is over 10,000 nozzles per square cm of surface area.

In one preferred embodiment, the areal density exceeds 20,000 nozzles 3 per square cm of surface 50 area, while in another preferred embodiment, the areal density exceeds 40,000 nozzles 3 per square cm. In a preferred embodiment, the areal density is 48 828 nozzles 3 per square cm.

When referring to the areal density, each nozzle 3 is taken to include the drive-circuitry corresponding to the nozzle, which consists, typically, of a drive transistor, a shift register, an enable gate and clock regeneration circuitry (this circuitry not being specifically identified).

Figure 43:
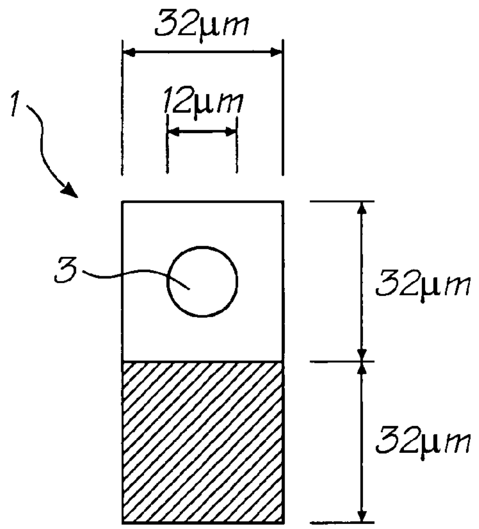
FIG. 43 is a diagrammatic plan view of a unit cell of a printhead according to an embodiment of the invention showing a nozzle.

With reference to FIG. 43 in which a single unit cell 1 is shown, the dimensions of the unit cell are shown as being 32 microns in width by 64 microns in length. The nozzle 3 of the next successive row of nozzles (not shown) immediately juxtaposes this nozzle, so that, as a result of the dimension of the outer periphery of the printhead chip, there are 48,828 nozzles 3 per square cm. This is about 85 times the nozzle areal density of a typical thermal ink jet printhead, and roughly 400 times the nozzle areal density of a piezoelectric printhead.

The main advantage of a high areal density is low manufacturing cost, as the devices are batch fabricated on silicon wafers of a particular size.

The more nozzles 3 that can be accommodated in a square cm of substrate, the more nozzles can be fabricated in a single batch, which typically consists of one wafer. The cost of manufacturing a CMOS plus MEMS wafer of the type used in the printhead of the present invention is, to a some extent, independent of the nature of patterns that are formed on it. Therefore if the patterns are relatively small, a relatively large number of nozzles 3 can be included. This allows more nozzles 3 and more printheads to be manufactured for the same cost than in a cases where the nozzles had a lower areal density. The cost is directly proportional to the area taken by the nozzles 3.

Bubble Formation on Opposite Sides of Heater Element

According to the present feature, the heater 14 is configured so that when a bubble 12 forms in the ink 11 (bubble forming liquid), it forms on both sides of the heater element 10. Preferably, it forms so as to surround the heater element 10 where the element is in the form of a suspended beam.

Figure 45:
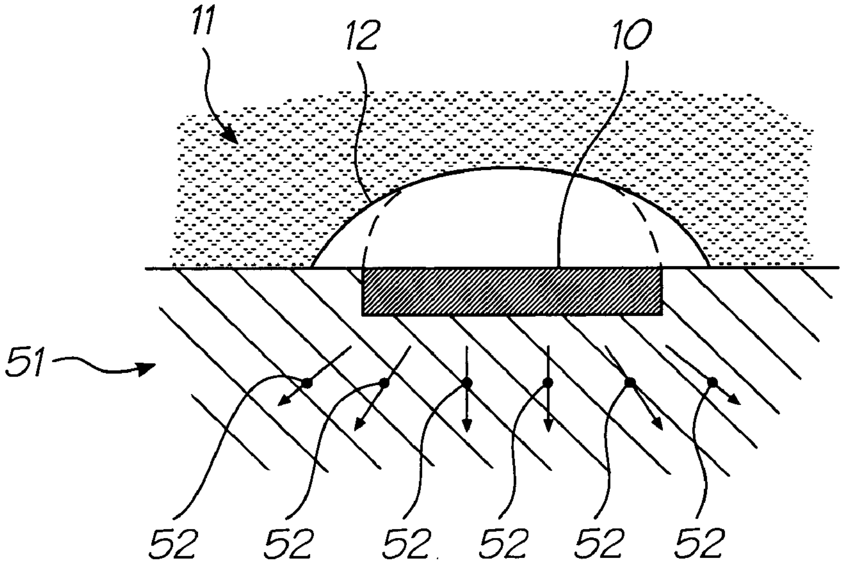
FIG. 45 is a diagrammatic section through a nozzle chamber not in accordance with the invention showing a heater element embedded in a substrate.
Figure 46:
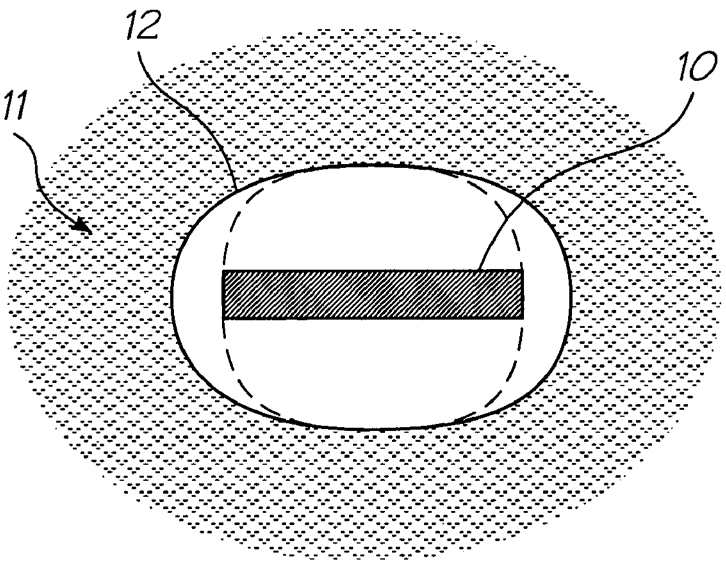
FIG. 46 is a diagrammatic section through a nozzle chamber in accordance with an embodiment of the invention showing a heater element in the form of a suspended beam.

The formation of a bubble 12 on both sides of the heater element 10 as opposed to on one side only, can be understood with reference to FIGS. 45 and 46. In the first of these figures, the heater element 10 is adapted for the bubble 12 to be formed only on one side as, while in the second of these figures, the element is adapted for the bubble 12 to be formed on both sides, as shown.

In a configuration such as that of FIG. 45, the reason that the bubble 12 forms on only one side of the heater element 10 is because the element is embedded in a substrate 51, so that the bubble cannot be formed on the particular side corresponding to the substrate. By contrast, the bubble 12 can form on both sides in the configuration of FIG. 46 as the heater element 10 here is suspended.

Of course where the heater element 10 is in the form of a suspended beam as described above in relation to FIG. 1, the bubble 12 is allowed to form so as to surround the suspended beam element.

The advantage of the bubble 12 forming on both sides is the higher efficiency that is achievable. This is due to a reduction in heat that is wasted in heating solid materials in the vicinity of the heater element 10, which do not contribute to formation of a bubble 12. This is illustrated in FIG. 45, where the arrows 52 indicate the movements of heat into the solid substrate 51. The amount of heat lost to the substrate 51 depends on the thermal conductivity of the solid materials of the substrate relative to that of the ink 11, which may be water based. As the thermal conductivity of water is relatively low, more than half of the heat can be expected to be absorbed by the substrate 51 rather than by the ink 11.

Prevention of Cavitation

As described above, after a bubble 12 has been formed in a printhead according to an embodiment of the present invention, the bubble collapses towards a point of collapse 17. According to the feature presently being addressed, the heater elements 10 are configured to form the bubbles 12 so that the points of collapse 17 towards which the bubbles collapse, are at positions spaced from the heater elements. Preferably, the printhead is configured so that there is no solid material at such points of collapse 17. In this way cavitation, being a major problem in prior art thermal ink jet devices, is largely eliminated.

Figure 48:
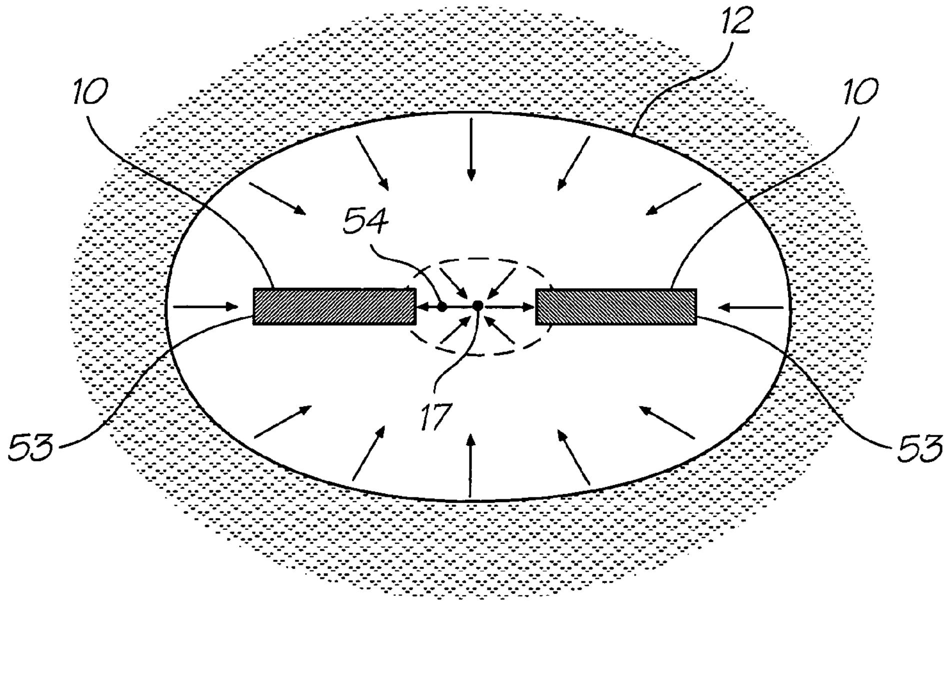
FIG. 48 is a diagrammatic section through a nozzle chamber in accordance with an embodiment of the invention showing a heater element defining a gap between parts of the element.

Referring to FIG. 48, in a preferred embodiment, the heater elements 10 are configured to have parts 53 which define gaps (represented by the arrow 54), and to form the bubbles 12 so that the points of collapse 17 to which the bubbles collapse are located at such gaps. The advantage of this feature is that it substantially avoids cavitation damage to the heater elements 10 and other solid material.

Figure 47:
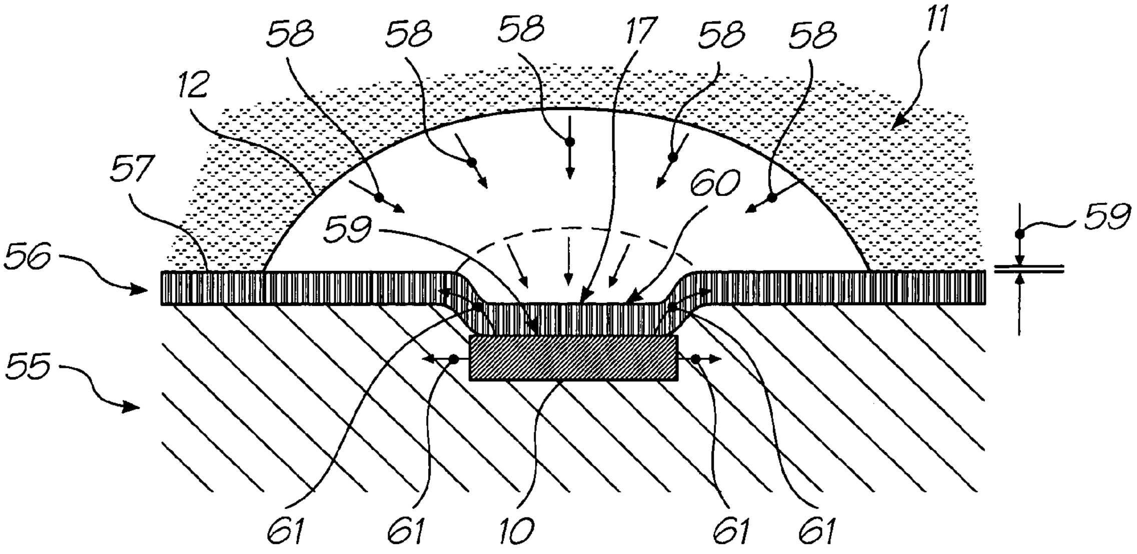
FIG. 47 (PRIOR ART)
FIG. 47 is a diagrammatic section through a nozzle chamber of a prior art printhead showing a heater element embedded in a substrate.

In a standard prior art system as shown schematically in FIG. 47, the heater element 10 is embedded in a substrate 55, with an insulating layer 56 over the element, and a protective layer 57 over the insulating layer. When a bubble 12 is formed by the element 10, it is formed on top of the element. When the bubble 12 collapses, as shown by the arrows 58, all of the energy of the bubble collapse is focussed onto a very small point of collapse 17. If the protective layer 57 were absent, then the mechanical forces due to the cavitation that would result from the focussing of this energy to the point of collapse 17, could chip away or erode the heater element 10. However, this is prevented by the protective layer 57.

Typically, such a protective layer 57 is of tantalum, which oxidizes to form a very hard layer of tantalum pentoxide ($Ta_2O_5$). Although no known materials can fully resist the effects of cavitation, if the tantalum pentoxide should be chipped away due to the cavitation, then oxidation will again occur at the underlying tantalum metal, so as to effectively repair the tantalum pentoxide layer.

Although the tantalum pentoxide functions relatively well in this regard in known thermal ink jet systems, it has certain disadvantages. One significant disadvantage is that, in effect, virtually the whole protective layer 57 (having a thickness indicated by the reference numeral 59) must be heated in order to transfer the required energy into the ink 11, to heat it so as to form a bubble 12. This layer 57 has a high thermal mass due to the very high atomic weight of the tantalum, and this reduces the efficiency of the heat transfer. Not only does this increase the amount of heat which is required at the level designated 59 to raise the temperature at the level designated 60 sufficiently to heat the ink 11, but it also results in a substantial thermal loss to take place in the directions indicated by the arrows 61. These disadvantage would not be present if the heater element 10 was merely supported on a surface and was not covered by the protective layer 57.

According to the feature presently under discussion, the need for a protective layer 57, as described above, is avoided by generating the bubble 12 so that it collapses, as illustrated in FIG. 48, towards a point of collapse 17 at which there is no solid material, and more particularly where there is the gap 54 between parts 53 of the heater element 10. As there is merely the ink 11 itself in this location (prior to bubble generation), there is no material that can be eroded here by the effects of cavitation. The temperature at the point of collapse 17 may reach many thousands of degrees C., as is demonstrated by the phenomenon of sonoluminesence. This will break down the ink components at that point. However, the volume of extreme temperature at the point of collapse 17 is so small that the destruction of ink components in this volume is not significant.

The generation of the bubble 12 so that it collapses towards a point of collapse 17 where there is no solid material can be achieved using heater elements 10 corresponding to that represented by the part 10.34 of the mask shown in FIG. 34. The element represented is symmetrical, and has a hole represented by the reference numeral 63 at its center. When the element is heated, the bubble forms around the element (as indicated by the dashed line 64) and then grows so that, instead of being of annular (doughnut) shape as illustrated by the dashed lines 64 and 65) it spans the element including the hole 63, the hole then being filled with the vapor that forms the bubble. The bubble 12 is thus substantially disc-shaped. When it collapses, the collapse is directed so as to minimize the surface tension surrounding the bubble 12. This involves the bubble shape moving towards a spherical shape as far as is permitted by the dynamics that are involved. This, in turn, results in the point of collapse being in the region of the hole 63 at the center of the heater element 10, where there is no solid material.

The heater element 10 represented by the part 10.31 of the mask shown in FIG. 31 is configured to achieve a similar result, with the bubble generating as indicated by the dashed line 66, and the point of collapse to which the bubble collapses being in the hole 67 at the center of the element.

The heater element 10 represented as the part 10.36 of the mask shown in FIG. 36 is also configured to achieve a similar result. Where the element 10.36 is dimensioned such that the hole 68 is small, manufacturing inaccuracies of the heater element may affect the extent to which a bubble can be formed such that its point of collapse is in the region defined by the hole. For example, the hole may be as little as a few microns across. Where high levels of accuracy in the element 10.36 cannot be achieved, this may result in bubbles represented as 12.36 that are somewhat lopsided, so that they cannot be directed towards a point of collapse within such a small region. In such a case, with regard to the heater element represented in FIG. 36, the central loop 49 of the element can simply be omitted, thereby increasing the size of the region in which the point of collapse of the bubble is to fall.

Chemical Vapor Deposited Nozzle Plate and Thin Nozzle Plates

The nozzle aperture 5 of each unit cell 1 extends through the nozzle plate 2, the nozzle plate thus constituting a structure which is formed by chemical vapor deposition (CVD). In various preferred embodiments, the CVD is of silicon nitride, silicon dioxide or oxi-nitride.

The advantage of the nozzle plate 2 being formed by CVD is that it is formed in place without the requirement for assembling the nozzle plate to other components such as the walls 6 of the unit cell 1. This is an important advantage because the assembly of the nozzle plate 2 that would otherwise be required can be difficult to effect and can involve potentially complex issues. Such issues include the potential mismatch of thermal expansion between the nozzle plate 2 and the parts to which it would be assembled, the difficulty of successfully keeping components aligned to each other, keeping them planar, and so on, during the curing process of the adhesive which bonds the nozzle plate 2 to the other parts.

The issue of thermal expansion is a significant factor in the prior art, which limits the size of ink jets that can be manufactured. This is because the difference in the coefficient of thermal expansion between, for example, a nickel nozzle plate and a substrate to which the nozzle plate is connected, where this substrate is of silicon, is quite substantial. Consequently, over as small a distance as that occupied by, say, 1000 nozzles, the relative thermal expansion that occurs between the respective parts, in being heated from the ambient temperature to the curing temperature required for bonding the parts together, can cause a dimension mismatch of significantly greater than a whole nozzle length. This would be significantly detrimental for such devices.

Another problem addressed by the features of the invention presently under discussion, at least in embodiments thereof, is that, in prior art devices, nozzle plates that need to be assembled are generally laminated onto the remainder of the printhead under conditions of relatively high stress. This can result in breakages or undesirable deformations of the devices. The depositing of the nozzle plate 2 by CVD in embodiments of the present invention avoids this.

A further advantage of the present features of the invention, at least in embodiments thereof, is their compatibility with existing semiconductor manufacturing processes. Depositing a nozzle plate 2 by CVD allows the nozzle plate to be included in the printhead at the scale of normal silicon wafer production, using processes normally used for semiconductor manufacture.

Existing thermal ink jet or bubble jet systems experience pressure transients, during the bubble generation phase, of up to 100 atmospheres. If the nozzle plates 2 in such devices were applied by CVD, then to withstand such pressure transients, a substantial thickness of CVD nozzle plate would be required. As would be understood by those skilled in the art, such thicknesses of deposited nozzle plates would give rise certain problems as discussed below.

Figure 49:
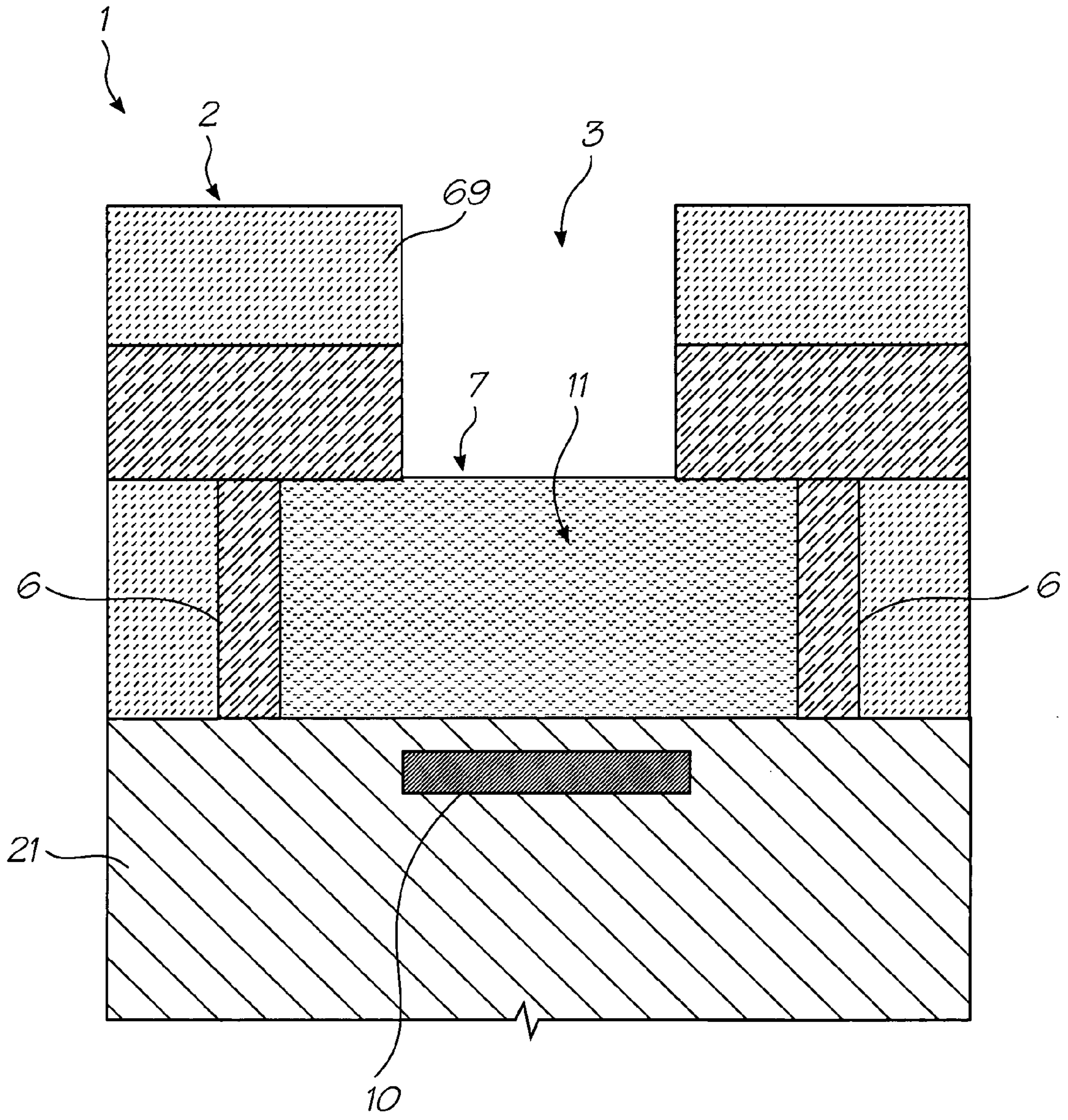
FIG. 49 is a diagrammatic section through a nozzle chamber not in accordance with the invention, showing a thick nozzle plate.

For example, the thickness of nitride sufficient to withstand a 100 atmosphere pressure in the nozzle chamber 7 may be, say, 10 microns. With reference to FIG. 49, which shows a unit cell 1 that is not in accordance with the present invention, and which has such a thick nozzle plate 2, it will be appreciated that such a thickness can result in problems relating to drop ejection. In this case, due to the thickness of nozzle plate 2, the fluidic drag exerted by the nozzle 3 as the ink 11 is ejected therethrough results in significant losses in the efficiency of the device.

Another problem that would exist in the case of such a thick nozzle plate 2, relates to the actual etching process. This is assuming that the nozzle 3 is etched, as shown, perpendicular to the wafer 8 of the substrate portion, for example using a standard plasma etching. This would typically require more than 10 microns of resist 69 to be applied. To expose that thickness of resist 69, the required level of resolution becomes difficult to achieve, as the focal depth of the stepper that is used to expose the resist is relatively small. Although it would be possible to expose this relevant depth of resist 69 using x-rays, this would be a relatively costly process.

A further problem that would exist with such a thick nozzle plate 2 in a case where a 10 micron thick layer of nitride were CVD deposited on a silicon substrate wafer, is that, because of the difference in thermal expansion between the CVD layer and the substrate, as well as the inherent stress of within thick deposited layer, the wafer could be caused to bow to such a degree that further steps in the lithographic process would become impractical. Thus, a layer for the nozzle plate 2 as thick as 10 microns (unlike in the present invention), while possible, is disadvantageous.

Figure 50:
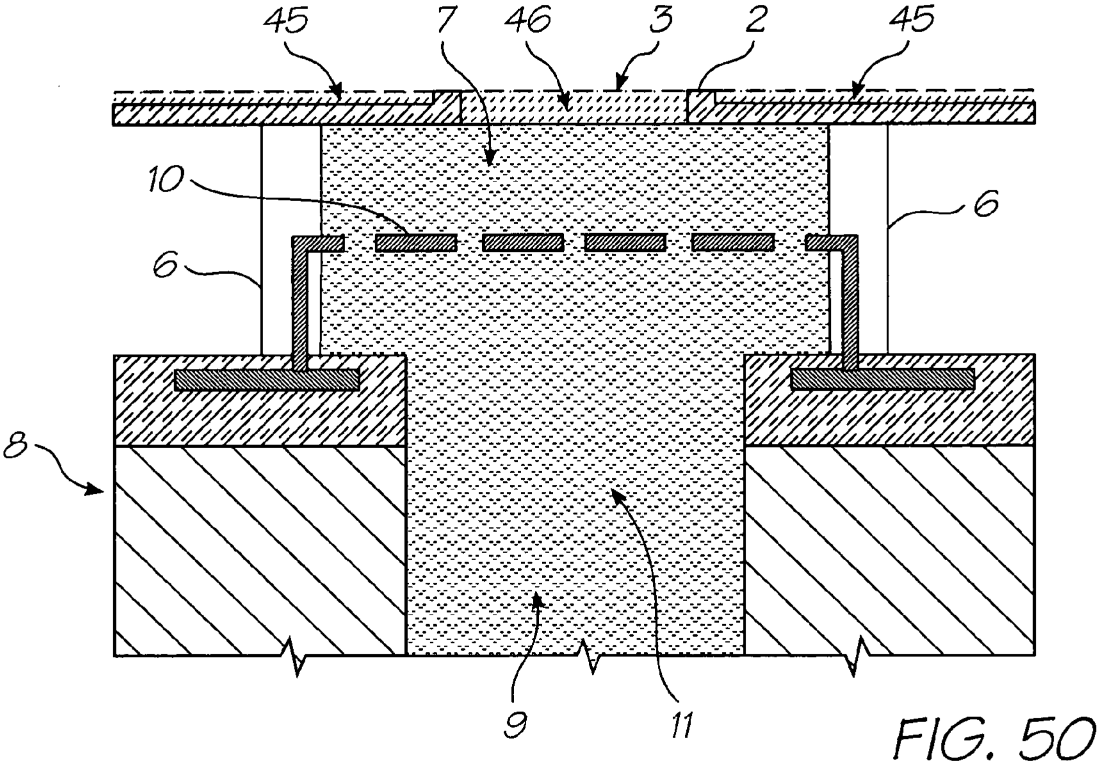
FIG. 50 is a diagrammatic section through a nozzle chamber in accordance with an embodiment of the invention showing a thin nozzle plate.

With reference to FIG. 50, in a Memjet thermal ink ejection device according to an embodiment of the present invention, the CVD nitride nozzle plate layer 2 is only 2 microns thick. Therefore the fluidic drag through the nozzle 3 is not particularly significant and is therefore not a major cause of loss.

Furthermore, the etch time, and the resist thickness required to etch nozzles 3 in such a nozzle plate 2, and the stress on the substrate wafer 8, will not be excessive.

The relatively thin nozzle plate 2 in this invention is enabled as the pressure generated in the chamber 7 is only approximately 1 atmosphere and not 100 atmospheres as in prior art devices, as mentioned above.

There are many factors which contribute to the significant reduction in pressure transient required to eject drops 16 in this system. These include:

1. small size of chamber 7;
2. accurate fabrication of nozzle 3 and chamber 7;
3. stability of drop ejection at low drop velocities;
4. very low fluidic and thermal crosstalk between nozzles 3;
5. optimum nozzle size to bubble area;
6. low fluidic drag through thin (2 micron) nozzle 3;
7. low pressure loss due to ink ejection through the inlet 9;
8. self-cooling operation.

As mentioned above in relation the process described in terms of FIGS. 6 to 31, the etching of the 2-micron thick nozzle plate layer 2 involves two relevant stages. One such stage involves the etching of the region designated 45 in FIGS. 24 and 50, to form a recess outside of what will become the nozzle rim 4. The other such stage involves a further etch, in the region designated 46 in FIGS. 26 and 50, which actually forms the nozzle aperture 5 and finishes the rim 4.

Nozzle Plate Thicknesses

As addressed above in relation to the formation of the nozzle plate 2 by CVD, and with the advantages described in that regard, the nozzle plates in the present invention are thinner than in the prior art. More particularly, the nozzle plates 2 are less than 10 microns thick. In one preferred embodiment, the nozzle plate 2 of each unit cell 1 is less than 5 microns thick, while in another preferred embodiment, it is less than 2.5 microns thick. Indeed, a preferred thickness for the nozzle plate 2 is 2 microns thick.

Heater Elements Formed in Different Layers

According to the present feature, there are a plurality of heater elements 10 disposed within the chamber 7 of each unit cell 1. The elements 10, which are formed by the lithographic process as described above in relation to FIG. 6 to 31, are formed in respective layers.

Figure 40:
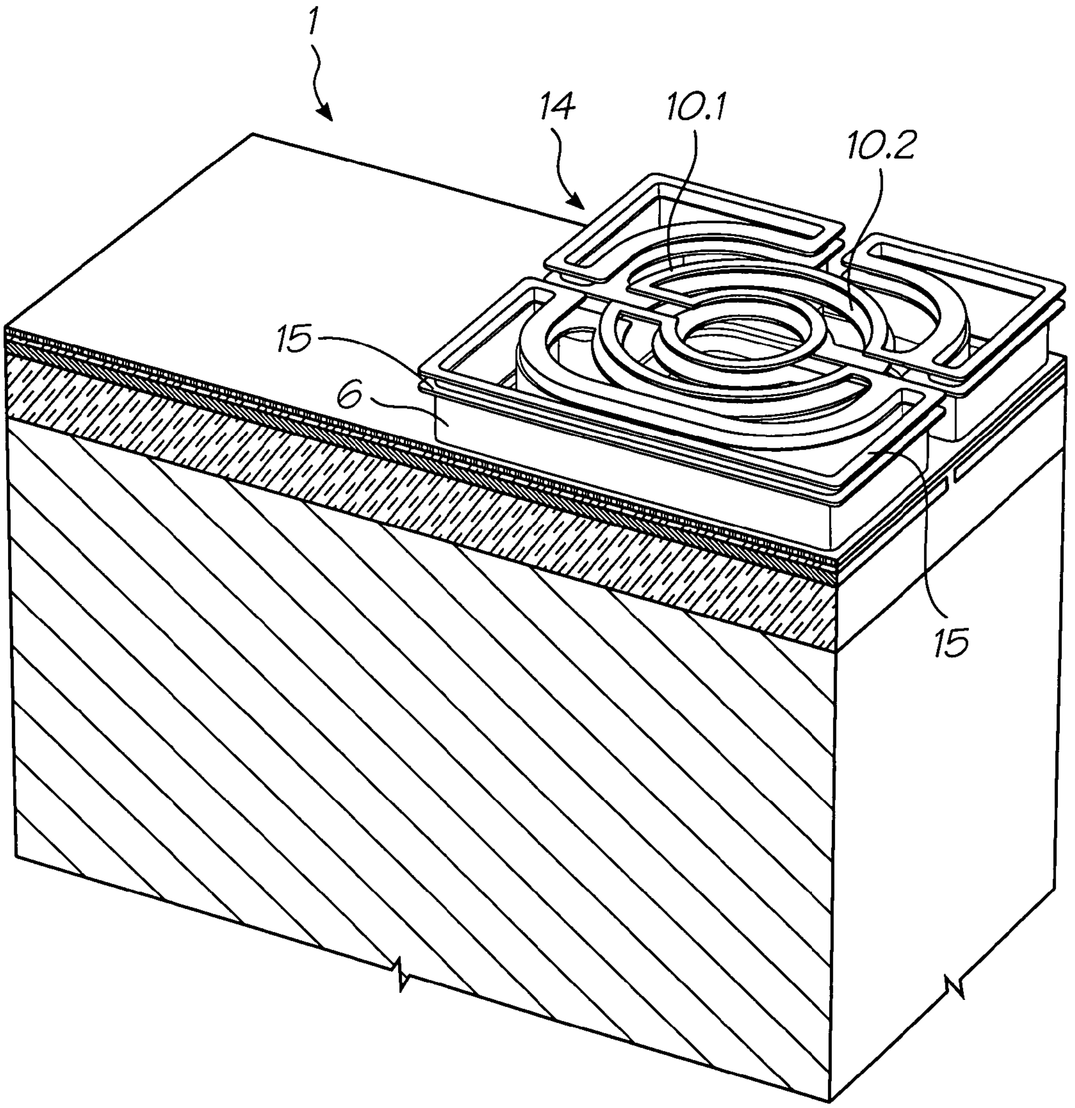
FIG. 40 is a further schematic perspective view of the unit cell of FIG. 38 shown with the nozzle plate omitted.
Figure 51:
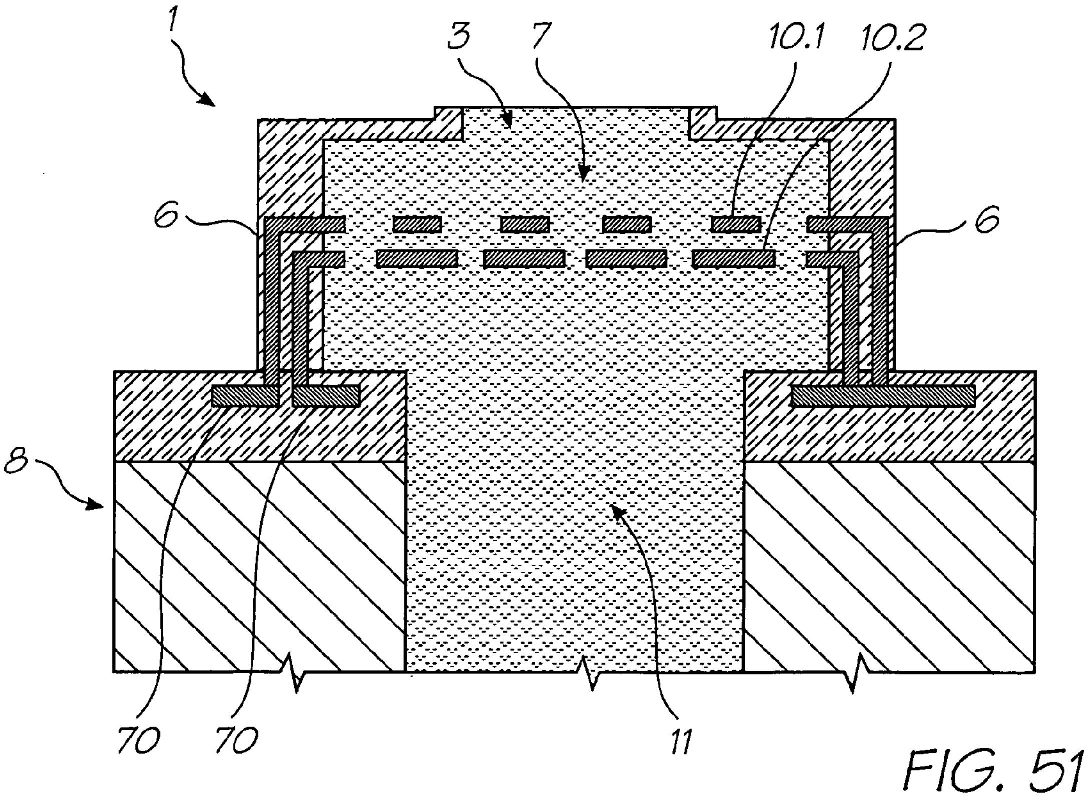
FIG. 51 is a diagrammatic section through a nozzle chamber in accordance with an embodiment of the invention showing two heater elements.

In preferred embodiments, as shown in FIGS. 38, 40 and 51, the heater elements 10.1 and 10.2 in the chamber 7, are of different sizes relative to each other.

Also as will be appreciated with reference to the above description of the lithographic process, each heater element 10.1, 10.2 is formed by at least one step of that process, the lithographic steps relating to each one of the elements 10.1 being distinct from those relating to the other element 10.2.

The elements 10.1, 10.2 are preferably sized relative to each other, as reflected schematically in the diagram of FIG. 51, such that they can achieve binary weighted ink drop volumes, that is, so that they can cause ink drops 16 having different, binary weighted volumes to be ejected through the nozzle 3 of the particular unit cell 1. The achievement of the binary weighting of the volumes of the ink drops 16 is determined by the relative sizes of the elements 10.1 and 10.2. In FIG. 51, the area of the bottom heater element 10.2 in contact with the ink 11 is twice that of top heater element 10.1.

Figure 52:
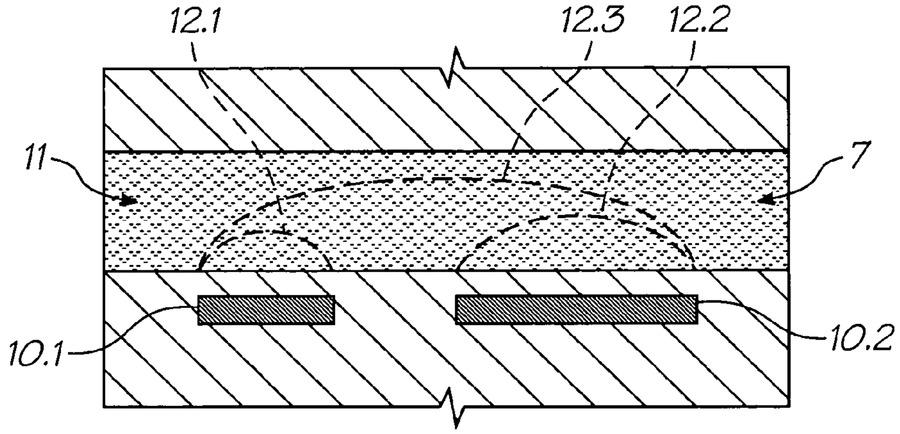
FIG. 52 (PRIOR ART)
FIG. 52 is a diagrammatic section through a nozzle chamber of a prior art printhead showing two heater elements.

One known prior art device, patented by Canon, and illustrated schematically in FIG. 52, also has two heater elements 10.1 and 10.2 for each nozzle, and these are also sized on a binary basis (i.e. to produce drops 16 with binary weighted volumes). These elements 10.1, 10.2 are formed in a single layer, adjacent to each other in the nozzle chamber 7. It will be appreciated that the bubble 12.1 formed by the small element 10.1, only, is relatively small, while that 12.2 formed by the large element 10.2, only, is relatively large. The bubble generated by the combined effects of the two elements, when they are actuated simultaneously, is designated 12.3. Three differently sized ink drops 16 will be caused to be ejected by the three respective bubbles 12.1, 12.2 and 12.3.

It will be appreciated that the size of the elements 10.1 and 10.2 themselves are not required to be binary weighted to cause the ejection of drops 16 having different sizes or the ejection of useful combinations of drops. Indeed, the binary weighting may well not be represented precisely by the area of the elements 10.1, 10.2 themselves. In sizing the elements 10.1, 10.2 to achieve binary weighted drop volumes, the fluidic characteristics surrounding the generation of bubbles 12, the drop dynamics characteristics, the quantity of liquid that is drawing back into the chamber 7 from the nozzle 3 once a drop 16 has broken off, and so forth, must be considered. Accordingly, the actual ratio of the surface areas of the elements 10.1, 10.2, or the performance of the two heaters, needs to be adjusted in practice to achieve the desired binary weighted drop volumes.

Where the size of the heater elements 10.1, 10.2 is fixed and where the ratio of their surface areas is therefore fixed, the relative sizes of ejected drops 16 may be adjusted by adjusting the supply voltages to the two elements. This can also be achieved by adjusting the duration of the operation pulses of the elements 10.1, 10.2—i.e. their pulse widths. However, the pulse widths cannot exceed a certain amount of time, because once a bubble 12 has nucleated on the surface of an element 10.1, 10.2, then any duration of pulse width after that time will be of little or no effect.

On the other hand, the low thermal mass of the heater elements 10.1, 10.2 allows them to be heated to reach, very quickly, the temperature at which bubbles 12 are formed and at which drops 16 are ejected. While the maximum effective pulse width is limited, by the onset of bubble nucleation, typically to around 0.5 microseconds, the minimum pulse width is limited only by the available current drive and the current density that can be tolerated by the heater elements 10.1, 10.2.

As shown in FIG. 51, the two heaters elements 10.1, 10.2 are connected to two respective drive circuits 70. Although these circuits 70 may be identical to each other, a further adjustment can be effected by way of these circuits, for example by sizing the drive transistor (not shown) connected to the lower element 10.2, which is the high current element, larger than that connected to the upper element 10.1. If, for example, the relative currents provided to the respective elements 10.1, 10.2 are in the ratio 2:1, the drive transistor of the circuit 70 connected to the lower element 10.2 would typically be twice the width of the drive transistor (also no shown) of the circuit 70 connected to the other element 10.1.

In the prior art described in relation to FIG. 52, the heater elements 10.1, 10.2, which are in the same layer, are produced simultaneously in the same step of the lithographic manufacturing process. In the embodiment of the present invention illustrated in FIG. 51, the two heaters elements 10.1, 10.2, as mentioned above, are formed one after the other. Indeed, as described in the process illustrated with reference to FIGS. 6 to 31, the material to form the element 10.2 is deposited and is then etched in the lithographic process, whereafter a sacrificial layer 39 is deposited on top of that element, and then the material for the other element 10.1 is deposited so that the sacrificial layer is between the two heater element layers. The layer of the second element 10.1 is etched by a second lithographic step, and the sacrificial layer 39 is removed.

Referring once again to the different sizes of the heater elements 10.1 and 10.2, as mentioned above, this has the advantage that it enables the elements to be sized so as to achieve multiple, binary weighted drop volumes from one nozzle 3.

It will be appreciated that, where multiple drop volumes can be achieved, and especially if they are binary weighted, then photographic quality can be obtained while using fewer printed dots, and at a lower print resolution.

Furthermore, under the same circumstances, higher speed printing can be achieved. That is, instead of just ejecting one drop 14 and then waiting for the nozzle 3 to refill, the equivalent of one, two, or three drops might be ejected. Assuming that the available refill speed of the nozzle 3 is not a limiting factor, ink ejection, and hence printing, up to three times faster, may be achieved. In practice, however, the nozzle refill time will typically be a limiting factor. In this case, the nozzle 3 will take slightly longer to refill when a triple volume of drop 16 (relative to the minimum size drop) has been ejected than when only a minimum volume drop has been ejected. However, in practice it will not take as much as three times as long to refill. This is due to the inertial dynamics and the surface tension of the ink 11.

Figure 53:
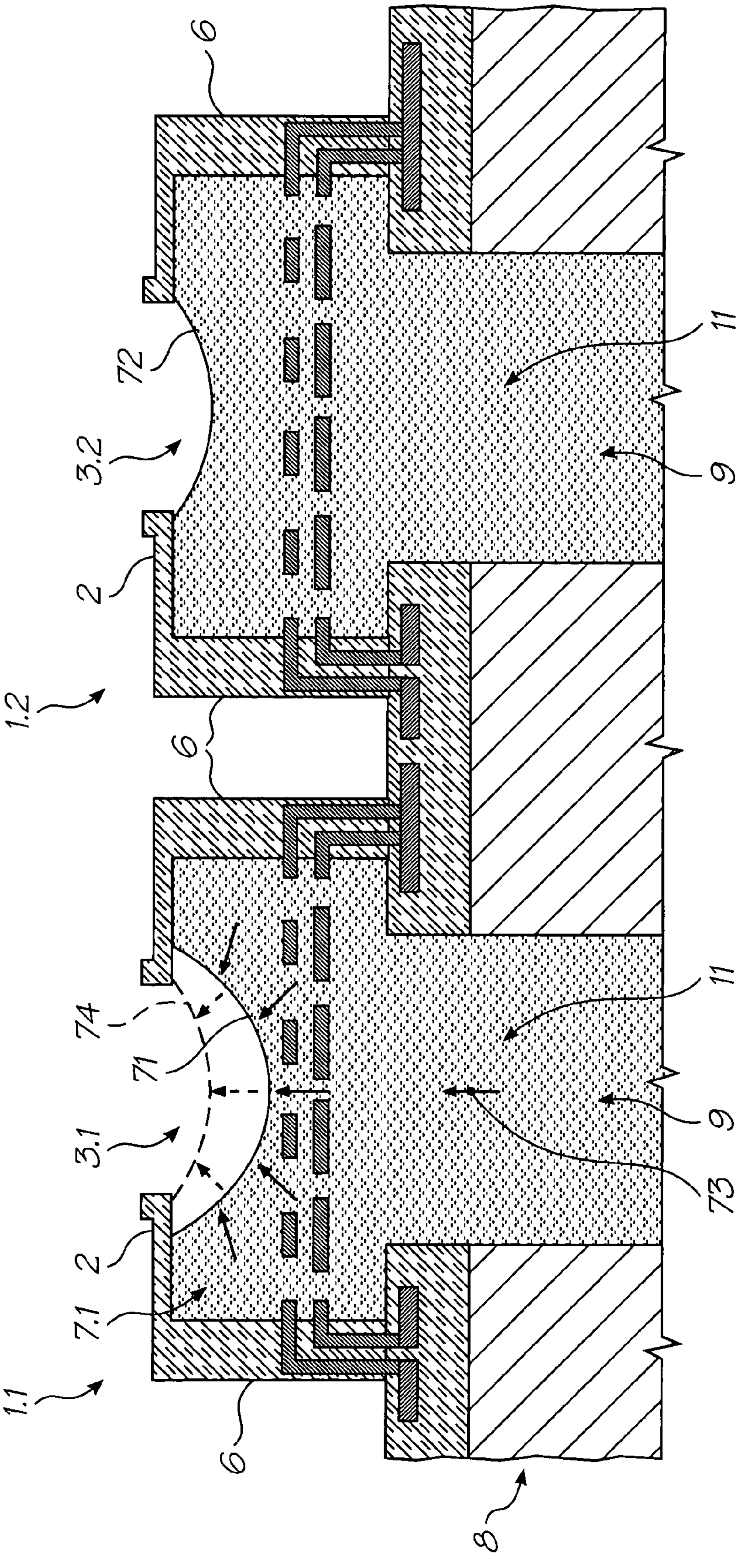
FIG. 53 is a diagrammatic section through a pair of adjacent unit cells of a printhead according to an embodiment of the invention, showing two different nozzles after drops having different volumes have been ejected therethrough.

Referring to FIG. 53, there is shown, schematically, a pair of adjacent unit cells 1.1 and 1.2, the cell on the left 1.1 representing the nozzle 3 after a larger volume of drop 16 has been ejected, and that on the right 1.2, after a drop of smaller volume has been ejected. In the case of the larger drop 16, the curvature of the air bubble 71 that has formed inside the partially emptied nozzle 3.1 is larger than in the case of air bubble 72 that has formed after the smaller volume drop has been ejected from the nozzle 3.2 of the other unit cell 1.2.

The higher curvature of the air bubble 71 in the unit cell 1.1 results in a greater surface tension force which tends to draw the ink 11, from the refill passage 9 towards the nozzle 3 and into the chamber 7.1, as indicated by the arrow 73. This gives rise to a shorter refilling time. As the chamber 7.1 refills, it reaches a stage, designated 74, where the condition is similar to that in the adjacent unit cell 1.2. In this condition, the chamber 7.1 of the unit cell 1.1 is partially refilled and the surface tension force has therefore reduced. This results in the refill speed slowing down even though, at this stage, when this condition is reached in that unit cell 1.1, a flow of liquid into the chamber 7.1, with its associated momentum, has been established. The overall effect of this is that, although it takes longer to completely fill the chamber 7.1 and nozzle 3.1 from a time when the air bubble 71 is present than from when the condition 74 is present, even if the volume to be refilled is three times larger, it does not take as much as three times longer to refill the chamber 7.1 and nozzle 3.1.

Heater Elements Formed from Materials Constituted by Elements with Low Atomic-Numbers This feature involves the heater elements 10 being formed of solid material, at least 90% of which, by weight, is constituted by one or more periodic elements having an atomic number below 50. In a preferred embodiment the atomic weight is below 30, while in another embodiment the atomic weight is below 23.

The advantage of a low atomic number is that the atoms of that material have a lower mass, and therefore less energy is required to raise the temperature of the heater elements 10. This is because, as will be understood by those skilled in the art, the temperature of an article is essentially related to the state of movement of the nuclei of the atoms. Accordingly, it will require more energy to raise the temperature, and thereby induce such a nucleus movement, in a material with atoms having heavier nuclei that in a material having atoms with lighter nuclei.

Materials currently used for the heater elements of thermal ink jet systems include tantalum aluminum alloy (for example used by Hewlett Packard), and hafnium boride (for example used by Canon). Tantalum and hafnium have atomic numbers 73 and 72, respectively, while the material used in the Memjet heater elements 10 of the present invention is titanium nitride. Titanium has an atomic number of 22 and nitrogen has an atomic number of 7, these materials therefore being significantly lighter than those of the relevant prior art device materials.

Boron and aluminum, which form part of hafnium boride and tantalum aluminum, respectively, like nitrogen, are relatively light materials. However, the density of tantalum nitride is 16.3 g/cm$^3$, while that of titanium nitride (which includes titanium in place of tantalum) is 5.22 g/cm$^3$. Thus, because tantalum nitride has a density of approximately three times that of the titanium nitride, titanium nitride will require approximately three time less energy to heat than tantalum nitride. As will be understood by a person skilled in the art, the difference in energy in a material at two different temperatures is represented by the following equation:

$$E=\Delta T \times C_p \times \mathrm{VOL} \times \rho,$$

where ΔT represents the temperature difference, $C_p$ is the specific heat capacity, VOL is the volume, and ρ is the density of the material. Although the density is not determined only by the atomic numbers as it is also a function of the lattice constants, the density is strongly influenced by the atomic numbers of the materials involved, and hence is a key aspect of the feature under discussion.

Low Heater Mass

This feature involves the heater elements 10 being configured such that the mass of solid material of each heater element that is heated above the boiling point of the bubble forming liquid (i.e. the ink 11 in this embodiment) to heat the ink so as to generate bubbles 12 therein to cause an ink drop 16 to be ejected, is less than 10 nanograms.

In one preferred embodiment, the mass is less that 2 nanograms, in another embodiment the mass is less than 500 picograms, and in yet another embodiment the mass is less than 250 picograms.

The above feature constitutes a significant advantage over prior art inkjet systems, as it results in an increased efficiency as a result of the reduction in energy lost in heating the solid materials of the heater elements 10. This feature is enabled due to the use of heater element materials having low densities, due to the relatively small size of the elements 10, and due to the heater elements being in the form of suspended beams which are not embedded in other materials, as illustrated, for example, in FIG. 1.

FIG. 34 shows the shape, in plan view, of a mask for forming the heater structure of the embodiment of the printhead shown in FIG. 33. Accordingly, as FIG. 34 represents the shape of the heater element 10 of that embodiment, it is now referred to in discussing that heater element. The heater element as represented by reference numeral 10.34 in FIG. 34 has just a single loop 49 which is 2 microns wide and 0.25 microns thick. It has a 6 micron outer radius and a 4 micron inner radius. The total heater mass is 82 picograms. The corresponding element 10.2 similarly represented by reference numeral 10.39 in FIG. 39 has a mass of 229.6 picograms and that 10 represented by reference numeral 10.36 in FIG. 36 has a mass of 225.5 picograms.

Figure 39:
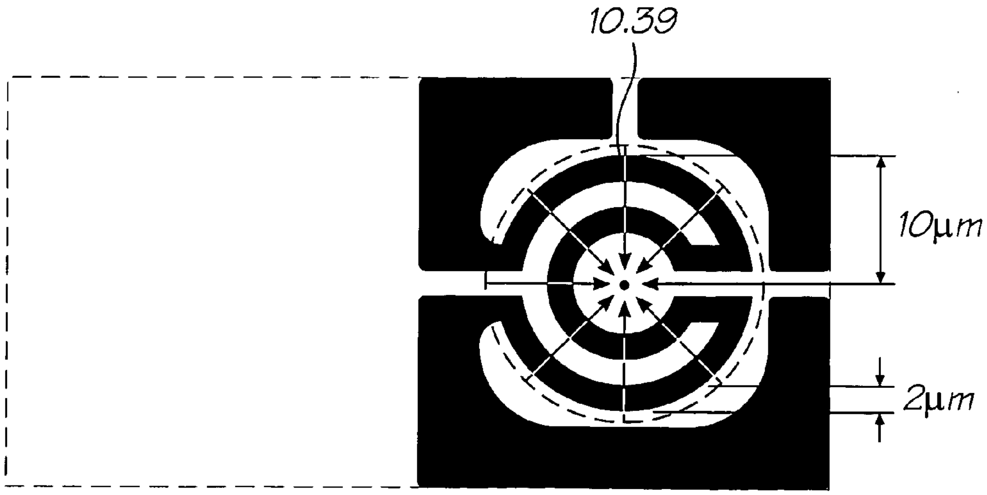
FIG. 39 is a schematic plan view of a mask suitable for use in performing the production stage for the printhead of FIG. 38 for forming the heater element thereof.

When the elements 10, 102 represented in FIGS. 34, 39 and 36, for example, are used in practice, the total mass of material of each such element which is in thermal contact with the ink 11 (being the bubble forming liquid in this embodiment) that is raised to a temperature above that of the boiling point of the ink, will be slightly higher than these masses as the elements will be coated with an electrically insulating, chemically inert, thermally conductive material. This coating increases, to some extent, the total mass of material raised to the higher temperature.

Conformally Coated Heater Element

This feature involves each element 10 being covered by a conformal protective coating, this coating having been applied to all sides of the element simultaneously so that the coating is seamless. The coating 10, preferably, is electrically non-conductive, is chemically inert and has a high thermal conductivity. In one preferred embodiment, the coating is of aluminum nitride, in another embodiment it is of diamond-like carbon (DLC), and in yet another embodiment it is of boron nitride.

Figure 54:
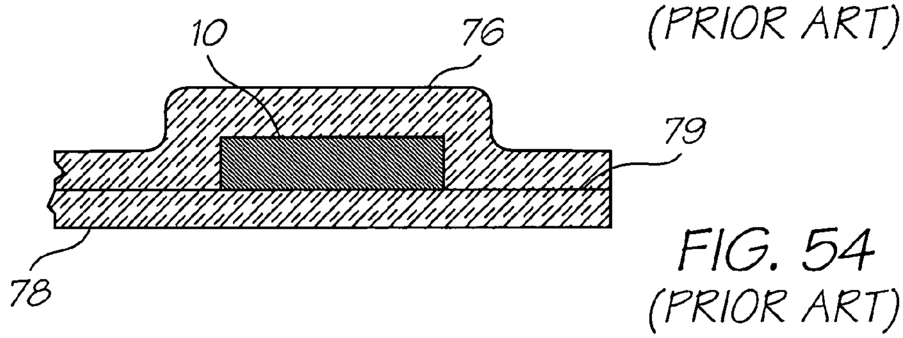
FIG. 54 (PRIOR ART)
FIGS. 54 and 55 are diagrammatic sections through a heater element of a prior art printhead.
Figure 55:
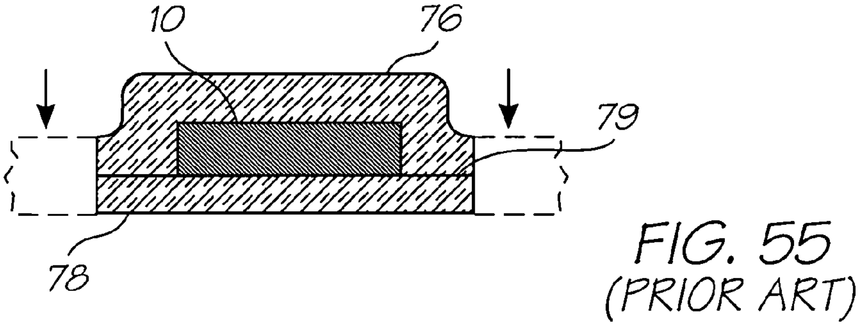
FIG. 55 (PRIOR ART)

Referring to FIGS. 54 and 55, there are shown schematic representations of a prior art heater element 10 that is not conformally coated as discussed above, but which has been deposited on a substrate 78 and which, in the typical manner, has then been conformally coated on one side with a CVD material, designated 76. In contrast, the coating referred to above in the present instance, as reflected schematically in FIG. 56, this coating being designated 77, involves conformally coating the element on all sides simultaneously. However, this conformal coating 77 on all sides can only be achieved if the element 10, when being so coated, is a structure isolated from other structures—i.e. in the form of a suspended beam, so that there is access to all of the sides of the element.

Figure 57:
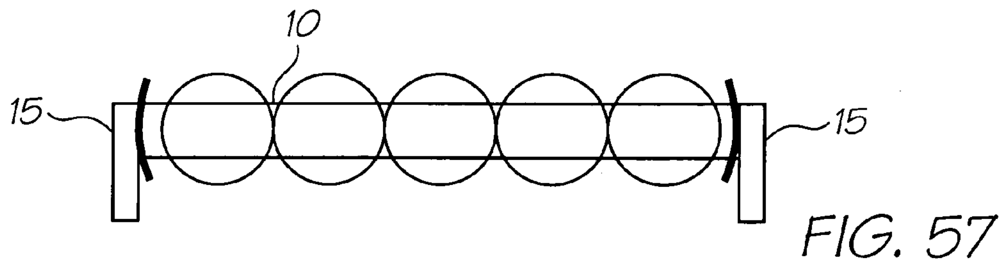
FIG. 57 is a diagrammatic elevational view of a heater element, connected to electrodes, of a printhead according to an embodiment of the invention.

It is to be understood that when reference is made to conformally coating the element 10 on all sides, this excludes the ends of the element (suspended beam) which are joined to the electrodes 15 as indicated diagrammatically in FIG. 57. In other words, what is meant by conformally coating the element 10 on all sides is, essentially, that the element is fully surrounded by the conformal coating along the length of the element.

The primary advantage of conformally coating the heater element 10 may be understood with reference, once again, to FIGS. 54 and 55. As can be seen, when the conformal coating 76 is applied, the substrate 78 on which the heater element 10 was deposited (i.e. formed) effectively constitutes the coating for the element on the side opposite the conformally applied coating. The depositing of the conformal coating 76 on the heater element 10 which is, in turn, supported on the substrate 78, results in a seam 79 being formed. This seam 79 may constitute a weak point, where oxides and other undesirable products might form, or where delamination may occur. Indeed, in the case of the heater element 10 of FIGS. 54 and 55, where etching is conducted to separate the heater element and its coating 76 from the substrate 78 below, so as to render the element in the form of a suspended beam, ingress of liquid or hydroxyl ions may result, even though such materials could not penetrate the actual material of the coating 76, or of the substrate 78.

Figure 56:
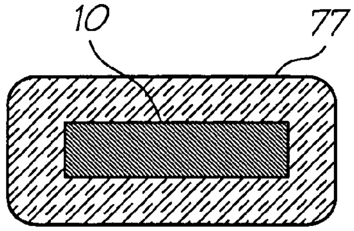
FIG. 56 is a diagrammatic section through a conformally coated heater element according to an embodiment of the invention.

The materials mentioned above (i.e. aluminum nitride or diamond-like carbon (DLC)) are suitable for use in the conformal coating 77 of the present invention as illustrated in FIG. 56 due to their desirably high thermal conductivities, their high level of chemical inertness, and the fact that they are electrically non-conductive. Another suitable material, for these purposes, is boron nitride, also referred to above. Although the choice of material used for the coating 77 is important in relation to achieving the desired performance characteristics, materials other than those mentioned, where they have suitable characteristics, may be used instead.

Example Printer in which the Printhead is Used

The components described above form part of a printhead assembly which, in turn, is used in a printer system. The printhead assembly, itself, includes a number of printhead modules 80. These aspects are described below.

Figure 44:
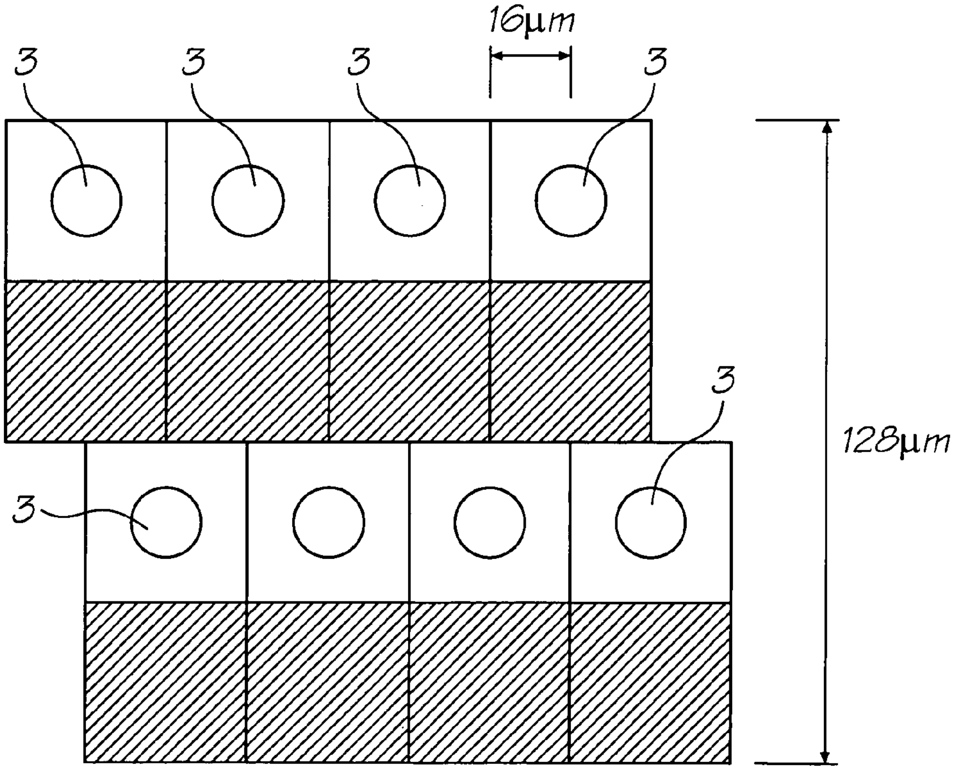
FIG. 44 is a diagrammatic plan view of a plurality of unit cells of a printhead according to an embodiment of the invention showing a plurality of nozzles.

Referring briefly to FIG. 44, the array of nozzles 3 shown is disposed on the printhead chip (not shown), with drive transistors, drive shift registers, and so on (not shown), included on the same chip, which reduces the number of connections required on the chip.

Figure 58:
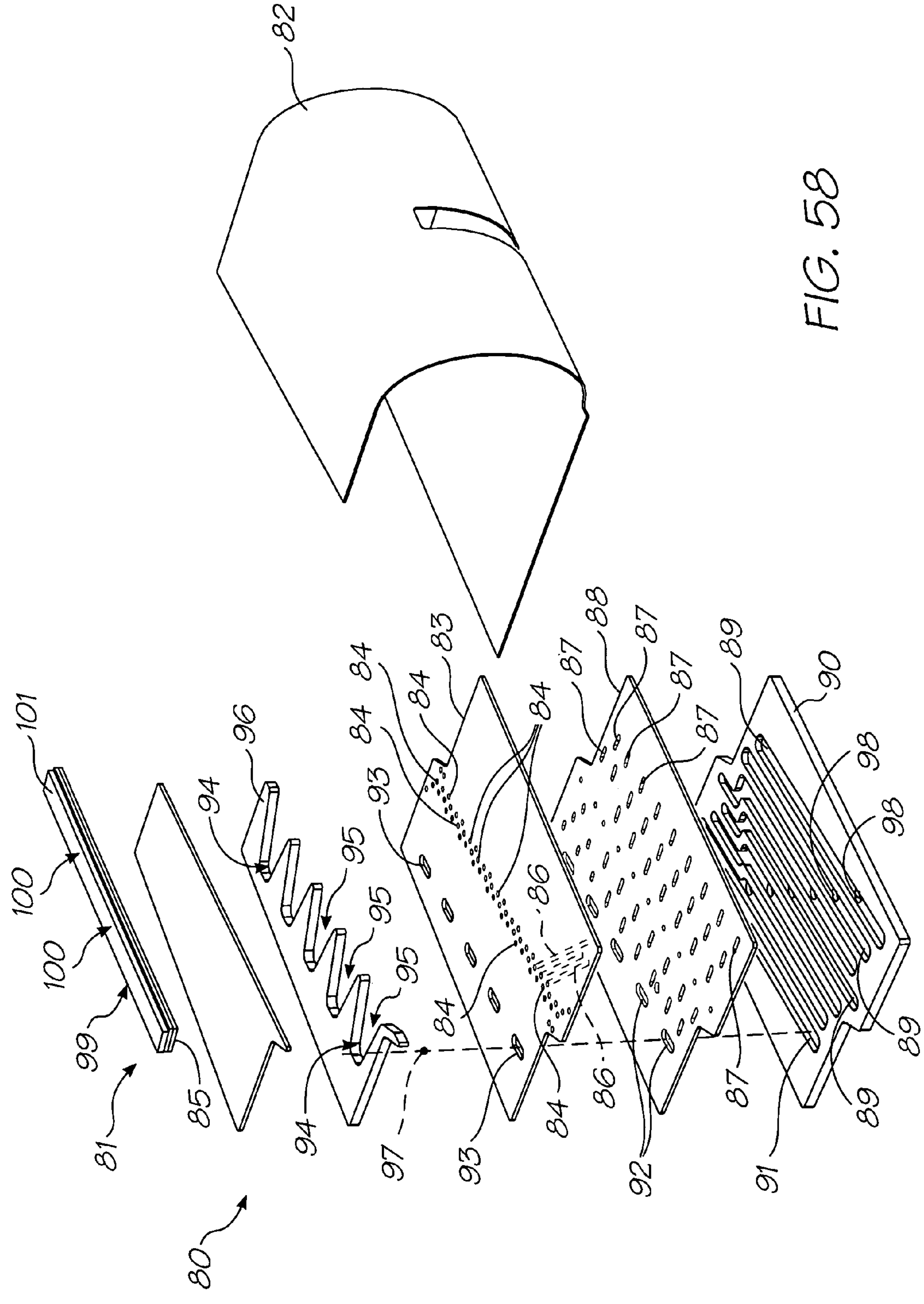
FIG. 58 is a schematic exploded perspective view of a printhead module of a printhead according to an embodiment of the invention.
Figure 59:
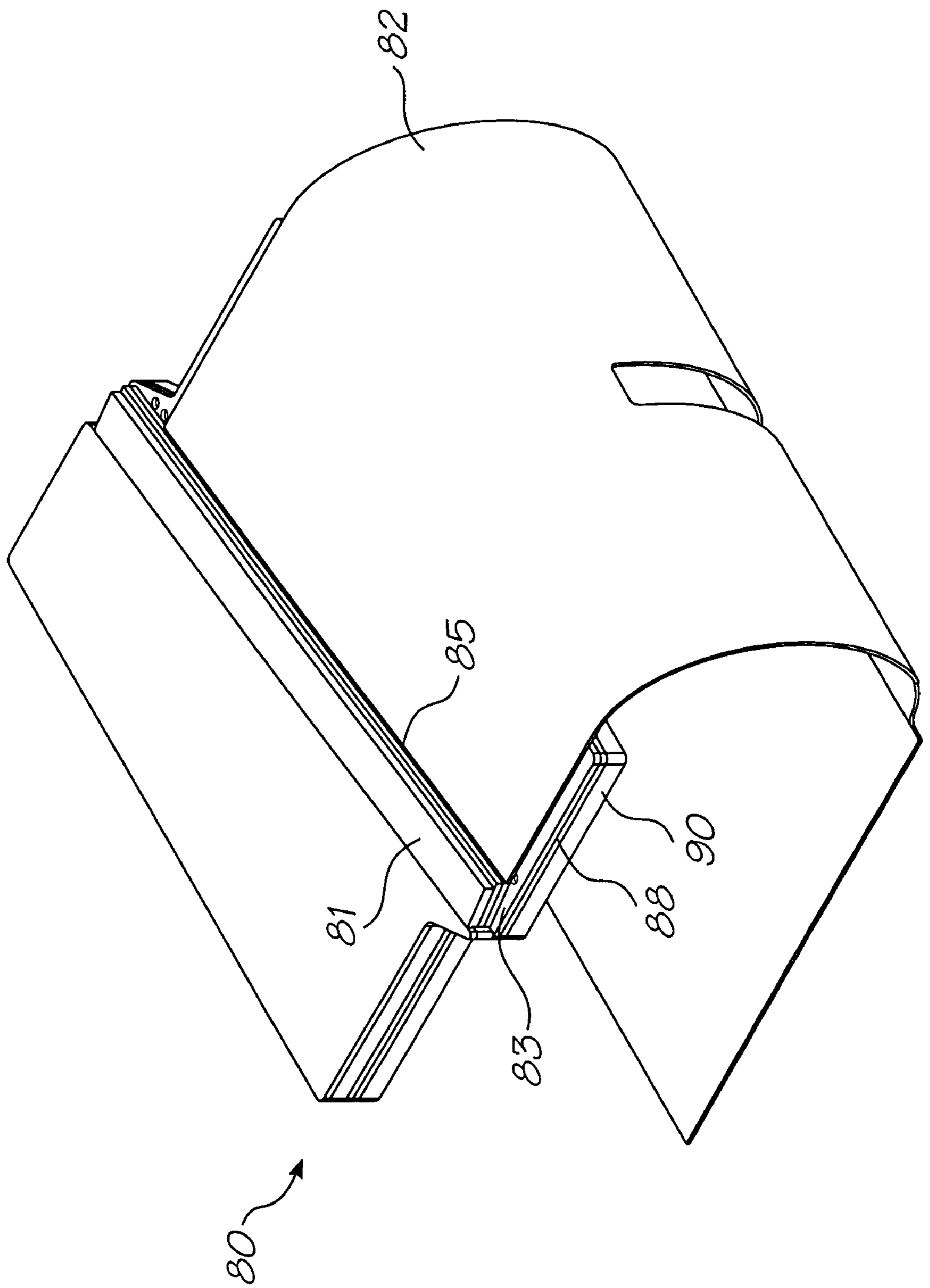
FIG. 59 is a schematic perspective view the printhead module of FIG. 58 shown unexploded.

With reference to FIGS. 58 and 59, there is shown, in an exploded view and a non-exploded view, respectively, a printhead module assembly 80 which includes a MEMS printhead chip assembly 81 (also referred to below as a chip). On a typical chip assembly 81 such as that shown, there are 7680 nozzles, which are spaced so as to be capable of printing with a resolution of 1600 dots per inch. The chip 81 is also configured to eject 6 different colors or types of ink 11.

A flexible printed circuit board (PCB) 82 is electrically connected to the chip 81, for supplying both power and data to the chip. The chip 81 is bonded onto a stainless-steel upper layer sheet 83, so as to overlie an array of holes 84 etched in this sheet. The chip 81 itself is a multi-layer stack of silicon which has ink channels (not shown) in the bottom layer of silicon 85, these channels being aligned with the holes 84.

The chip 81 is approximately 1 mm in width and 21 mm in length. This length is determined by the width of the field of the stepper that is used to fabricate the chip 81. The sheet 83 has channels 86 (only some of which are shown as hidden detail) which are etched on the underside of the sheet as shown in FIG. 58. The channels 86 extend as shown so that their ends align with holes 87 in a mid-layer 88. Different ones of the channels 86 align with different ones of the holes 87. The holes 87, in turn, align with channels 89 in a lower layer 90. Each channel 89 carries a different respective color of ink, except for the last channel, designated 91. This last channel 91 is an air channel and is aligned with further holes 92 in the mid-layer 88, which in turn are aligned with further holes 93 in the upper layer sheet 83. These holes 93 are aligned with the inner parts 94 of slots 95 in a top channel layer 96, so that these inner parts are aligned with, and therefore in fluid-flow communication with, the air channel 91, as indicated by the dashed line 97.

The lower layer 90 has holes 98 opening into the channels 89 and channel 91. Compressed filtered air from an air source (not shown) enters the channel 91 through the relevant hole 98, and then passes through the holes 92 and 93 and slots 95, in the mid layer 88, the sheet 83 and the top channel layer 96, respectively, and is then blown into the side 99 of the chip assembly 81, from where it is forced out, at 100, through a nozzle guard 101 which covers the nozzles, to keep the nozzles clear of paper dust. Differently colored inks 11 (not shown) pass through the holes 98 of the lower layer 90, into the channels 89, and then through respective holes 87, then along respective channels 86 in the underside of the upper layer sheet 83, through respective holes 84 of that sheet, and then through the slots 95, to the chip 81. It will be noted that there are just seven of the holes 98 in the lower layer 90 (one for each color of ink and one for the compressed air) via which the ink and air is passed to the chip 81, the ink being directed to the 7680 nozzles on the chip.

Figure 60:
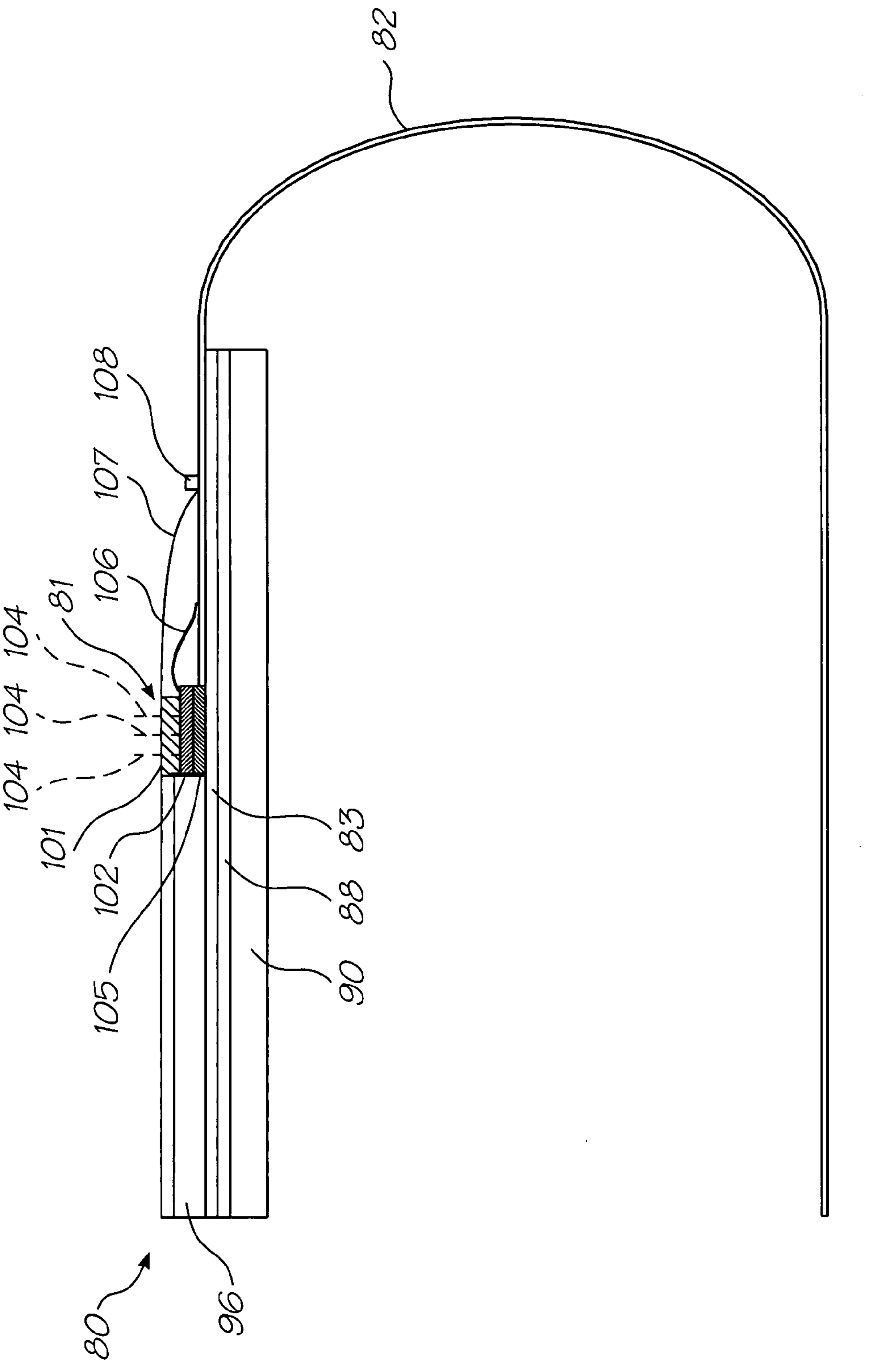
FIG. 60 is a schematic side view, shown partly in section, of the printhead module of FIG. 58.
Figure 61:
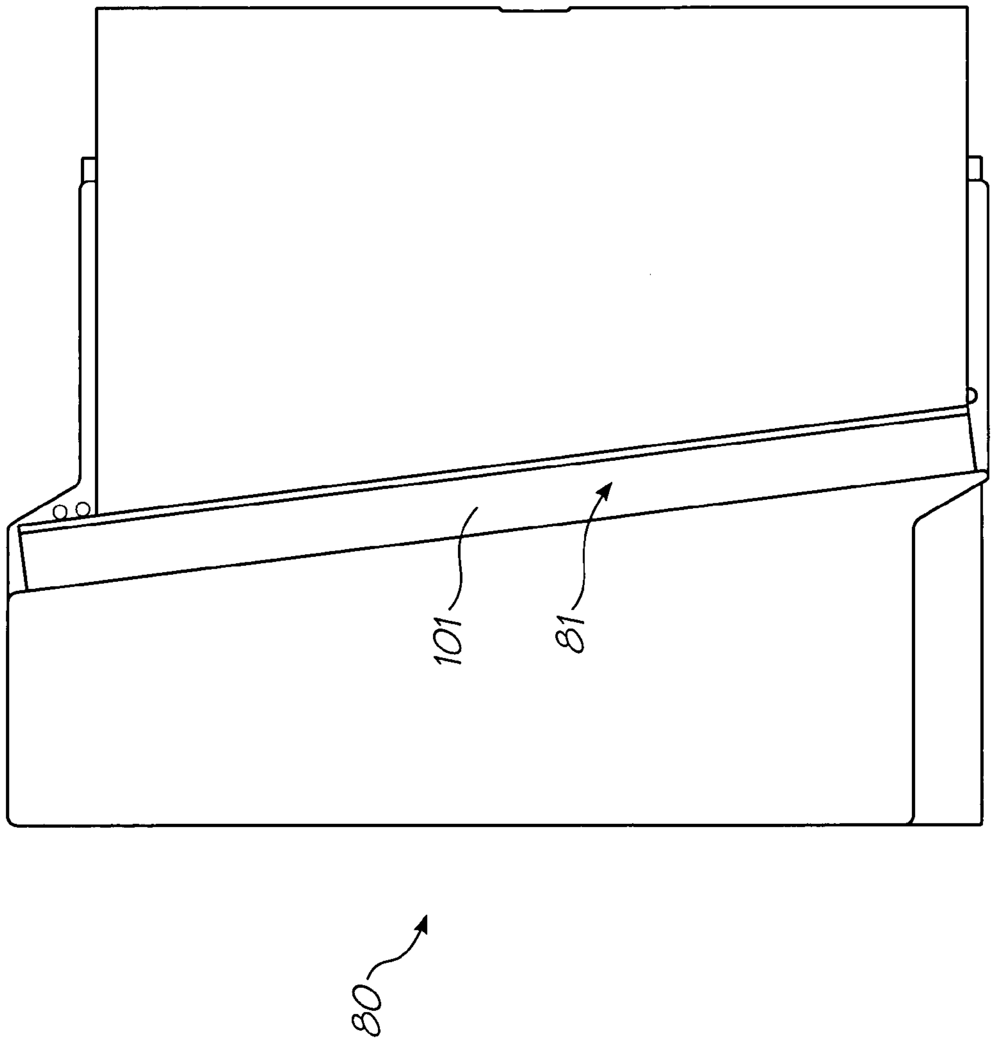
FIG. 61 is a schematic plan view of the printhead module of FIG. 58.

FIG. 60, in which a side view of the printhead module assembly 80 of FIGS. 58 and 59 is schematically shown, is now referred to. The center layer 102 of the chip assembly is the layer where the 7680 nozzles and their associated drive circuitry is disposed. The top layer of the chip assembly, which constitutes the nozzle guard 101, enables the filtered compressed air to be directed so as to keep the nozzle guard holes 104 (which are represented schematically by dashed lines) clear of paper dust.

The lower layer 105 is of silicon and has ink channels etched in it. These ink channels are aligned with the holes 84 in the stainless steel upper layer sheet 83. The sheet 83 receives ink and compressed air from the lower layer 90 as described above, and then directs the ink and air to the chip 81. The need to funnel the ink and air from where it is received by the lower layer 90, via the mid-layer 88 and upper layer 83 to the chip assembly 81, is because it would otherwise be impractical to align the large number (7680) of very small nozzles 3 with the larger, less accurate holes 98 in the lower layer 90.

The flex PCB 82 is connected to the shift registers and other circuitry (not shown) located on the layer 102 of chip assembly 81. The chip assembly 81 is bonded by wires 106 onto the PCB flex and these wires are then encapsulated in an epoxy 107. To effect this encapsulating, a dam 108 is provided. This allows the epoxy 107 to be applied to fill the space between the dam 108 and the chip assembly 81 so that the wires 106 are embedded in the epoxy. Once the epoxy 107 has hardened, it protects the wire bonding structure from contamination by paper and dust, and from mechanical contact.

Figure 62:
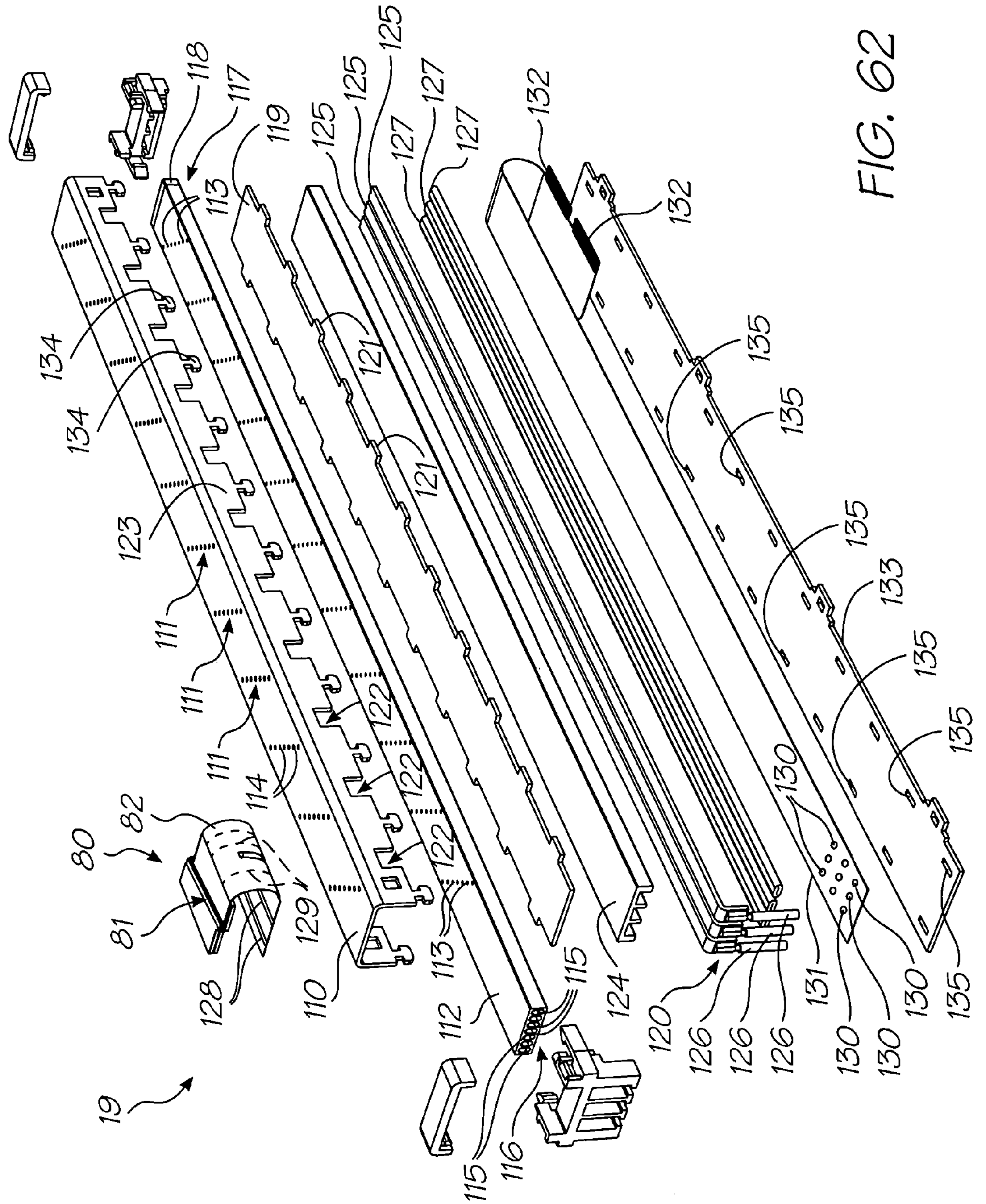
FIG. 62 is a schematic exploded perspective view of a printhead according to an embodiment of the invention.
Figure 63:
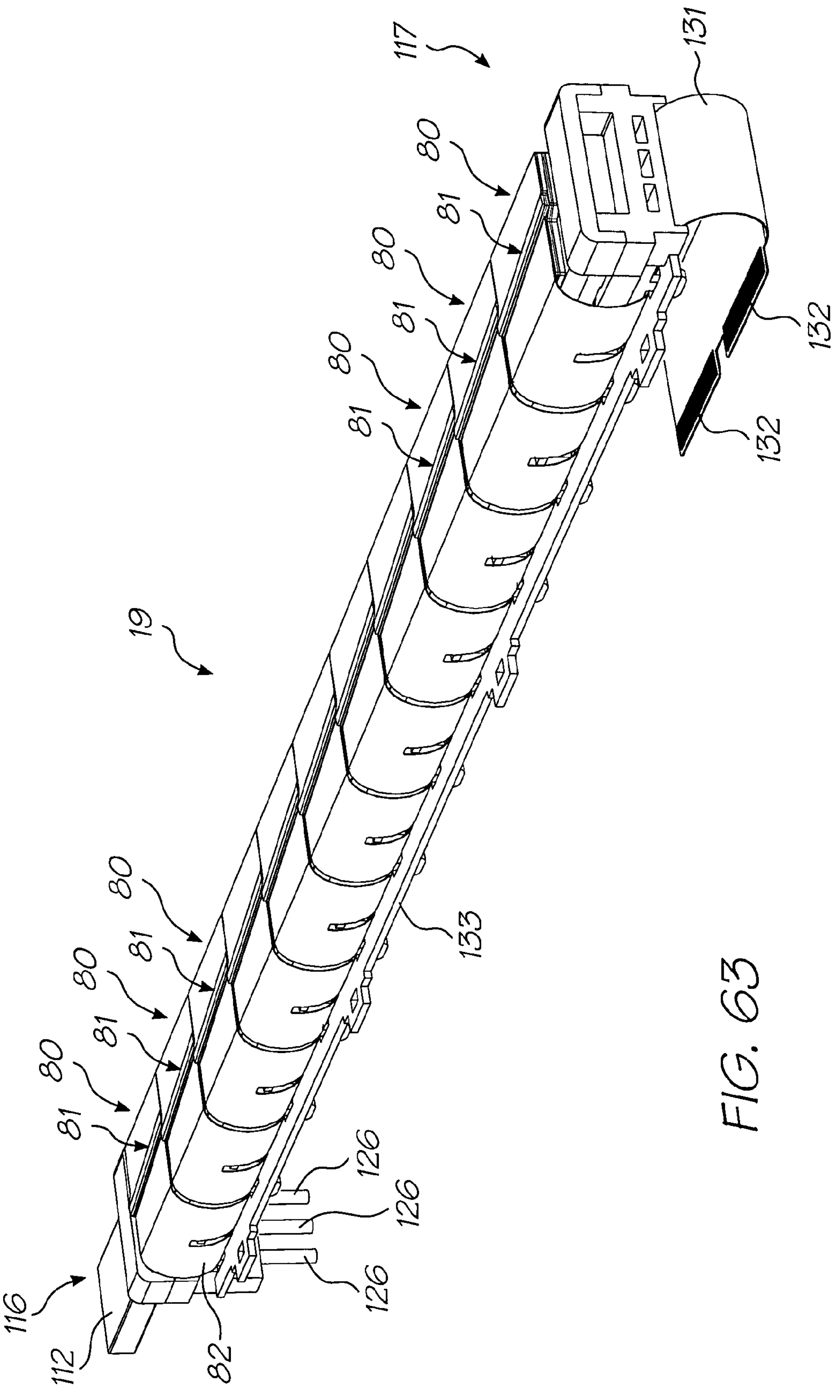
FIG. 63 is a schematic further perspective view of the printhead of FIG. 62 shown unexploded.
Figure 64:
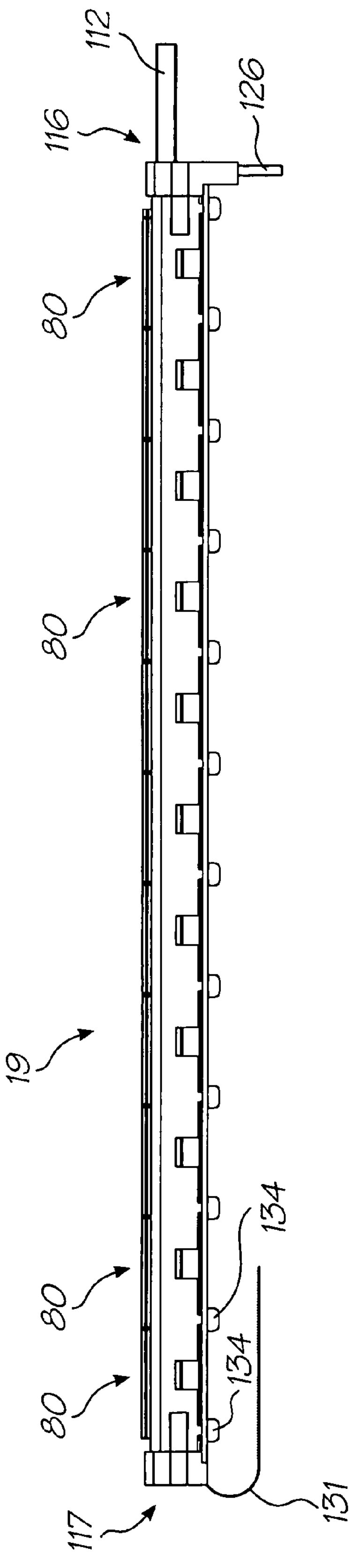
FIG. 64 is a schematic front view of the printhead of FIG. 62.
Figure 65:
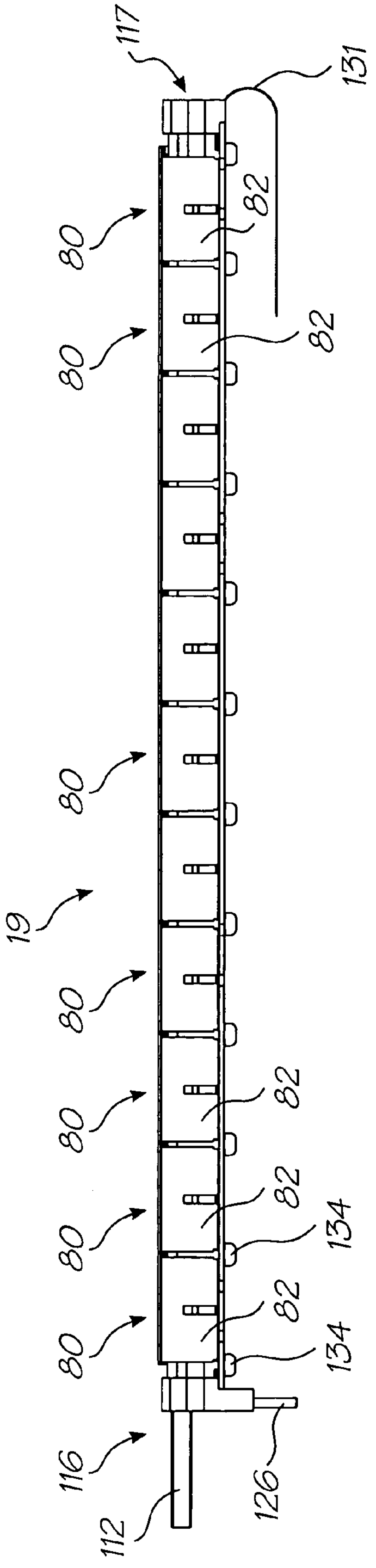
FIG. 65 is a schematic rear view of the printhead of FIG. 62.
Figure 66:
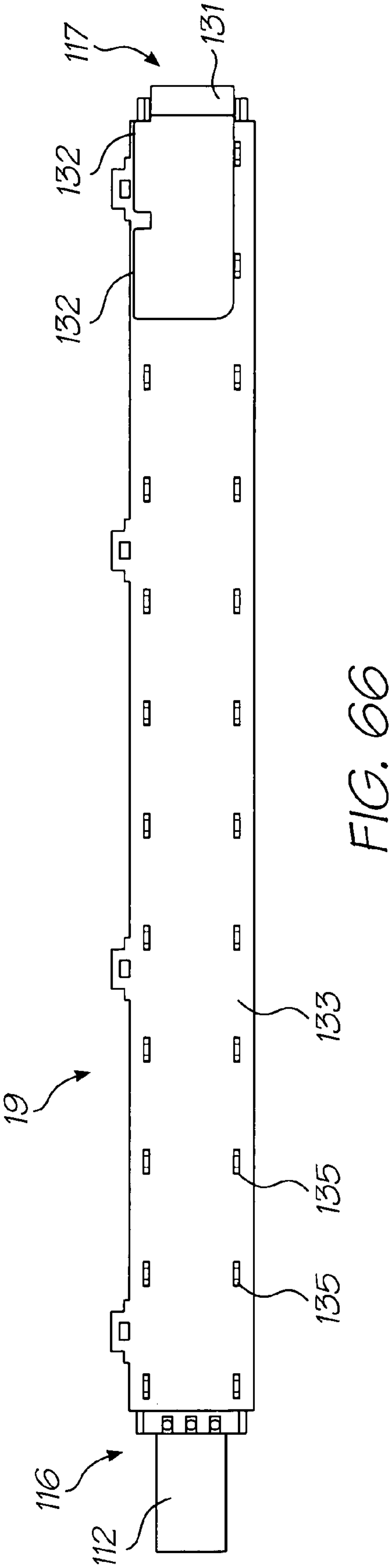
FIG. 66 is a schematic bottom view of the printhead of FIG. 62.
Figure 67:
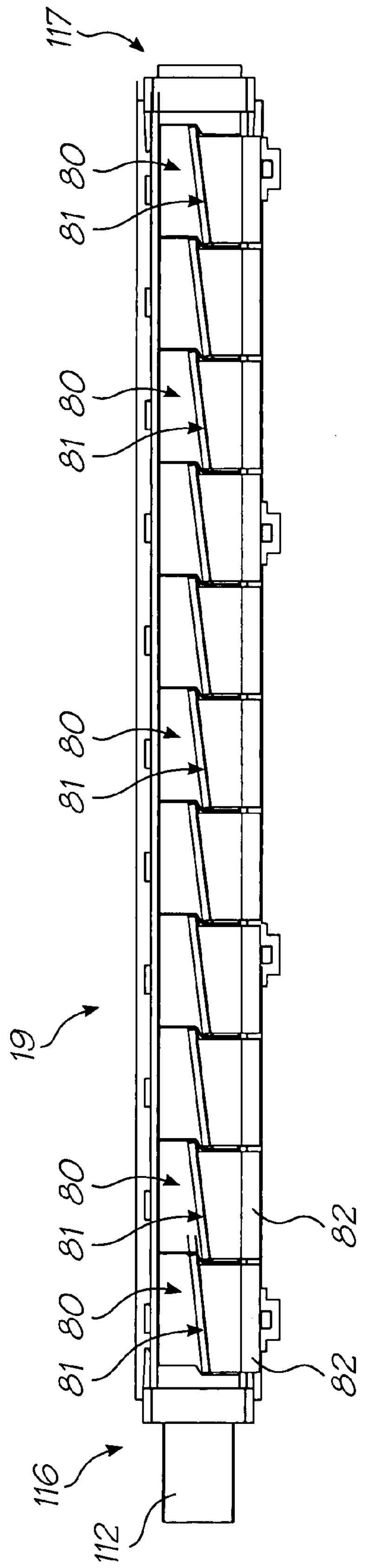
FIG. 67 is a schematic plan view of the printhead of FIG. 62.

Referring to FIG. 62, there is shown schematically, in an exploded view, a printhead assembly 19, which includes, among other components, printhead module assemblies 80 as described above. The printhead assembly 19 is configured for a page-width printer, suitable for A4 or US letter type paper.

The printhead assembly 19 includes eleven of the printhead modules assemblies 80, which are glued onto a substrate channel 110 in the form of a bent metal plate. A series of groups of seven holes each, designated by the reference numerals 111, are provided to supply the 6 different colors of ink and the compressed air to the chip assemblies 81. An extruded flexible ink hose 112 is glued into place in the channel 110. It will be noted that the hose 112 includes holes 113 therein. These holes 113 are not present when the hose 112 is first connected to the channel 110, but are formed thereafter by way of melting, by forcing a hot wire structure (not shown) through the holes 111, which holes then serve as guides to fix the positions at which the holes 113 are melted. The holes 113, when the printhead assembly 19 is assembled, are in fluid-flow communication, via holes 114 (which make up the groups 111 in the channel 110), with the holes 98 in the lower layer 90 of each printhead module assembly 80.

The hose 112 defines parallel channels 115 which extend the length of the hose. At one end 116, the hose 112 is connected to ink containers (not shown), and at the opposite end 117, there is provided a channel extrusion cap 118, which serves to plug, and thereby close, that end of the hose.

A metal top support plate 119 supports and locates the channel 110 and hose 112, and serves as a back plate for these. The channel 110 and hose 112, in turn, exert pressure onto an assembly 120 which includes flex printed circuits. The plate 119 has tabs 121 which extend through notches 122 in the downwardly extending wall 123 of the channel 110, to locate the channel and plate with respect to each other.

An extrusion 124 is provided to locate copper bus bars 125. Although the energy required to operate a printhead according to the present invention is an order of magnitude lower than that of known thermal ink jet printers, there are a total of about 88,000 nozzles 3 in the printhead array, and this is approximately 160 times the number of nozzles that are typically found in typical printheads. As the nozzles 3 in the present invention may be operational (i.e. may fire) on a continuous basis during operation, the total power consumption will be an order of magnitude higher than that in such known printheads, and the current requirements will, accordingly, be high, even though the power consumption per nozzle will be an order of magnitude lower than that in the known printheads. The busbars 125 are suitable for providing for such power requirements, and have power leads 126 soldered to them.

Compressible conductive strips 127 are provided to abut with contacts 128 on the upperside, as shown, of the lower parts of the flex PCBs 82 of the printhead module assemblies 80. The PCBs 82 extend from the chip assemblies 81, around the channel 110, the support plate 119, the extrusion 124 and busbars 126, to a position below the strips 127 so that the contacts 128 are positioned below, and in contact with, the strips 127.

Each PCB 82 is double-sided and plated-through. Data connections 129 (indicated schematically by dashed lines), which are located on the outer surface of the PCB 82 abut with contact spots 130 (only some of which are shown schematically) on a flex PCB 131 which, in turn, includes a data bus and edge connectors 132 which are formed as part of the flex itself. Data is fed to the PCBs 131 via the edge connectors 132.

A metal plate 133 is provided so that it, together with the channel 110, can keep all of the components of the printhead assembly 19 together. In this regard, the channel 110 includes twist tabs 134 which extend through slots 135 in the plate 133 when the assembly 19 is put together, and are then twisted through approximately 45 degrees to prevent them from being withdrawn through the slots.

Figure 68:
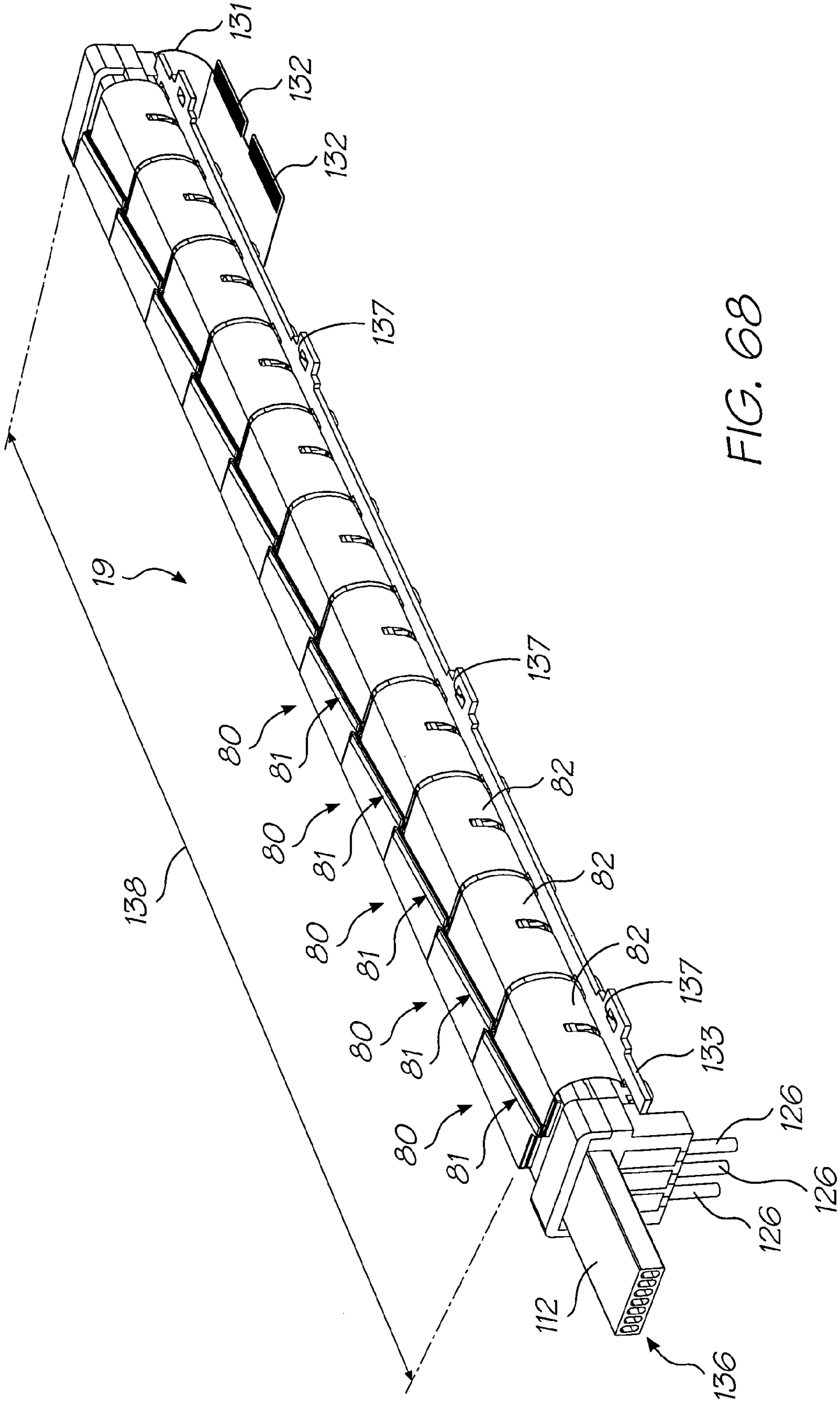
FIG. 68 is a schematic perspective view of the printhead as shown in FIG. 62, but shown unexploded.

By way of summary, with reference to FIG. 68, the printhead assembly 19 is shown in an assembled state. Ink and compressed air are supplied via the hose 112 at 136, power is supplied via the leads 126, and data is provided to the printhead chip assemblies 81 via the edge connectors 132. The printhead chip assemblies 81 are located on the eleven printhead module assemblies 80, which include the PCBs 82.

Mounting holes 137 are provided for mounting the printhead assembly 19 in place in a printer (not shown). The effective length of the printhead assembly 19, represented by the distance 138, is just over the width of an A4 page (that is, about 8.5 inches).

Figure 69:
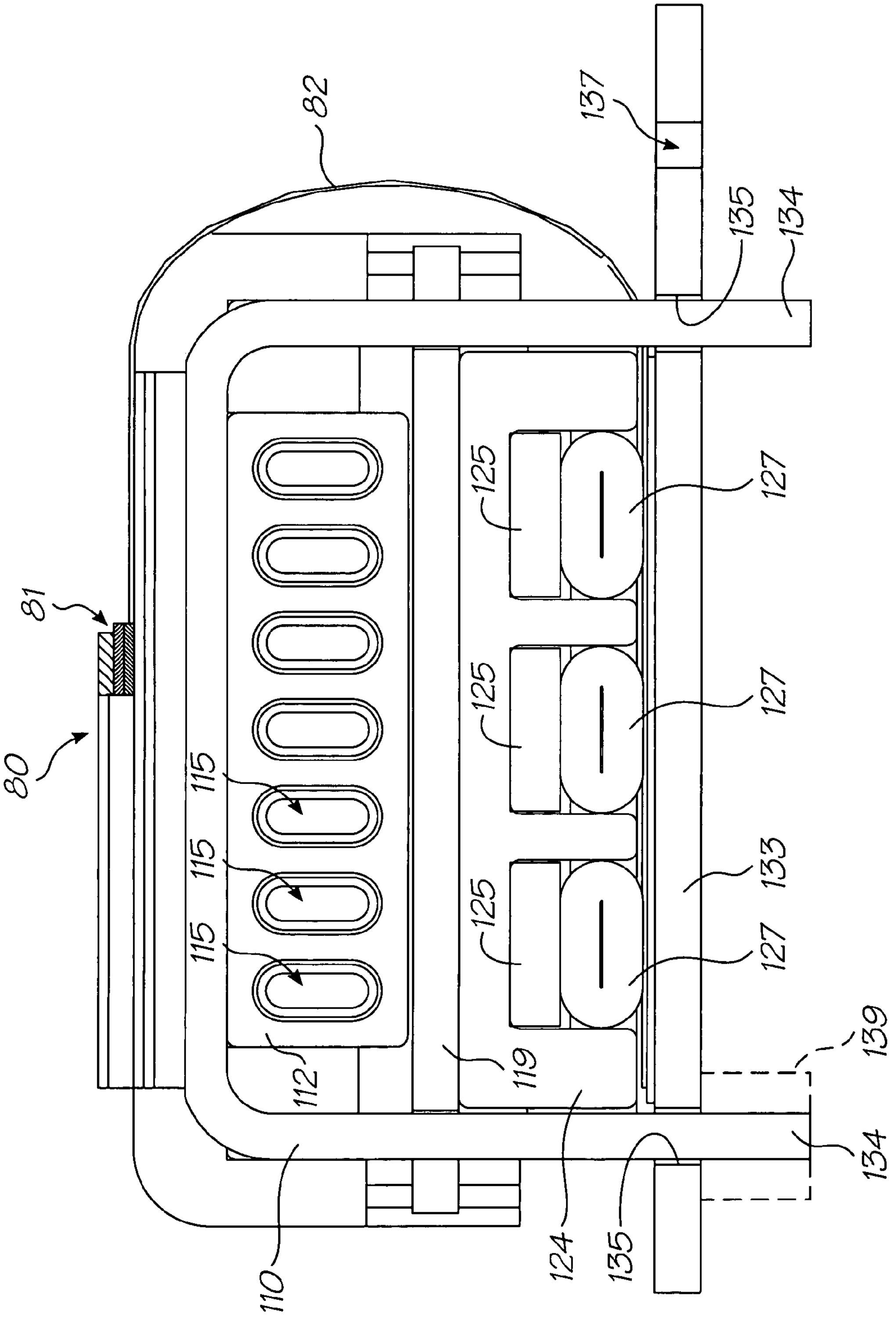
FIG. 69 is a schematic longitudinal section through the printhead of FIG. 62.

Referring to FIG. 69, there is shown, schematically, a cross-section through the assembled printhead 19. From this, the position of a silicon stack forming a chip assembly 81 can clearly be seen, as can a longitudinal section through the ink and air supply hose 112. Also clear to see is the abutment of the compressible strip 127 which makes contact above with the busbars 125, and below with the lower part of a flex PCB 82 extending from a the chip assembly 81. The twist tabs 134 which extend through the slots 135 in the metal plate 133 can also be seen, including their twisted configuration, represented by the dashed line 139.

Printer System

Figure 70:
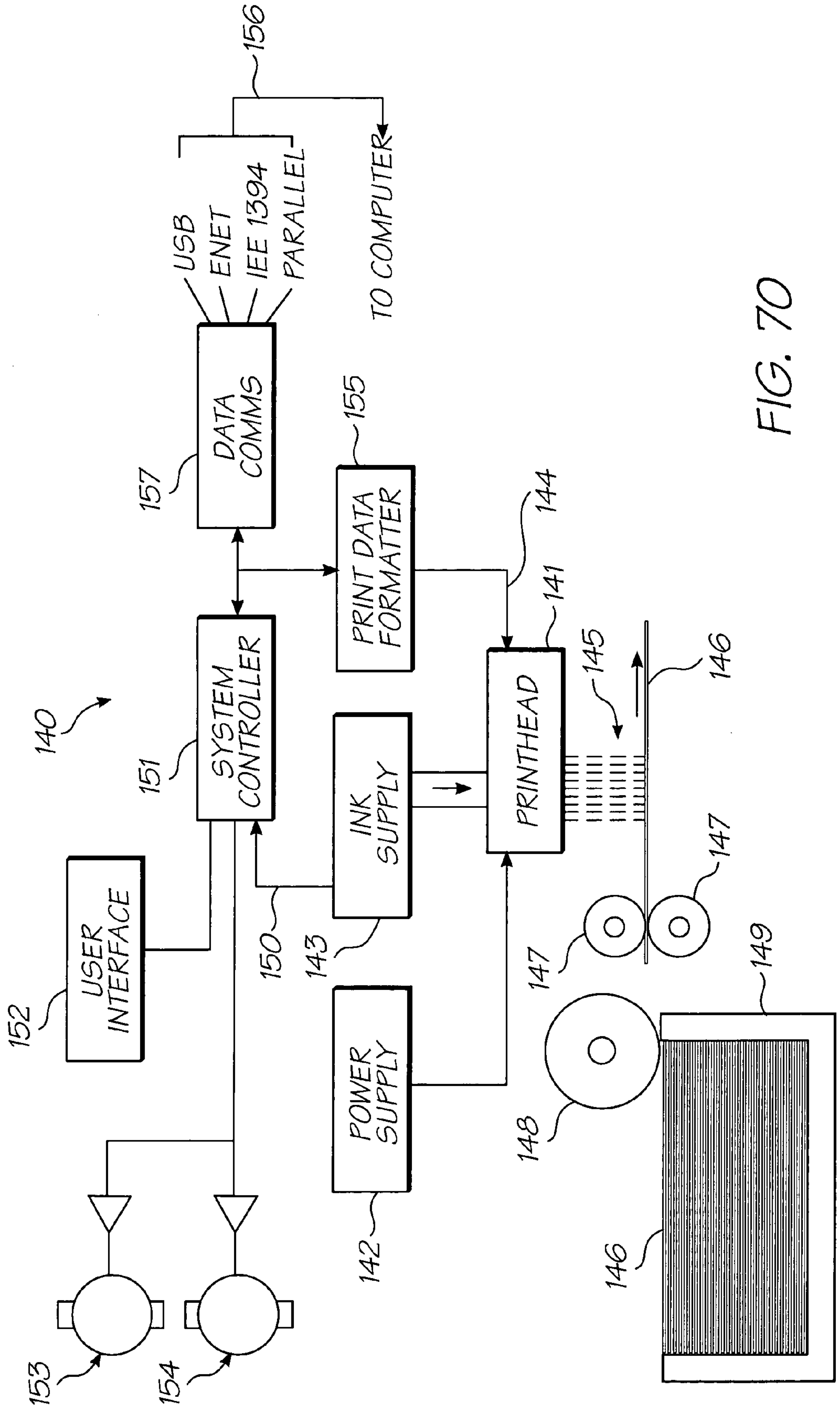
FIG. 70 is a block diagram of a printer system according to an embodiment of the invention.

Referring to FIG. 70, there is shown a block diagram illustrating a printhead system 140 according to an embodiment of the invention.

Shown in the block diagram is the printhead (represented by the arrow) 141, a power supply 142 to the printhead, an ink supply 143, and print data 144 which is fed to the printhead as it ejects ink, at 145, onto print media in the form, for example, of paper 146.

Media transport rollers 147 are provided to transport the paper 146 past the printhead 141. A media pick up mechanism 148 is configured to withdraw a sheet of paper 146 from a media tray 149.

The power supply 142 is for providing DC voltage which is a standard type of supply in printer devices.

The ink supply 143 is from ink cartridges (not shown) and, typically various types of information will be provided, at 150, about the ink supply, such as the amount of ink remaining. This information is provided via a system controller 151 which is connected to a user interface 152. The interface 152 typically consists of a number of buttons (not shown), such as a "print" button, "page advance" button, an so on. The system controller 151 also controls a motor 153 that is provided for driving the media pick up mechanism 148 and a motor 154 for driving the media transport rollers 147.

It is necessary for the system controller 151 to identify when a sheet of paper 146 is moving past the printhead 141, so that printing can be effected at the correct time. This time can be related to a specific time that has elapsed after the media pick up mechanism 148 has picked up the sheet of paper 146. Preferably, however, a paper sensor (not shown) is provided, which is connected to the system controller 151 so that when the sheet of paper 146 reaches a certain position relative to the printhead 141, the system controller can effect printing. Printing is effected by triggering a print data formatter 155 which provides the print data 144 to the printhead 141. It will therefore be appreciated that the system controller 151 must also interact with the print data formatter 155.

The print data 144 emanates from an external computer (not shown) connected at 156, and may be transmitted via any of a number of different connection means, such as a USB connection, an ETHERNET connection, a IEEE1394 connection otherwise known as firewire, or a parallel connection. A data communications module 157 provides this data to the print data formatter 155 and provides control information to the system controller 151.

Although the invention is described above with reference to specific embodiments, it will be understood by those skilled in the art that the invention may be embodied in many other forms. For example, although the above embodiments refer to the heater elements being electrically actuated, non-electrically actuated elements may also be used in embodiments, where appropriate.

The invention claimed is:

1. A method of fabricaring inkjet nozzles on a substrate, each nozzle comprising a nozzle chamber and an actuator suspended in the nozzle chamber, each nozzle chamber comprising a roof having a nozzle aperture defined therein and sidewalls extending from the roof to the substrate, the method comprising the steps of:

(a) depositing a layer of first sacrificial photoresist onto the substrate;

(b) defining actuator scaffolds in the first sacrificial photoresist;

(c) depositing actuator material onto the actuator scaffolds;

(d) etching the actuator material to define actuators;

(e) depositing a layer of second sacrificial photoresist to cover the actuators;

(f) defining openings in the second sacrificial photoresist, the openings being complementary to chamber sidewalls;

(g) depositing roof material onto the second sacrificial photoresist and into the openings, thereby forming the roof and sidewalls of each chamber;

(h) etching nozzle apertures through each roof; and (i) removing the first and second sacrificial photoresist exposed through the nozzle apertures.

2. The method of claim 1, which forms part of a printhead fabrication process.

3. The method of claim 1, wherein the actuator is a thermal actuator.

4. The method of claim 1, wherein the actuator is a bubble-fanning heater element.

5. The method of claim 4, wherein etching the actuator material includes defining a void space in a central portion of the actuator.

6. The method of claim 4, wherein the actuator material is deposited onto heater contacts on either side of each scaffold at the sane time as being deposited onto the scaffold, thereby forming an electrical connection between the heater element and the heater contacts.

7. The method of claim 1, wherein each chamber roof forms part of a nozzle plate spanning a plurality of nozzles.

8. The method of claim 1, wherein the roof material is silicon nitride.

9. The method of claim 1, wherein the roof material is deposited by plasma enhanced chemical vapour deposition (PECVD).

10. The method of claim 1, wherein each nozzle aperture has a respective nozzle rim.

11. The method of claim 10, wherein nozzles rims are etched into each roof prior to etching nozzle apertures through each roof.

12. The method of claim 1, wherein ink supply channels are back-etched to the nozzles prior to removing the sacrificial photoresist.

13. The method of claim 1, wherein the sacrificial photoresist is removed by plasma ashing.

* * * * *

UNITED STATES PATENT AND TRADEMARK OFFICE

CERTIFICATE OF CORRECTION

PATENT NO. : 7,252,775 B2
APPLICATION NO. : 11/080497
DATED : August 7, 2007
INVENTOR(S) : Kia Silverbrook It is certified that error appears in the above-identified patent and that said Letters Patent is hereby corrected as shown below:

Column 26, line 4 (Claim 1) should read:
--1. A method of fabricating inkjet nozzles on a substrate--;

Column 26, line 33 (Claim 4) should read:
--bubble-forming heater element.--;

Column 26, line 39 (Claim 6) should read:
--scaffold at the same time as being desposited onto the scaffold,--

Signed and Sealed this

Nineteenth Day of August, 2008

JON W. DUDAS
*Director of the United States Patent and Trademark Office*